(12) United States Patent
Mizuhashi et al.

(10) Patent No.: US 10,430,012 B2
(45) Date of Patent: Oct. 1, 2019

(54) DISPLAY DEVICE

(71) Applicant: Japan Display Inc., Tokyo (JP)

(72) Inventors: Hiroshi Mizuhashi, Tokyo (JP); Gen Koide, Tokyo (JP); Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/274,635

(22) Filed: Feb. 13, 2019

(65) Prior Publication Data

US 2019/0179460 A1    Jun. 13, 2019

Related U.S. Application Data

(63) Continuation of application No. 15/448,062, filed on Mar. 2, 2017, now Pat. No. 10,228,809.

(30) Foreign Application Priority Data

Mar. 10, 2016    (JP) .................................. 2016-046778

(51) Int. Cl.
| | | |
|---|---|---|
| *G06F 3/046* | (2006.01) | |
| *G06F 3/041* | (2006.01) | |
| *G02F 1/1333* | (2006.01) | |
| *G02F 1/1362* | (2006.01) | |
| *G06F 3/044* | (2006.01) | |

(Continued)

(52) U.S. Cl.
CPC .......... *G06F 3/046* (2013.01); *G02F 1/13338* (2013.01); *G02F 1/134336* (2013.01); *G02F 1/136286* (2013.01); *G06F 3/03545* (2013.01); *G06F 3/044* (2013.01); *G06F 3/047* (2013.01); *G06F 3/0412* (2013.01); *G06F 3/0416* (2013.01); *G02F 1/1368* (2013.01); *G02F 1/133514* (2013.01);
(Continued)

(58) Field of Classification Search
None
See application file for complete search history.

(56) References Cited

U.S. PATENT DOCUMENTS

| | | |
|---|---|---|
| 5,854,881 A | 12/1998 | Yoshida et al. |
| 2007/0124515 A1 | 5/2007 | Ishikawa et al. |

(Continued)

FOREIGN PATENT DOCUMENTS

| | | |
|---|---|---|
| JP | H07-134630 | 5/1995 |
| JP | H08-50535 A | 2/1996 |

(Continued)

OTHER PUBLICATIONS

Japanese Office Action dated Jun. 11, 2019 in corresponding Japanese Application No. 2016-046778.

*Primary Examiner* — Nicholas J Lee
(74) *Attorney, Agent, or Firm* — K&L Gates LLP

(57) ABSTRACT

Provided is a touch detection function-equipped display device that can be manufactured while suppressing an increase of price. A display device is provided with a pixel array including a plurality of pixels arranged in a matrix form, and drive electrodes each of which is arranged to extend in a first direction in the pixel array. A drive signal is supplied to a first area in a first drive electrode among the drive electrodes, and a ground voltage is supplied to a second area extending in the first direction with respect to the first area to generate a magnetic field in the first drive electrode according to the drive signal at a time of detecting an external proximity object.

19 Claims, 40 Drawing Sheets

(51) Int. Cl.
  *G06F 3/047* (2006.01)
  *G02F 1/1343* (2006.01)
  *G06F 3/0354* (2013.01)
  *G02F 1/1368* (2006.01)
  *G02F 1/1335* (2006.01)

(52) U.S. Cl.
  CPC ............ *G02F 2001/133302* (2013.01); *G06F 2203/04106* (2013.01); *G06F 2203/04108* (2013.01)

(56) References Cited

U.S. PATENT DOCUMENTS

| | | |
|---|---|---|
| 2007/0200487 A1 | 8/2007 | Uno |
| 2009/0127003 A1 | 5/2009 | Geaghan |
| 2009/0146654 A1 | 6/2009 | Ogawa |
| 2009/0160790 A1 | 6/2009 | Fukushima et al. |
| 2012/0154327 A1 | 6/2012 | Liu |
| 2013/0076670 A1 | 3/2013 | Wu et al. |
| 2013/0249871 A1 | 9/2013 | Yoo et al. |

FOREIGN PATENT DOCUMENTS

| | | |
|---|---|---|
| JP | H10-49301 A | 2/1998 |
| JP | 2005-352572 A | 12/2005 |
| JP | 2006-163745 A | 6/2006 |
| JP | 2007-257619 A | 10/2007 |
| JP | 2009-003796 A | 1/2009 |
| JP | 2013-069270 | 4/2013 |
| JP | 2014-164770 | 9/2014 |

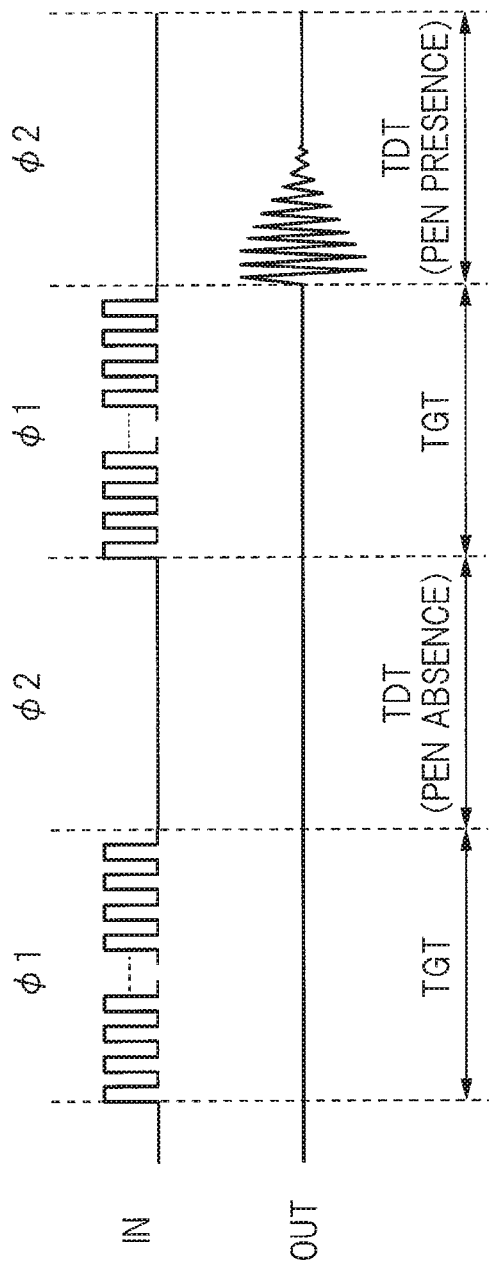

DISPLAY DEVICE

CROSS-REFERENCE TO RELATED APPLICATION

The present application is a continuation of U.S. application Ser. No. 15/448,062, filed Mar. 2, 2017, which application claims priority from Japanese Patent Application No. 2016-046778 filed on Mar. 10, 2016, the content of which is hereby incorporated by reference.

TECHNICAL FIELD OF THE INVENTION

The present invention relates to a display device, and particularly to a touch detection function-equipped display device which is capable of detecting an external proximity object.

BACKGROUND OF THE INVENTION

Recently, a focus has been placed on a touch detection device, a so-called touch panel, which is capable of detecting an external proximity object. The touch panel is provided as a touch detection function-equipped display device in the state of being mounted on a display device, for example, a liquid crystal display device, or being integrated with the liquid crystal display device.

The external proximity object includes, for example, a touch panel which allows a pen to be used. By allowing the pen to be used, for example, it is possible to designate a small area or input a handwritten letter. There are various types of techniques to detect touch by the pen. One of the various types of techniques is an electromagnetic induction system. This electromagnetic induction system can realize a high accuracy and a high writing pressure detection accuracy, also realize a hovering detection function in which the external proximity object is spaced apart from a touch panel surface, and so is an effective technique as the technique of detecting the touch by the pen.

In addition, there is also a touch panel which allows a finger to be used as the external proximity object. It is unnecessary to prepare a pen or the like when it is possible to use the finger, which allows simplicity and convenience. For example, various button images and the like are displayed on a touch detection function-equipped display device, and the proximity of the finger to the button image is detected by the touch panel. Accordingly, it is possible to use the touch panel instead of a general mechanical button. Such a touch detection function-equipped display device does not necessarily require an information input means such as a keyboard and a mouse, and so tends to be widely used in portable information terminals or the like such as a mobile phone as well as a computer.

There are also various types of technique to detect the touch by the finger. For example, there are several systems such as an optical type, a resistance type, and a capacitance system. Among them, the capacitive system has a relatively simple structure, consumes low power, and so has been used in a portable information terminal or the like.

The touch panel that allows the use of the finger is simple and convenient, but it is not easy to designate a small area using the finger, for example. Thus, desired is a touch panel which allows both a pen and a finger to be used.

Touch detection techniques using the electromagnetic induction system are described in, for example, Japanese Patent Application Laid-open No. 10-49301 (Patent Document 1), Japanese Patent Application Laid-open No. 2005-352572 (Patent Document 2), and Japanese Patent Application Laid-open No. 2006-163745 (Patent Document 3).

SUMMARY OF THE INVENTION

A display device according to the present invention comprises: a pixel array which includes a plurality of pixels arranged in a matrix form; a plurality of drive wirings each of which is arranged to extend in a first direction in the pixel array; and a plurality of detection wirings which are arranged to extend in a second direction intersecting the first direction in the pixel array. Also, a periodically changing magnetic field drive signal is supplied to a first area in a first drive wiring among the plurality of drive wirings, and a reference signal is supplied to a second area extending in the first direction with respect to the first area so as to generate a magnetic field around the first drive wiring according to the magnetic field drive signal at a time of detecting an external proximity object. Further, the magnetic field generated by the external proximity object depending on the magnetic field generated around the first drive wiring is detected by the plurality of detection wirings.

BRIEF DESCRIPTIONS OF THE DRAWINGS

FIG. 3A is a waveform diagram illustrating a principle of the electromagnetic induction system;

FIG. 3B is a waveform diagram illustrating a principle of the electromagnetic induction system;

DESCRIPTIONS OF THE PREFERRED EMBODIMENTS

Figure 1:
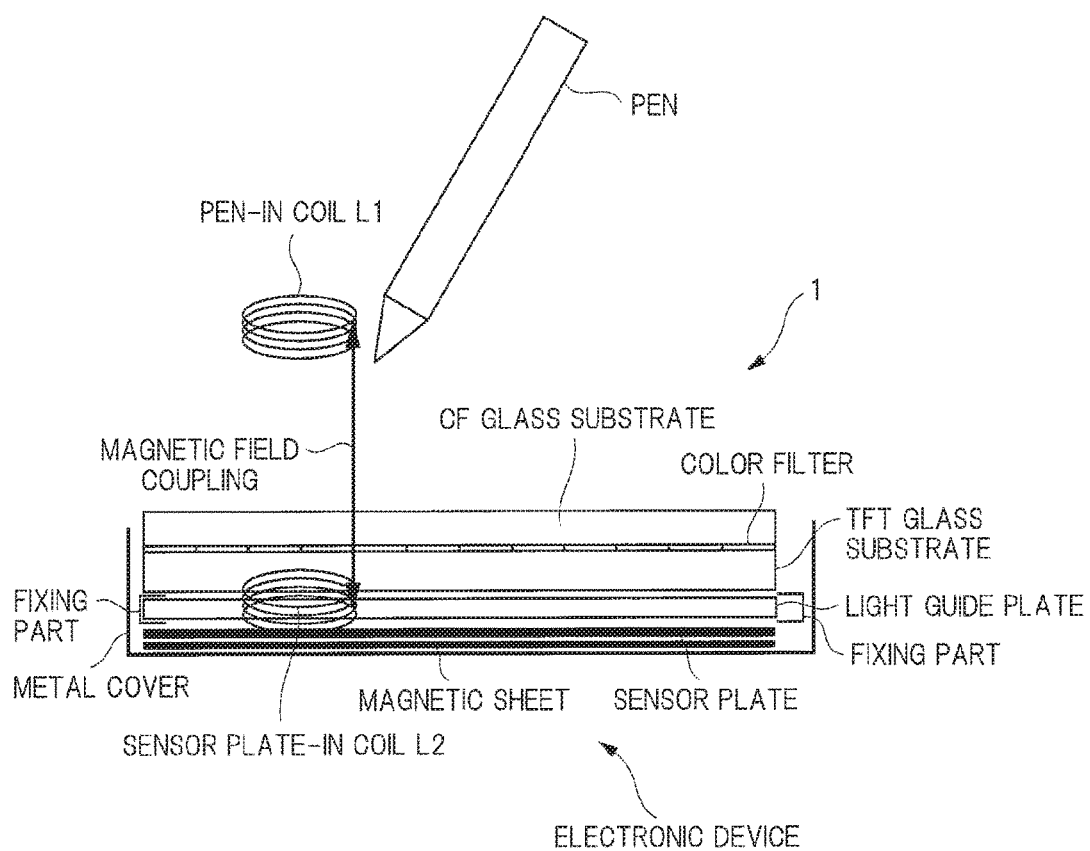
FIG. 1 is an explanatory diagram illustrating a relationship between an electronic device including a touch detection function-equipped display device and a pen.

Hereinafter, each embodiment of the present invention will be described with reference to the drawings. Incidentally, the disclosure is mere an example, and a matter that those skilled in the art easily think up about appropriate alternations while keeping a gist of the invention is off course included with the present invention. In addition, there are cases in which a width, a thickness, a shape and the like of each portion of the drawings are schematically illustrated as compared to actual aspects in order for more clear description, but the drawings are mere examples, and do not limit the interpretation of the present invention.

In addition, the same reference numerals are applied to the same elements that have been described in relation to the foregoing drawings in the present specification and the respective drawings, and detailed descriptions thereof will be appropriately omitted in some cases.

The following description is given by exemplifying a touch detection function-equipped liquid crystal display device as a touch detection function-equipped display device. However, the invention is not limited thereto, and can be applied also to a touch detection function-equipped OLED display device. In addition, although the description has been given by exemplifying two types of an electromagnetic induction system, a case of employing the latter system will be described hereinafter. In the latter system, a battery is not necessarily mounted in a pen, and so it is possible to reduce a size of the pen and/or to improve a degree of freedom in shape.

The electromagnetic induction system includes a system in which: a coil and a battery are mounted to a pen; a magnetic field is generated by the pen; and magnetic field energy is detected by a touch panel. In this case, the touch panel needs to include a sensor plate that receives the magnetic field energy. Further, there is another system in which: a coil and a capacitor are mounted in a pen; a magnetic field is generated by a touch panel; magnetic field energy is stored in the capacitor mounted in the pen; and then is detected by the touch panel. In the case of this system, the magnetic field is generated by the touch panel, and a sensor plate to receive the magnetic field energy from the pen is required.

It is necessary to add the sensor plate receiving electromagnetic energy in order to realize the touch detection function-equipped display device in any of the electromagnetic induction systems, which leads to an increase of price (production cost).

In addition, required is a sensor plate for detection of a change in capacitance even in the capacitance system that detects the touch by the finger. Thus, it is necessary to add the sensor plate in order to realize the touch detection function-equipped display device, which leads to an increase of price.

In order to enable detection of both the touch by the pen and the touch by the finger, it is necessary to add the respective sensor plates, which lead to a further increase of price. For example, it is conceivable to suppress the increase of price by utilizing a part of the sensor plate used in the electromagnetic induction system also as a part of the sensor plate used in the capacitance system. However, it is required to perform control for switching the commonly utilized part in the case of the common utilization, and such control is complicated. In addition, a control circuit for the control is increased, which restricts the suppression of the increase of price.

An object of the present invention is to provide a touch detection function-equipped display device that can be manufactured while suppressing an increase of price.

A display device according to an aspect of the present invention includes: a pixel array which includes a plurality of pixels arranged in a matrix form; a plurality of drive wirings each of which is arranged to extend in a first direction in the pixel array; and a plurality of detection wirings which are arranged to extend in a second direction intersecting the first direction in the pixel array. Here, a periodically changing magnetic field drive signal is supplied to a first area in a first drive wiring among the plurality of drive wirings, and a reference signal is supplied to a second area extending in the first direction with respect to the first area at a time of detecting an external proximity object. Accordingly, a magnetic field is generated around the first drive wiring depending on the magnetic field drive signal. A magnetic field generated by the external proximity object is changed depending on whether the external proximity object is proximate to the first drive wiring. This magnetic field generated by the external proximity object is detected by the plurality of detection wirings.

For example, a configuration where two drive wirings each extending in the first direction are electrically connected to form a coil is considered in order to generate the magnetic field. In this case, connecting control is required between the two drive wirings. In regard to this, the connecting control is not required between the drive wirings, and the control becomes easy in the display device according to an aspect. In addition, it is possible to suppress an increase of a control circuit(s). As a result, it is possible to suppress an increase of price of the touch detection function-equipped display device.

Also, in the display device according to an aspect of the present invention, the above-described plurality of drive wirings include a second drive wiring, the second drive wiring being arranged to be proximate to the first drive wiring and having a first area proximate to the first area, and a second area proximate to the second area. Here, the reference signal is supplied to the first area of the second drive wiring, and the magnetic field drive signal is supplied to the second area of the second drive wiring at the time of detecting the external proximity object. In this case, the magnetic field generated around the first drive wiring and a magnetic field generated around the second drive wiring are superimposed on each other in an area between the first and second drive wirings. Accordingly, it is possible to strengthen the magnetic field thus generated.

Further, a display device according to an aspect of the present invention is a display device that, in a display area with first and second sides opposing each other, has a plurality of drive wirings arranged between the first and second sides and parallel to each other. The display device includes a first drive circuit connected to one end portion of each of the plurality of drive wirings, and a second drive circuit connected to the other end portion of each of the plurality of drive wirings. Here, the first drive circuit supplies a magnetic field drive signal to one end portion of a first drive wiring arranged to be proximate to the first side, and the second drive circuit supplies a reference signal to the other end portion of the first drive wiring. At this time, the first drive circuit supplies the reference signal to one end portion of a second drive wiring which is arranged to be closer to the second side than the first drive wiring and to sandwich a third drive wiring with the first drive wiring, and the second drive circuit supplies the magnetic field drive signal to the other end portion of the second drive wiring.

A strong magnetic field is generated between the first and second drive wirings, and is applied to the external proximity object by supplying the magnetic field drive signal and the reference signal to the first and second drive wirings.

The first and second drive circuits detect the external proximity object proximate to the display area during a display period for one frame in the display area by supplying the magnetic field drive signal and the reference signal to the drive wirings selected among the plurality of drive wirings so that drive wirings respectively corresponding to the first and second drive wirings are moved from the first side to the second side.

Accordingly, it is possible to detect the external proximity object proximate to the display area while preventing the control from being complicated.

First Embodiment

A touch detection function-equipped liquid crystal display device (hereinafter, simply referred to also as a display device) according to a first embodiment has both functions of touch detection by an electromagnetic induction system and touch detection by a capacitance system. That is, it is possible to perform the detection of touch by the pen and the detection of touch by the finger. First, each principle of the electromagnetic induction system and the capacitance system will be described.

<Basic Principle of Electromagnetic Induction System>

FIG. 1 is an explanatory diagram schematically illustrating a relationship between an electronic device including the display device and the pen. In addition, FIGS. 2A to 3B are explanatory diagrams schematically illustrating the basic principle of the electromagnetic induction system.

In FIG. 1, the electronic device includes a display device 1 housed in a metal cover, a light guide plate, a sensor plate, and a magnetic sheet. The sensor plate is mounted between the display device 1 and the metal cover in the example illustrated in FIG. 1. Although a plurality of coils are provided in the sensor plate, FIG. 1 schematically illustrates one coil among the plurality of coils as a sensor plate-in coil (hereinafter, simply referred to also as a coil) L2.

Further, a coil and a capacitive element are built in a pen that corresponds to an external proximity object. FIG. 1 does not illustrate the capacitive element while schematically illustrating the coil built in the pen as a pen-in coil (hereinafter, simply referred to also as a coil) L1. The coil L1 and the coil L2 are coupled by a magnetic field.

Incidentally, a TFT glass substrate, a color filter and a CF glass substrate, which are included in the display device 1, are drawn in FIG. 1 in order to schematically illustrate a structure of the display device 1. A plurality of layers are formed on the TFT glass substrate although not illustrated. The color filter is formed on the CF glass substrate, and a liquid crystal layer not shown in Figure is sandwiched between the color filter and the TFT glass substrate. In addition, the light guide plate is fixed by a fixing part to be sandwiched between the display device 1 and the sensor plate.

When the pen is proximate to (including contact) the electronic device, the coil L1 is proximate to the coil L2. Accordingly, the magnetic field coupling between the coil L1 and the coil L2 is generated, and the proximity of the pen is detected.

Figure 2A:
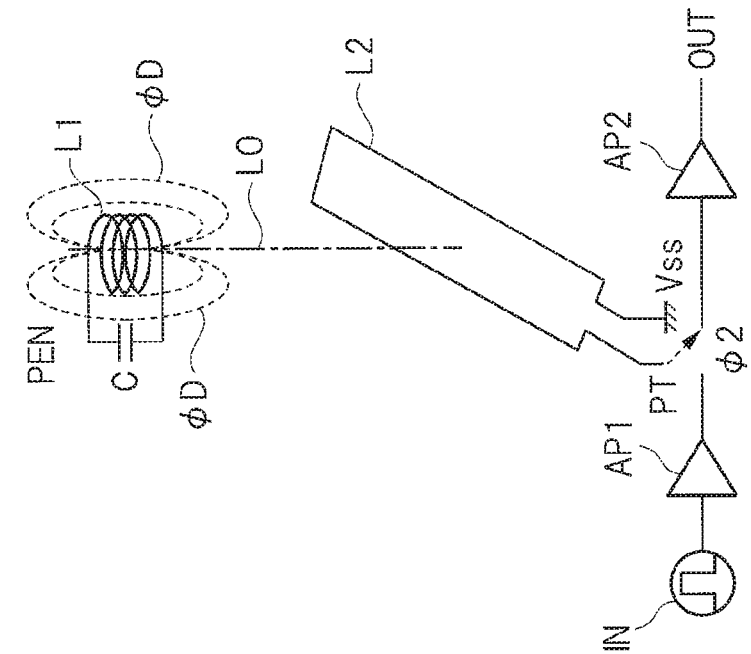
FIG. 2A is an explanatory diagrams illustrating a principle of an electromagnetic induction system.

Such detection will be described with reference to FIGS. 2A to 3B. FIG. 2A illustrates a state in which the coil L2 generates a magnetic field, and FIG. 2B illustrates a state in which the coil L1 generates a magnetic field.

Figure 2B:
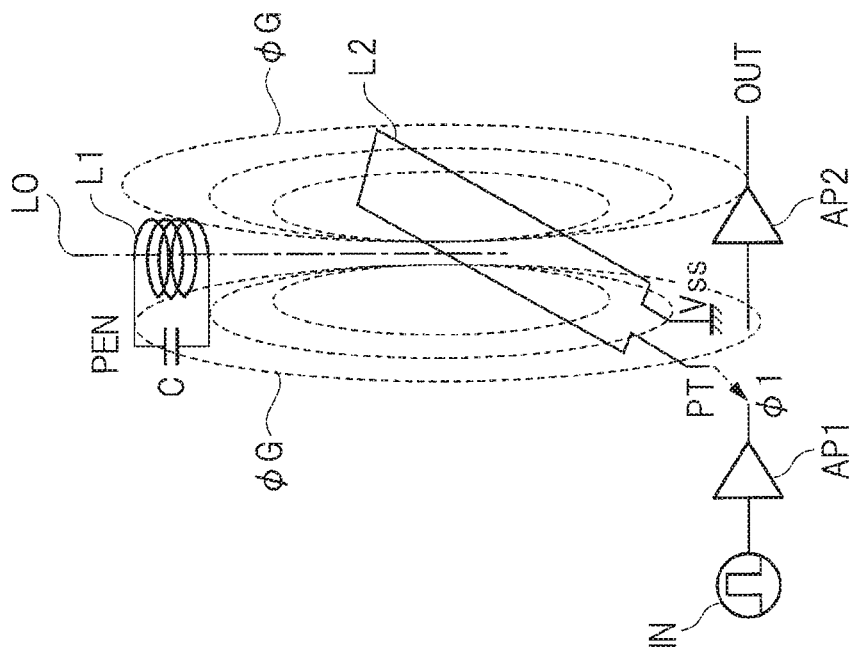
FIG. 2B is an explanatory diagrams illustrating a principle of an electromagnetic induction system.

In FIGS. 2A and 2B, the coil L1 inside the pen and a pen-in capacitive element (hereinafter, also referred to simply as a capacitive element) C are connected in parallel, thereby forming a resonant circuit. A coil of single-turn winding is illustrated as an example of the sensor plate-in coil L2, and has a pair of terminals. At a time of detecting touch by the pen (during touch detection), one terminal PT of the coil L2 is connected to output of a transmission amplifier AP1 for a predetermined time and, after elapse of the predetermined time, is connected to input of a reception amplifier AP2 for a predetermined time. Further, the other terminal of the sensor plate-in coil L2 is connected to a ground voltage Vss during the touch detection.

FIGS. 3A and 3B are waveform diagrams illustrating an operation during the touch detection. A horizontal axis represents time in FIGS. 3A and 3B, FIG. 3A illustrates a waveform of output of the transmission amplifier AP1, and FIG. 3B illustrates a waveform of output of the reception amplifier AP2.

When the one terminal PT of the coil L2 is connected to the output of the transmission amplifier AP1, a transmission signal IN which periodically changes is supplied to the input of the transmission amplifier AP1. Accordingly, the transmission amplifier AP1 supplies a periodically changing drive signal $\phi1$ to the one terminal of the coil L2 for a predetermined time (magnetic field generation period) TGT depending on a change of the transmission signal IN as illustrated in FIG. 3A. Accordingly, the coil L2 generates a magnetic field. Magnetic lines at this time are indicated by $\phi G$ in FIG. 2A.

Since the magnetic lines $\phi G$ are generated around a winding of the coil L2, the magnetic field at an inner side of the coil L2 becomes strong. When the coil L1 is proximate to the coil L2 and, for example, a central axis LO of the coil L1 is present at the inner side of the coil L2 as illustrated in FIG. 2A, the magnetic lines of the coil L2 reach the coil L1. That is, the coil L1 is arranged inside the magnetic field generated by the coil L2, and the coil L1 and the coil L2 are magnetically coupled. The coil L2 generates the magnetic field, which periodically changes, depending on the change of the drive signal $\phi1$. Thus, an induced voltage is generated in the coil L1 according to action of mutual induction between the coil L2 and the coil L1. The capacitive element C is charged by the induced voltage generated by the coil L1.

After the predetermined time, the one terminal PT of the coil L2 is connected to input of the reception amplifier AP2 for a predetermined time (a magnetic field detection period or a current detection period) TDT. If the capacitive element C is charged in the previous magnetic field generation period TGT, the coil L1 generates a magnetic field using electric charges charged in the capacitive element C in the magnetic field detection period TDT. Magnetic lines of the coil L1 generated by the electric charges charged in the capacitive element C are indicated by $\phi D$ in FIG. 2B.

If the pen-in coil L1 is proximate to the sensor plate-in coil L2 during the touch detection, that is, during the magnetic field generation period TGT and the magnetic field detection period TDT, the charging of the capacitive element C is performed in the magnetic field generation period TGT, and the magnetic lines $\phi D$ of the coil L1 reach the coil L2 in the magnetic field detection period TDT. Since the resonant circuit is configured by the coil L1 and the capacitive element C, the magnetic field generated by the coil L1 is changed depending on a time constant of the resonant circuit. As the magnetic field generated by the coil L1 is changed, an induced voltage is generated in the coil L2. A signal is changed in the one terminal PT of the coil L2 due to the induced voltage. This change of the signal is inputted to the reception amplifier AP2 as a detection signal $\phi2$, is amplified, and outputted from the reception amplifier AP2 as a sensor signal OUT in the magnetic field detection period TDT.

Meanwhile, if the pen-in coil L1 is not proximate to the sensor plate-in coil L2 during the touch detection, the capacitive element C is not charged or a charge amount to be charged decreases in the magnetic field generation period TGT. As a result, the magnetic lines $\phi D$ of the magnetic field generated by the coil L1 do not reach the coil L2 in the magnetic field detection period TDT. Thus, the detection signal $\phi2$ in the one terminal PT of the coil L2 is not changed in the magnetic field detection period TDT.

FIGS. 3A and 3B illustrate both states when the pen-in coil L1 is proximate to and is not proximate to the sensor plate-in coil L2. That is, a state when the coil L1 is not proximate to the coil L2 is illustrated in a left side in FIGS. 3A and 3B, and a state when the coil L1 is proximate to the coil L2 is illustrated in a right side. Thus, the detection signal φ2 is not changed in the magnetic field detection period TDT illustrated in the left side in FIG. 3B, and the detection signal φ2 is changed in the magnetic field detection period TDT illustrated in the right side. It is possible to detect the touch by the pen by determining pen presence in a case where the detection signal φ2 is changed, and pen absence in a case where the detection signal φ2 is not changed.

FIGS. 3A and 3B illustrate the determination on the pen presence and the pen absence, and it is also possible to determine a distance between the pen and the sensor plate or determine writing pressure of the pen since a value of the detection signal φ2 is changed depending on a distance between the coil L1 and the coil L2.

<Basic Principle of Capacitive System>

Figure 4A:
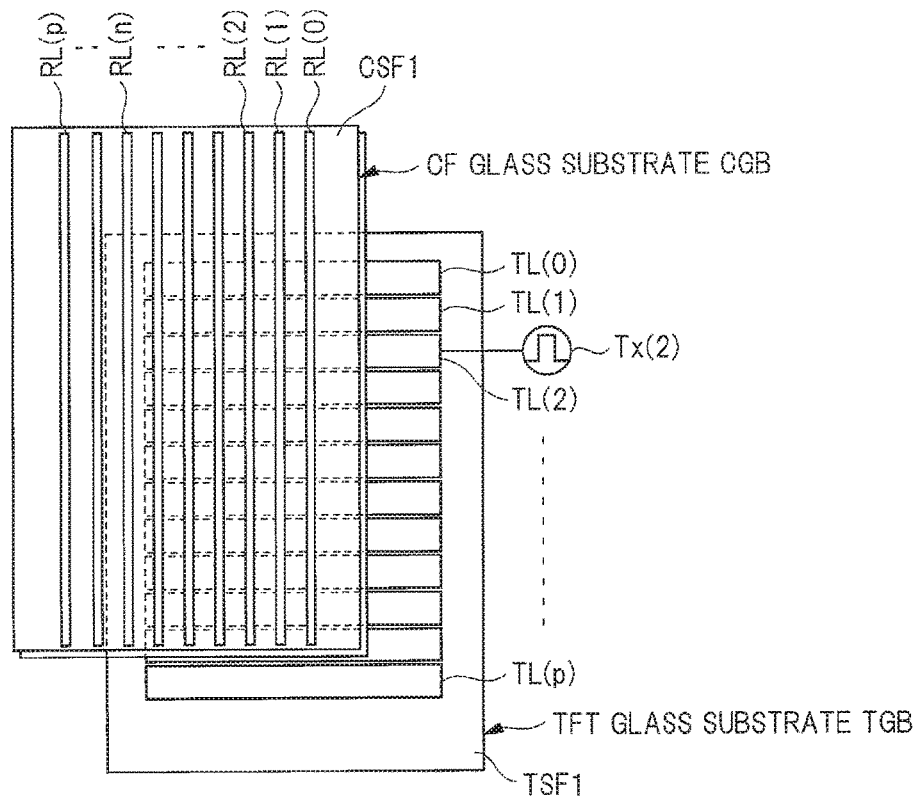
FIG. 4A is a plan view schematically illustrating a configuration of a display device according to an embodiment.
Figure 4B:
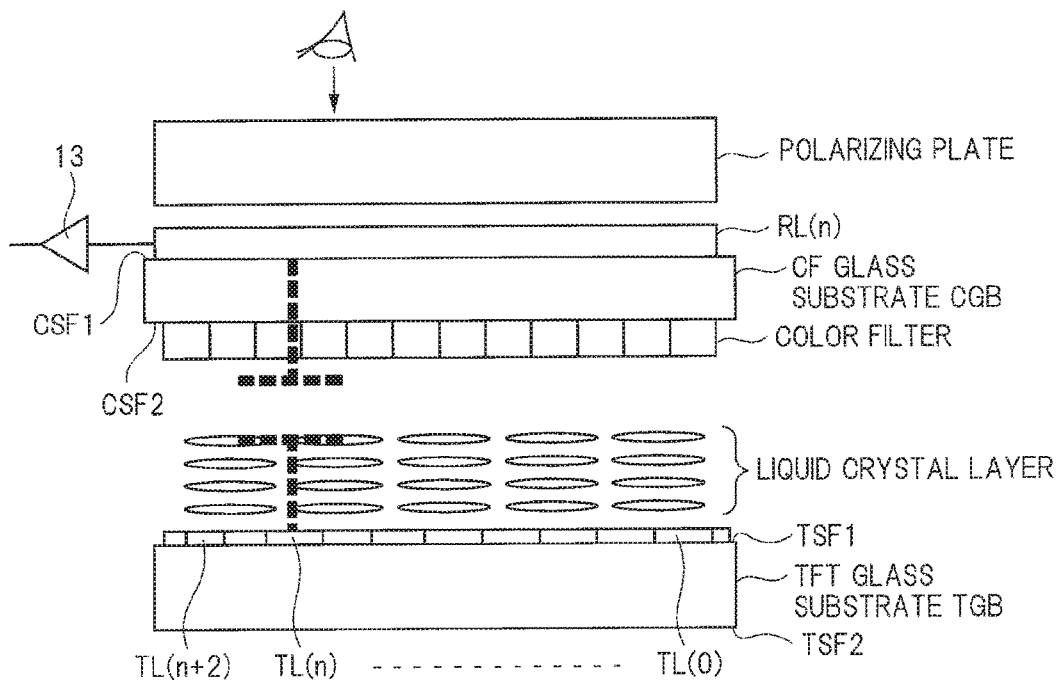
FIG. 4B is a cross-sectional view schematically illustrating a configuration of a display device according to an embodiment.

Next, the basic principle of the capacitive system will be described. Here, a description will be given by exemplifying a case of detecting touch by the finger using a signal wiring formed in the display device 1 illustrated in FIG. 1. That is, the description will be given regarding a case where the sensor plate of the capacitance system is integrated with the display device. First, the configuration of the display device 1 illustrated in FIG. 1 will be described in more detail. FIGS. 4A and 4B are diagrams schematically illustrating the configuration of the display device 1. Here, FIG. 4A is a plan view schematically illustrating a plane of the display device 1, and FIG. 4B is a cross-sectional view schematically illustrating a cross section of the display device 1.

In FIG. 4A, TL(0) to TL(p) represent drive electrodes which are configured using layers formed on a first main surface TSF1 of a TFT glass substrate TGB (first substrate). In addition, RL(0) to RL(p) represent detection electrodes which are configured using layers formed on a first main surface CSF1 of a CF glass substrate CGB (second substrate). The TFT glass substrate TGB is provided with the first main surface TSF1 and a second main surface TSF2 (FIG. 4B) which opposes the first main surface TSF1. Although a plurality of layers are formed on the first main surface TSF1 of the TFT glass substrate TGB, FIGS. 4A and 4B illustrate only the layers forming the drive electrodes TL(0) to TL(p).

Similarly, the CF glass substrate CGB is provided with the first main surface CSF1 and a second main surface CSF2 (FIG. 4B) which opposes the first main surface CSF1. FIGS. 4A and 4B illustrate only the layers forming the detection electrodes RL(0) to RL(p) arranged on the first main surface CSF1. FIG. 4A illustrates the TFT glass substrate TGB and the CF glass substrate CGB which are isolated from each other to facilitate the understanding. Specifically, the first main surface TSF1 of the TFT glass substrate TGB (first substrate) and the second main surface CSF2 of the CF glass substrate CGB (second substrate) are arranged to oppose each other with the liquid crystal layer sandwiched therebetween as illustrated in FIG. 4B.

Although the plurality of layers, the liquid crystal layer, and the like are sandwiched between the first main surface TSF1 of the TFT glass substrate TGB and the second main surface CSF2 of the CF glass substrate CGB, FIGS. 4A and 4B illustrate only the drive electrodes TL(0) to TL(n+2), the liquid crystal layer and the color filter which are sandwiched between the first main surface TSF1 and the second main surface CSF2. In addition, the plurality of detection electrodes RL(0) to RL(p) and a polarizing plate are arranged on the first main surface CSF1 of the CF glass substrate CGB as illustrated in FIG. 4A. FIG. 4B illustrates only a detection electrode RL(n) among the plurality of detection electrodes RL(0) to RL(p) as an example of the detection electrode.

In the present specification, the description is given a state when the display device 1 is viewed as a plain view from the first main surfaces CSF1 and TSF1 of the CF glass substrate CGB and the TFT glass substrate TGB side as illustrated in FIG. 4B. That is, the plan view is the state that is viewed from sides of the first main surfaces CSF1 and TSF1 of the CF glass substrate CGB and the TFT glass substrate TGB. Thus, it has been described that the detection electrode and the polarizing plate are arranged on the first main surface CSF1 of the CF glass substrate CGB side. But, the detection electrode and the polarizing plate are arranged on right, left or lower side of the CF glass substrate CGB, for example, when a direction of the viewing is changed. In FIG. 4B, numeral 13 represents an amplifier circuit which is connected to the detection electrode RL(n).

When seen in the plan view from the first main surface CSF1 and TSF1 sides, the drive electrodes TL(0) to TL(p) extend in a row direction (horizontal direction) and are arranged in parallel in a column direction (vertical direction) on the first main surface TSF1 of the TFT glass substrate TGB as illustrated in FIG. 4A. In addition, the detection electrodes RL(0) to RL(p) extend in the column direction (vertical direction) and are arranged in parallel the row direction (horizontal direction) on the first main surface CSF1 of the CF glass substrate CGB as illustrated in FIG. 4A.

As illustrated in FIG. 4B, the CF glass substrate CGB, the liquid crystal layer, and the like are sandwiched between the drive electrodes TL(0) to TL(p) and the detection electrodes RL(0) to RL(p). Thus, the drive electrodes TL(0) to TL(p) and the detection electrodes RL(0) to RL(p) cross each other when seen in the plan view, but are electrically isolated from each other. Since capacitance is present between the drive electrode and the detection electrode, this capacitance is illustrated in broken lines as a capacitive element in FIG. 4B. Incidentally, the drive electrodes TL(0) to TL(p) are isolated from each other, and the detection electrodes RL(0) to RL(p) are also isolated from each other.

A drive signal for display (display drive signal) is supplied to the drive electrodes TL(0) to TL(p) at a time of display, and a drive signal for touch detection is supplied thereto at a time of detecting the touch by the finger.

In the first embodiment, the detection of touch by the finger is performed using the electric field, and the detection of touch by the pen is performed using the magnetic field (see FIG. 1, FIGS. 2A and 2B, and FIGS. 3A and 3B). Thus, the detection of touch using the magnetic field will be referred to as magnetic field touch detection, and the detection of touch using the electric field will be referred to as electric field touch detection in the present specification. Although will be described later, the drive signal for touch detection is supplied to the drive electrodes TL(0) to TL(p) even at the time of magnetic field touch detection. Thus, a drive signal which corresponds to each of the display, the electric field touch detection, and the magnetic field touch detection is supplied to the drive electrodes TL(0) to TL(p) at each time of the display, the electric field touch detection, and the magnetic field touch detection. That is, the drive electrodes TL(0) to TL(p) are commonly used (shared) among the time of display, the time of electric field touch detection, and the time of magnetic field touch detection. Each of the drive electrodes TL(0) to TL(p) can be regarded as a common electrode when seen from the viewpoint of being commonly used.

A drive signal Tx for an electric field is supplied to the drive electrodes TL(0) to TL(p) in a period for the electric field touch detection. A signal whose voltage periodically changes is supplied as the drive signal Tx to the drive electrode selected so as to detect the touch, and a predetermined fixed voltage, for example, is supplied as the drive signal Tx to the drive electrode which is not selected so as not to detect the touch. The drive electrodes TL(0) to TL(p) are sequentially selected in this order, for example, in the electric field touch detection period. Although FIG. 4A illustrates a state in which the signal with the periodically changing voltage is supplied to the drive electrode TL(2) as a drive signal Tx(2), the drive electrodes are sequentially selected, for example, from the drive electrode TL(0) to TL(p), and the drive signal with the periodically changing voltage is supplied thereto.

On the other hand, the predetermined fixed voltage or a voltage in accordance with image information to be displayed is supplied to the drive electrodes TL(0) to TL(p) as the display drive signal in a period for the display.

Figure 5A:
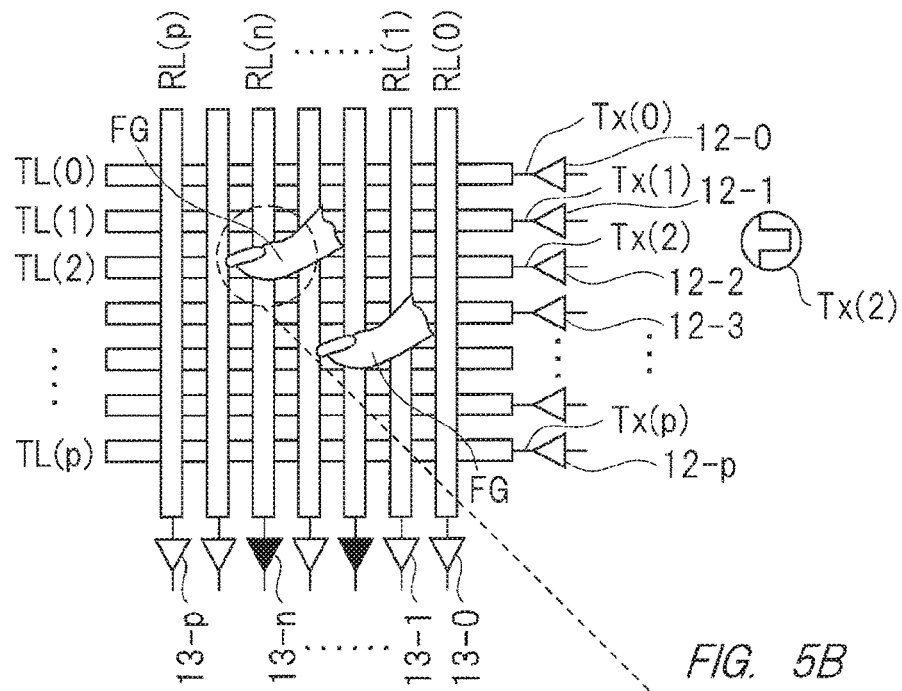
FIG. 5A is an explanatory diagram illustrating a principle of a capacitance system.
Figure 5B:
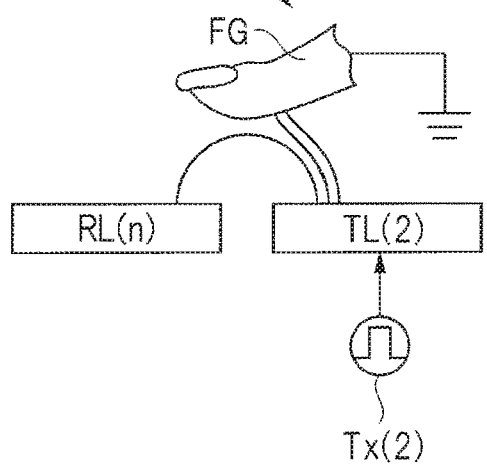
FIG. 5B is an explanatory diagram illustrating a principle of a capacitance system.
Figure 5C:
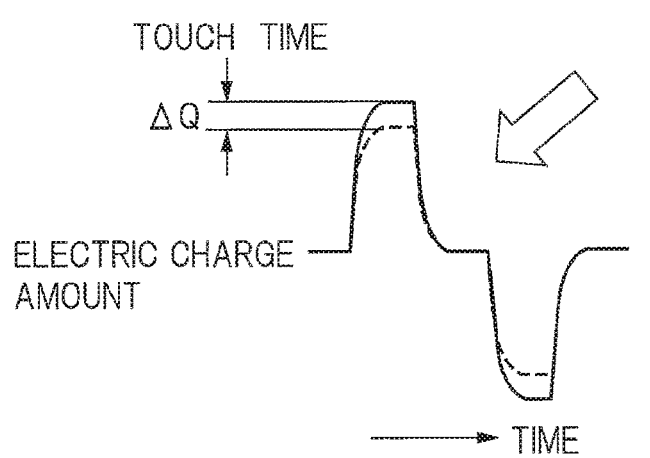
FIG. 5C is an explanatory diagram illustrating a principle of a capacitance system.

Next, a basic principle of the capacitive system will be described with reference to FIGS. 5A to 5C. In FIGS. 5A to 5C, reference signs TL(0) to TL(p) indicate the drive electrodes illustrated in FIGS. 4A and 4B, and reference signs RL(0) to RL(p) indicate the detection electrodes illustrated in FIGS. 4A and 4B. In FIG. 5A, the respective drive electrodes TL(0) to TL(p) extend in the row direction and are arranged in parallel in the column direction. Further, the respective detection electrodes RL(0) to RL(p) extend in the column direction and are arranged in parallel in the row direction so as to cross the drive electrodes TL(0) to TL(p). The liquid crystal layer and the like is arranged between the detection electrodes RL(0) to RL(p) and the drive electrodes TL(0) to TL(p) so that a gap is formed between the detection electrodes RL(0) to RL(p) and the drive electrodes TL(0) to TL(p) as illustrated in FIG. 4B.

In FIG. 5A, each of numerals 12-0 to 12-p schematically illustrates a unit drive electrode driver. In FIG. 5A, the drive signals Tx(0) to Tx(p) are outputted from the unit drive electrode driver 12-0 to 12-p. Further, each of numerals 13-0 to 13-p schematically illustrates a unit amplification circuit. In FIG. 5A, a pulse signal surrounded by ○ (circle) of a solid line indicates a waveform of the drive signal Tx to be supplied to the selected drive electrode. The finger is represented by numeral FG as an external proximity object in FIG. 5A.

The pulse signal is supplied from the unit drive electrode driver 12-2 to the drive electrode TL(2) as the drive signal Tx(2) in the example of FIG. 5A. When the drive signal Tx(2), which is the pulse signal, is supplied to the drive electrode TL(2), an electric field is generated between the drive electrode TL(2) and the crossing detection electrode RL(n) as illustrated in FIG. 5B. At this time, when the finger FG touches a position proximate to the drive electrode TL(2) of the liquid crystal panel, an electric field is also generated between the finger FG and the drive electrode TL(2), and the electric field generated between the drive electrode TL(2) and the detection electrode RL(n) is reduced. Accordingly, an electric charge amount between the drive electrode TL(2) and the detection electrode RL(n) is reduced. As a result, the electric charge amount generated in response to the supply of the drive signal Tx(2) is reduced by ΔQ at the time of the touch of the finger FG as compared to the time of the non-touch thereof as illustrated in FIG. 5C. A difference in electric charge amount is represented as a difference in voltage in the detection signal Rx(n), and is supplied to the unit amplification circuit 13-n and amplified.

Incidentally, a horizontal axis represents time, and a vertical axis represents the electric charge amount in FIG. 5C. The electric charge amount increases (increases in an upper side in FIG. 5C) in response to a rise in voltage of the drive signal Tx(2), and the electric charge amount increases (increases in a lower side in FIG. 5C) in response to a drop in voltage of the drive signal Tx(2). At this time, an increasing amount of electric charges is changed depending on absence or presence of the touch of the finger FG Further, reset is performed before the electric charge amount increases toward the lower side from after increasing toward the upper side, and reset is performed similarly before the electric charge amount increases toward the upper side from after increasing toward the lower side in FIG. 5C. In this manner, the electric charge amount is vertically changed with the reset electric charge amount as a reference. In other words, a signal change is generated in the detection electrode RL(n) in response to the touch.

When the drive electrodes TL(0) to TL(p) are sequentially selected and the drive signals Tx(0) to Tx(p) which are the pulse signals are supplied to the selected drive electrode, the detection signals Rx(0) to Rx(p), each of which has a voltage value in response to whether the finger FG touches the position proximate to each crossing portion between the selected drive electrode and the crossing plurality of detection electrodes RL(0) to RL(p), are outputted from each of the plurality of detection electrodes RL(0) to RL(p) crossing with the selected drive electrode. Each of the detection signals Rx(0) to Rx(p) is sampled, and is converted into a digital signal using an analog/digital conversion unit at a time at which a gap ΔQ is generated in the electric charge amount. A coordinate of the touched position can be extracted by performing a signal processing of the converted digital signal.

<Integrated Structure of Display Device and Sensor Plate-in Coil>

The present inventors have considered that an electronic device becomes costly in a case of separately preparing the display device 1 and the sensor plate as illustrated in FIG. 1 because the sensor plate is costly. Thus, the inventors have considered to form the coil L2 (FIG. 1) configuring the sensor plate using a layer of the display device 1, and to integrate the display device and the sensor plate.

Figure 6A:
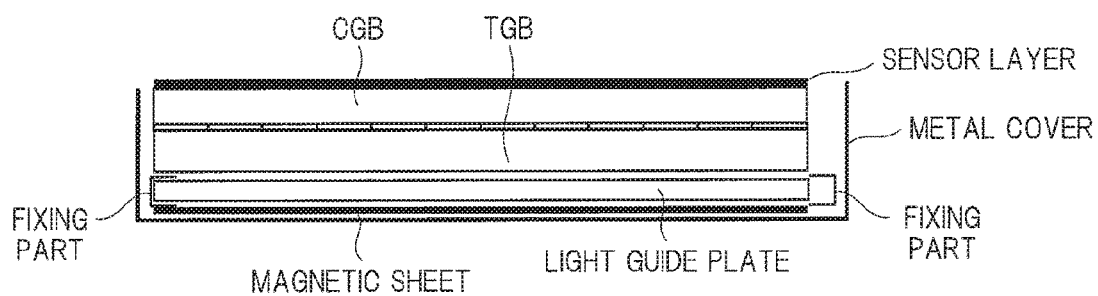
FIG. 6A is a cross-sectional view illustrating a schematic cross section of the display device.
Figure 6B:
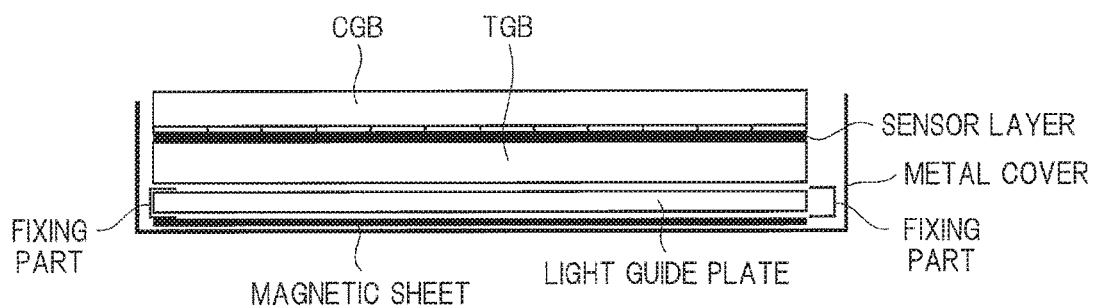
FIG. 6B is a cross-sectional view illustrating a schematic cross section of the display device.

FIGS. 6A and 6B are cross-sectional views illustrating schematic cross sections of the display device 1 with which the sensor plate is integrated as a sensor layer (layer). FIGS. 6A and 6B are similar to FIG. 1, and thus, a different point will mainly be described. In FIG. 1, the sensor plate is prepared separately from the display device 1, and the sensor plate is provided between the light guide plate and the magnetic sheet. On the contrary, the sensor layer is formed on the CF glass substrate CGB in FIG. 6A. In addition, the sensor layer is formed on the TFT glass substrate TGB in FIG. 6B. Accordingly, the sensor layer corresponding to the sensor plate is provided in the display device 1, and thus it is possible to suppress the increase of price.

As described in FIGS. 2A to 3B, the sensor plate-in coil L2 generates the magnetic field in the magnetic field generation period TGT, and the magnetic field generated by the pen-in coil L1 is detected by the sensor plate-in coil L2 in the magnetic field detection period TDT. That is, the sensor plate-in coil L2 is commonly used for generation of the magnetic field and detection of the magnetic field. In the case of being commonly used in this manner, the coil L2 is configured by the layer formed on the CF glass substrate CGB in FIG. 6A. Similarly, the coil L2 is configured by the layer formed on the TFT glass substrate TGB in FIG. 6B.

However, it is also possible to separately form the coil that generates the magnetic field in the magnetic field generation period TGT, and the coil that detects the magnetic field in the magnetic field detection period TDT. In this case, for example, the coil to generate the magnetic field (hereinafter, referred to also as a magnetic field generation coil) can be formed using the sensor layer illustrated in FIG. 6B, and the coil to detect the magnetic field (hereinafter, referred to also as a magnetic field detection coil) can be formed using the sensor layer illustrated in FIG. 6A. In addition, there are a plurality of layers that can be used as the sensor layer on the TFT glass substrate TGB. Thus, it is also possible to separately form the magnetic field generation coil and the magnetic field detection coil using the sensor layers illustrated in FIG. 6B.

Figure 7:
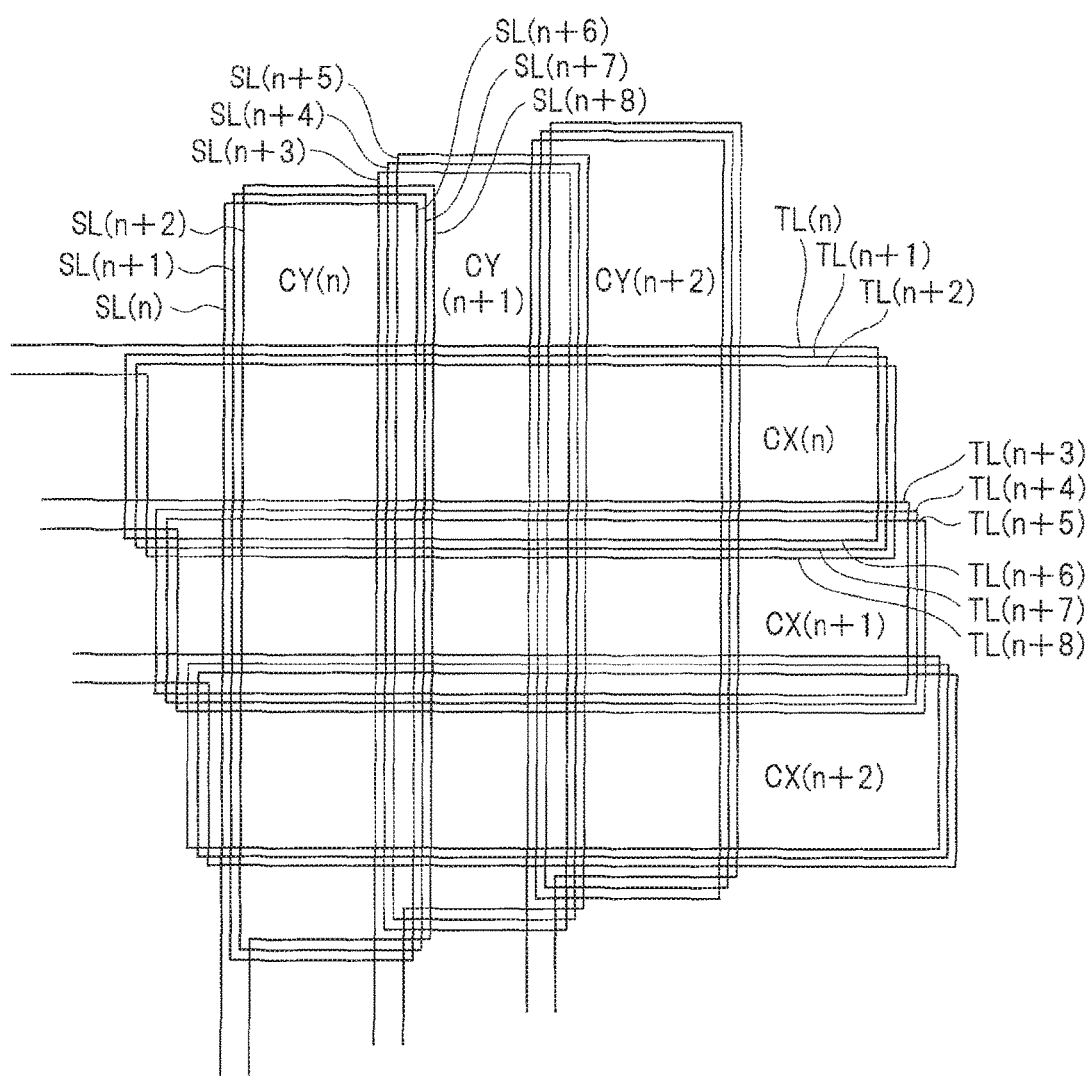
FIG. 7 is a plan view illustrating a magnetic field generation coil and a magnetic field detection coil.

FIG. 7 illustrates an example of the case of separately forming the magnetic field generation coil and the magnetic field detection coil. FIG. 7 illustrates the case where the magnetic field generation coil and the magnetic field detection coil are configured using the layers formed on the TFT glass substrate TGB. In FIG. 7, for example, CX(n) to CX(n+2) represent the magnetic field generation coils and CY(n) to CY(n+2) represent the magnetic field detection coils. In FIG. 7, the drive electrodes TL(0) to TL(p) described in FIGS. 4A and 4B are used as the layers forming the magnetic field generation coils, and signal lines SL(0) to SL(p) to transmit image information are used as the layers forming the magnetic field detection coil. Although will be described later, the signal lines SL(0) to SL(p) are configured using the layers formed on the TFT glass substrate TGB, similarly to the drive electrodes TL(0) to TL(p), extend in the horizontal direction and are arranged in parallel in the vertical direction in FIG. 7.

As illustrated in FIGS. 4A, 4B and 7, the drive electrodes TL(0) to TL(p) extend in the horizontal direction to be parallel to each other. As illustrated in FIG. 7, one end portion of each of the drive electrodes TL(n+1) and TL(n+2) and one end portion of each of the drive electrodes TL(n+6) and TL(n+7) are electrically connected, and the other end portion of each of the drive electrodes TL(n) to TL(n+2) and the other end portion of each of the drive electrodes TL(n+6) to TL(n+8) are electrically connected in the magnetic field generation period TGT. Accordingly, a coil CX(n) with a three-turn winding is formed as a winding by using the drive electrodes TL(n) to TL(n+2) and TL(n+6) to TL(n+8). In the same manner, it is possible to form three-turn-winding coils CX(n+1), CX(n+2) and so on by electrically connecting predetermined drive electrodes in the magnetic field generation period TGT.

Similarly, one end portion of each of the signal lines SL(n+1) and SL(n+2) and one end portion of each of the signal lines SL(n+6) and SL(n+7) are electrically connected, and the other end portion of each of the signal lines SL(n) to SL(n+2) and the other end portion of each of the signal lines SL(n+6) to SL(n+8) are electrically connected in the magnetic field detection period TDT. Accordingly, a coil CY(n) with a three-turn winding is formed as a winding by using the signal lines SL(n) to SL(n+2) and SL(n+6) to SL(n+8). In the same manner, it is possible to form three-turn-winding coils CY(n+1), CY(n+2) and so on by electrically connecting predetermined signal lines in the magnetic field detection period TDT.

The coils CX(n) to CX(n+2) and the coils CY(n) to CY(n+2) cross each other in electrically isolated states. For example, one end portion of the drive electrode TL(n) forming the coil CX(n) corresponds to the terminal PT illustrated in FIGS. 2A and 2B, and the output from the transmission amplifier AP1 illustrated in FIG. 1 is supplied thereto and the ground voltage Vss is supplied to the other end portion of the drive electrode TL(n+8) in the magnetic field generation period TGT. Accordingly, the magnetic field is generated in the coil CX(n) as described in FIG. 2A. Electric charges are stored in the capacitive element C (FIGS. 2A and 2B) inside the pen by the magnetic field generated in the coil CX(n).

In the magnetic field detection period TDT, predetermined signal lines are electrically connected, and the coils CY(n) to CY(n+2) are formed. The coil L1 (FIG. 1) generates the magnetic field using the electric charges stored in the capacitive element C inside the pen. The magnetic field generated at this time is detected by the coils CY(n) to CY(n+2). Accordingly, it is possible to detect the proximity of the pen or a distance between the pen and an area in close proximity thereto.

<Problem of Magnetic Field Generation Coil>

Figure 36:
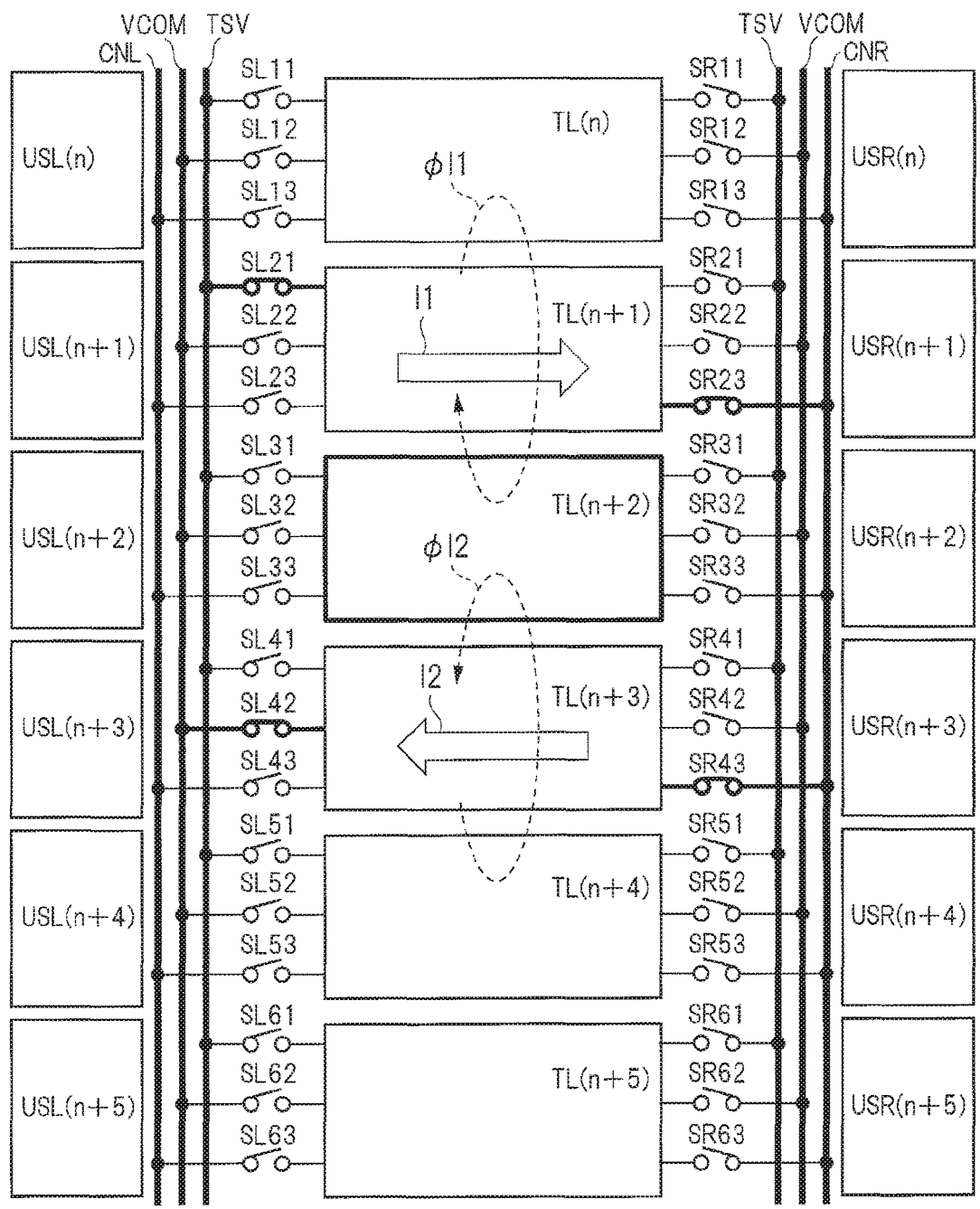
FIG. 36 is a block diagram illustrating a configuration of a display device that has been studied by the present inventors.
Figure 37:
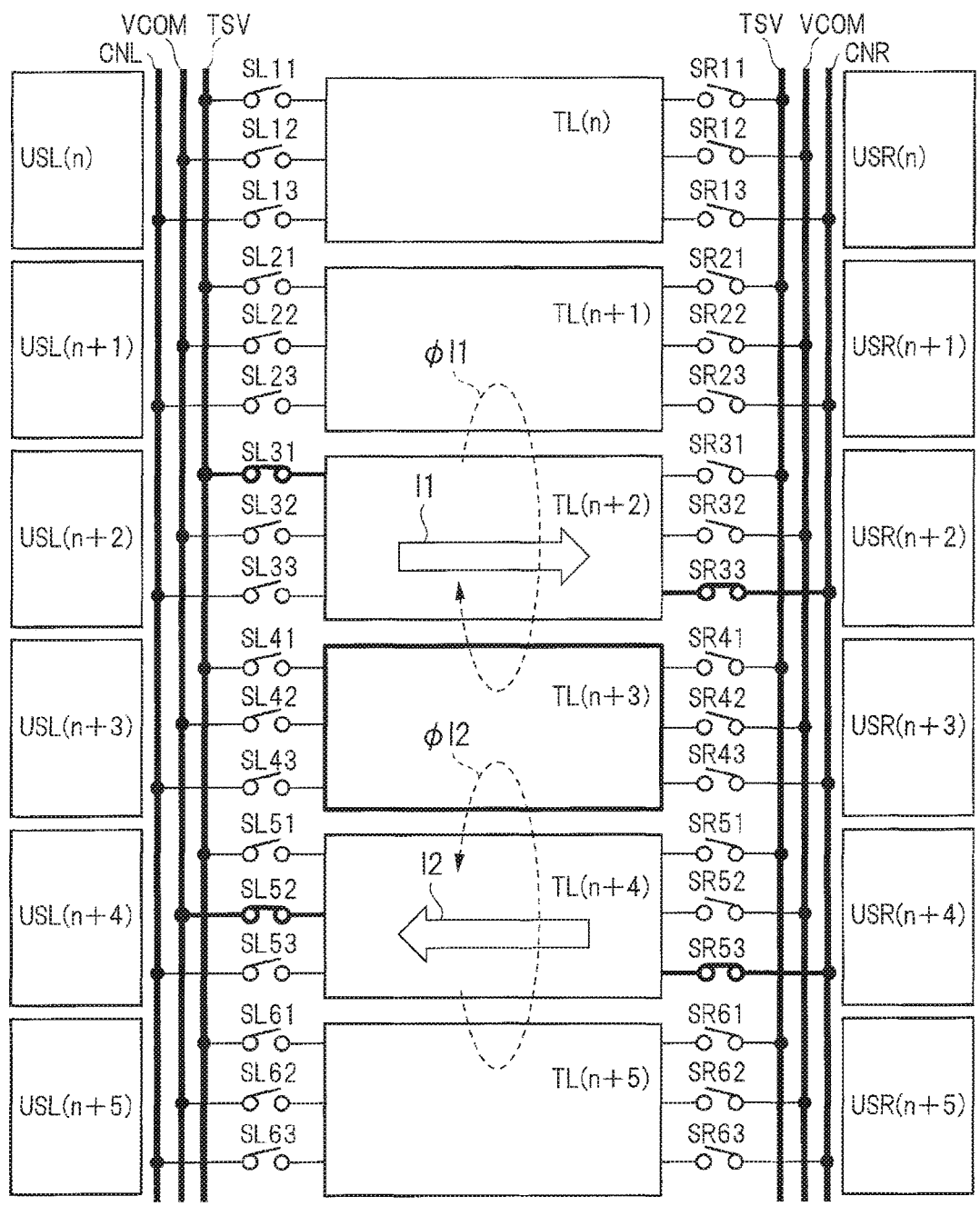
FIG. 37 is a block diagram illustrating a configuration of the display device that has been studied by the present inventors.

The present inventors have studied a configuration of a display device in a case of using a magnetic field generation coil in an electromagnetic induction system prior to the present invention. FIGS. 36 and 37 are block diagrams illustrating the configuration of the display device that has been previously studied by the present inventors. Here, the case of using a drive electrode as the magnetic field generation coil will be described as similar to FIG. 7.

In FIGS. 36 and 37, TL(n) to TL(n+5) represent the drive electrodes. In addition, each of USR(n) to USR(n+5) and USL(n) to USL(n+5) represents a unit drive circuit. In FIGS. 36 and 37, VCOM represents a voltage wiring that supplies the ground voltage Vss; TSV represents a signal wiring that supplies a drive signal TSVCOM with a periodically changing voltage; and CNR and CNL represent signal wirings which connect the drive electrodes to each other in the magnetic field generation period TGT.

In FIGS. 36 and 37, SL11 to SL13, SL21 to SL23, SL31 to SL33, SL41 to SL43, and SL51 to SL53 and SL61 to SL63 represent switches. The switches SL11 to SL13 are provided as a set of a first switch group and correspond to the drive electrode TL(n). Similarly, the switches SL21 to SL23 are provided as a set of the first switch group and correspond to the drive electrode TL(n+1); the switches SL31 to SL33 are provided as a set of the first switch group and correspond to the drive electrode TL(n+2); and the switches SL41 to SL43 are provided as a set of the first switch group and correspond to the drive electrode TL(n+3). In addition, the switches SL51 to SL53 are provided as a set of the first switch group and correspond to the drive electrode TL(n+4); and the switches SL61 to SL63 are provided as a set of the first switch group and correspond to the drive electrode TL(n+5).

The switches SL11, SL21, SL31, SL41, SL51 and SL61 among the switches forming the respective first switch groups are used as first switches, and each of the first switches is connected to the signal wiring TSV and one end portion of the corresponding drive electrode. In addition, the switches SL12, SL22, SL32, SL42, SL52 and SL62 among the switches forming the first switch groups are used as second switches, and each of the second switches is connected to the voltage wiring VCOM and one end portion of the corresponding drive electrode. Further, the switches SL13, SL23, SL33, SL43, SL53 and SL63 among the switches forming the first switch groups are used as third switches, and each of the third switches is connected to the signal wiring CNL and one end portion of the corresponding drive electrode.

In FIGS. 36 and 37, SR11 to SR13, SR21 to SR23, SR31 to SR33, SR41 to SR43, SR51 to SR53 and SR61 to SR63 also represent switches. The switches SR11 to SR13 are provided as a set of a second switch group and correspond to the drive electrode TL(n). Similarly, the switches SR21 to SR23 are provided as a set of the second switch group and correspond to the drive electrode TL(n+1); the switches SR31 to SR33 are provided as a set of the second switch group and correspond to the drive electrode TL(n+2); and the switches SR41 to SR43 are provided as a set of the second switch group and correspond to the drive electrode TL(n+3). In addition, the switches SR51 to SR53 are provided as a set of the second switch group and correspond to the drive electrode TL(n+4); and the switches SR61 to SR63 are provided as a set of the second switch group and correspond to the drive electrode TL(n+5).

Here, the switches SR11, SR21, SR31, SR41, SR51 and SR61 among the switches forming the respective second switch groups are used also as first switches, and each of the first switches is connected to the signal wiring TSV and the other end portion of the corresponding drive electrode. In addition, the switches SR12, SR22, SR32, SR42, SR52 and SR62 among the switches forming the second switch groups are used as second switches, and each of the second switches is connected to the voltage wiring VCOM and the other end portion of the corresponding drive electrode. Further, the switches SR13, SR23, SR33, SR43, SR53 and SR63 among the switches forming the second switch groups are used as third switches, and each of the third switches is connected to the signal wiring CNL and the one end portion of the corresponding drive electrode.

Each of the unit drive circuits USL(n) to USL(n+5) corresponds to each of the drive electrodes TL(n) to TL(n+5), and each of the unit drive circuits USR(n) to USR(n+5) also corresponds to each of the drive electrodes TL(n) to TL(n+5). Each of the unit drive circuits USL(n) to USL(n+5) and USR(n) to USR(n+5) controls the first switch group and the second switch group so that the magnetic field and the electric field are generated around the corresponding drive electrode at each time of magnetic field touch detection and electric field touch detection.

That is, in the case of generating the magnetic field in the corresponding drive electrode, the first switch group and the second switch group are controlled so that two drive electrodes, which are arranged with the corresponding drive electrode sandwiched therebetween, are selected. The coil is configured using the two selected drive electrodes, and the corresponding drive electrode is arranged at an inner side of the coil. Accordingly, the strong magnetic field is generated in the area of the corresponding drive electrode. On the other hand, in the case of generating the electric field around the corresponding drive electrode, the first switch group and the second switch group are controlled so that the corresponding drive electrode is selected.

<<Magnetic Field Touch Detection>>

A description will be given regarding an operation in a case of generating a magnetic field in an area of the drive electrode TL(n+2) at the time of magnetic field touch detection as follows. The drive electrodes TL(n+1) and TL(n+3) are drive electrodes that sandwich the drive electrode TL(n+2). The unit drive circuits USL(n+2) and USR(n+2), which correspond to the drive electrode TL(n+2), control the first switch groups (SL21, SL22, SL23) and (SL41, SL42, SL43) and the second switch groups (SR21, SR22, SR23) and (SR41, SR42, SR43). The respective first and second switch groups correspond to the drive electrodes TL(n+1) and TL(n+3) that sandwich the drive electrode TL(n+2).

That is, the unit drive circuit USL(n+2) turns the first switch SL21 and the second switch SL42 in the first switch groups (SL21, SL22, SL23) and (SL41, SL42, SL43) into an on-state (conductive state) and the remaining switches into an off-state (non-conductive state). In addition, the unit drive circuit USR(n+2) turns the third switches SR23 and SR43 in the second switch groups (SR21, SR22, SR23) and (SR41, SR42, SR43) into the on-state (conductive state) and the remaining switches into the off-state (non-conductive state).

Accordingly, one end portion of the drive electrode TL(n+1) is connected to the signal wiring TSV via the first switch SL21, and the other end portion of the drive electrode TL(n+1) is connected to the signal wiring CNR via the third switch SR23 as illustrated in FIG. 36. In addition, the one end portion of the drive electrode TL(n+3) is connected to the voltage wiring VCOM via the second switch SL42, and the other end portion of the drive electrode TL(n+3) is connected to the signal wiring CNR via the third switch SR43. As a result, the respective other end portions of the drive electrodes TL(n+1) and TL(n+3), which are arranged in parallel to the drive electrode TL(n+2) sandwiched therebetween, are electrically connected via the signal wiring CNR, thereby forming the coil having the drive electrode TL(n+2) at the inner side thereof.

In the case of the magnetic field touch detection, the ground voltage Vss is supplied to the voltage wiring VCOM, and the drive signal TSVCOM with the periodically changing voltage is supplied to the signal wiring TSV in the magnetic field generation period TGT. Accordingly, the drive signal TSVCOM is supplied to the one end portion of the drive electrode TL(n+1) as the magnetic field drive signal via the first switch SL21, and the ground voltage Vss is supplied to the one end portion of the drive electrode TL(n+3) via the second switch SL42. Accordingly, the magnetic field is generated by the magnetic field generation coil configured by the drive electrodes TL(n+1) and TL(n+3), and the strong magnetic field is formed around the drive electrode TL(n+2).

In FIG. 36, arrows I1, I2 indicate currents flowing to the drive electrodes TL(n+1) and TL(n+3) by the drive signal TSVCOM and directions thereof. When the current I1 flows, the drive electrode TL(n+1) generates a magnetic field in a direction indicated by a broken-line arrow φI1. The direction of the current I2 flowing to the drive electrode TL(n+3) is exactly opposite to the direction of the current I1, and thus the drive electrode TL(n+3) generates a magnetic field in a direction indicated by a broken-line arrow φI2. The magnetic field generated by the drive electrode TL(n+1) and the magnetic field generated by the drive electrode TL(n+3) are superimposed on each other around the drive electrode TL(n+2), thereby generating the strong magnetic field.

Incidentally, the first switch, the second switch, and the third switch in the first switch group and the second switch group, except for the first switch groups (SL21, SL22, SL23) and (SL41, SL42, SL43) and the second switch groups (SR21, SR22, SR23) and (SR41, SR42, SR43) described above, are turned into the off-state by the unit drive circuits except for the above-described unit drive circuits USL(n+2) and USR(n+2).

The unit drive circuits USL(n) to USL(n+5) are connected in series and each have a function of operating as a shift register. Similarly, the unit drive circuits USR(n) to USR(n+5) are also connected in series and each have a function of operating as the shift register. Selection information to select the drive electrode which generates the magnetic field is set to, for example, the unit drive circuits USL(n) and USR(n), and the selection information is sequentially shifted toward the unit drive circuits USL(n+5) and USR(n+5). The unit drive circuits at which the selection information arrive control the first switch group and the second switch group as described above, and perform the control so that the magnetic field is generated around the corresponding drive electrode. That is, FIG. 36 illustrates a state where the selection information arrives at the unit drive circuits USL(n+2) and USR(n+2).

FIG. 37 illustrates a state where the selection information arrives at the unit drive circuits USL(n+3) and USR(n+3) by the shift operation. An operation at the time when the selection information arrives at the unit drive circuits USL(n+3) and USR(n+3) is the same as the operation described with reference to FIG. 36, and thus will not be described.

In this manner, the drive electrode, which generates the strong magnetic field, is sequentially changed (moved) as the selection information is shifted.

<<Electric Field Touch Detection>>

Next, a description will be given regarding an operation in a case of electric field touch detection. Here, the description will be also given by exemplifying the drive electrode TL(n+2).

In the electric field touch detection, the unit drive circuits USL(n+2) and USR(n+2) control the first switch group and the second switch group which are different from those in the case of the magnetic field touch detection. That is, the first switch group (SL31, SL32, SL33) and the second switch group (SR31, SR32, SR33), which are connected to the corresponding drive electrode TL(n+2) that corresponds to the unit drive circuits USL(n+2) and USR(n+2), are controlled. In this case, the first switch SL31 in the first switch group (SL31, SL32, SL33) and the first switch SR31 in the second switch group (SR31, SR32, SR33) are turned into the on-state, and the second switches SL32 and SR32 and the third switches SL33 and SR33 are turned into the off-state.

The drive signal TSVCOM with the periodically changing voltage is supplied to the signal wiring TSV even in the electric field touch detection. Thus, the drive signal TSVCOM is supplied to the drive electrode TL(n+2) as the electric field drive signal from both end portions thereof via the first switches SL31 and SR31. At this time, the first switch, the second switch, and the third switch in the remaining first switch group and second switch group are turned in the off-state. Thus, the drive electrodes TL(n) to TL(n+1) and TL(n+3) to TL(n+5) are in a floating state.

When the selection information is shifted to the unit drive circuits USL(n+3) and USR(n+3) from the unit drive circuits USL(n+2) and USR(n+2) by the shift operation, the unit drive circuits USL(n+3) and USR(n+3) controls the first switch group and the second switch group, which are connected to the corresponding drive electrode TL(n+3), in the same manner as above. Accordingly, the drive signal TSVCOM is supplied to the drive electrode TL(n+3) as the electric field drive signal.

<<Problem>>

In the case of the magnetic field touch detection, it is required for forming the magnetic field generation coil that a plurality of drive electrodes arranged in parallel to each other are connected to the signal wiring (CNR or CNL) and the third switch, as described above. In addition, a switch group, which is connected to a drive electrode different from a drive electrode arranged in a generating area of a strong magnetic field, is controlled in this case. On the contrary, a switch group, which is connected to a drive electrode arranged in a generating area of an electric field, is controlled in the case of the electric field touch detection. Thus, a problem that the control becomes complicated occurs.

Further, there arises a problem of an increase in the occupied area of the drive circuit (control circuit) that performs the control.

<Overall Configuration of Display Device>

Figure 8:
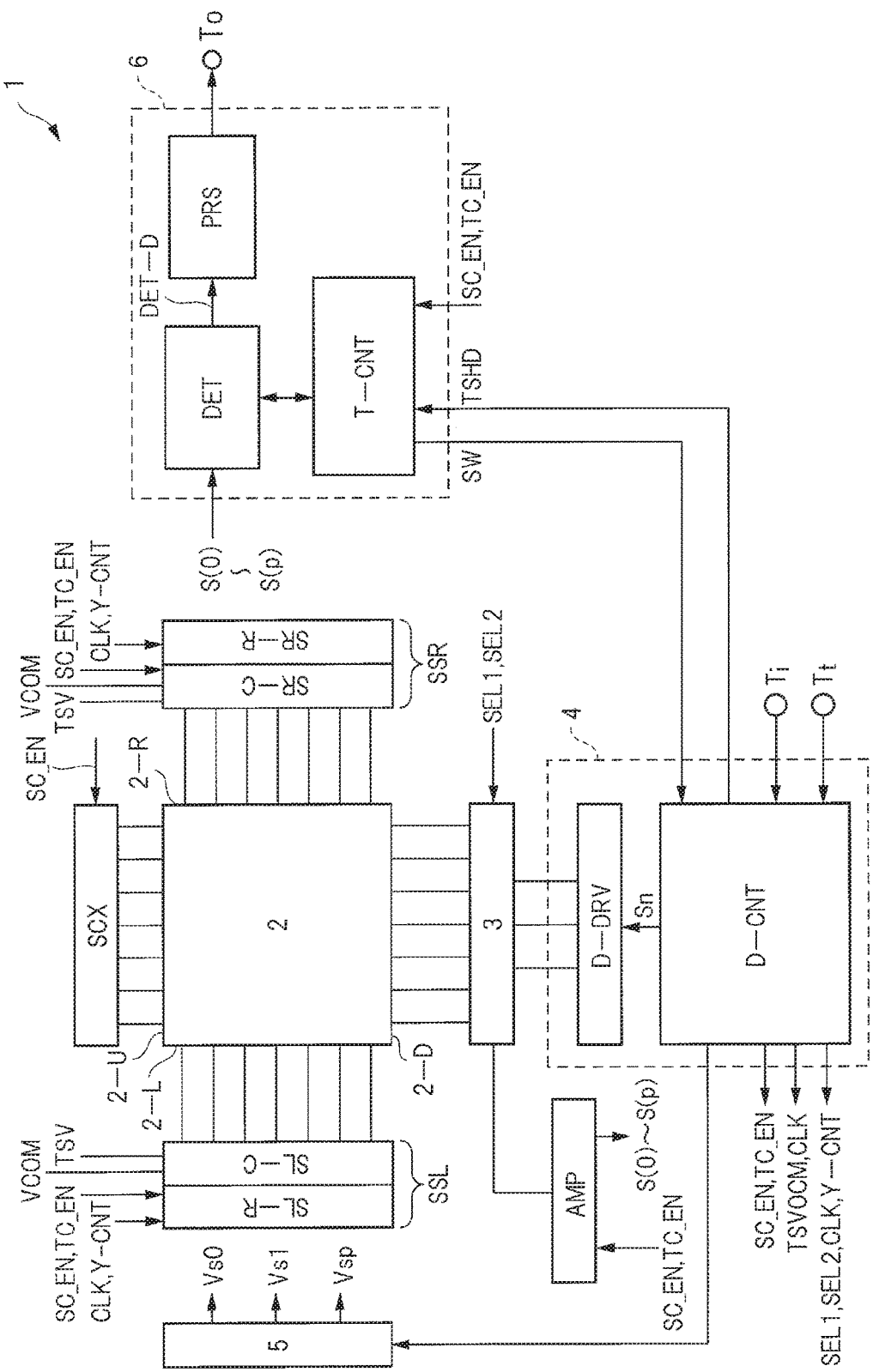
FIG. 8 is a block diagram illustrating a configuration of a display device according to a first embodiment.

FIG. 8 is a block diagram illustrating the configuration of the display device 1 according to the first embodiment. Here, a description will be given by exemplifying a case where the display device 1 is a liquid crystal display device although not particularly limited thereto. In FIG. 8, the display device 1 is provided with a display panel (liquid crystal panel) 2, a signal line selector 3, a display control device 4, a gate driver 5, and a touch control device 6. In addition, the display device 1 is provided with selection drive circuits (a first drive circuit and a second drive circuit) SSR and SSL, a switching regulator circuit SCX, and an amplifier circuit AMP. These devices and circuits provided in the display device 1 will be described later in detail, and so the overall overview will be described here.

The display panel 2 includes a pixel array LCD in which a plurality of pixels are arranged in a matrix form although will be described later with reference to FIG. 12. A plurality of signal lines, a plurality of drive electrodes, and a plurality of scan lines are arranged in the pixel array LCD. Here, the signal lines are arranged in respective columns of the pixel array LCD; the drive electrodes are arranged in rows of the pixel array LCD; and the plurality of scan lines are arranged in the respective rows of the pixel array LCD. When the description is given with reference to FIG. 8, the signal wirings extend in the vertical direction (column direction) and are arranged in parallel in the horizontal direction (row direction). Further, the drive electrodes extend in the horizontal direction and are arranged in parallel in the vertical direction. Further, the scan lines extend in the horizontal direction and are arranged in parallel in the vertical direction. In this case, the pixel is arranged in a portion at which the signal line and the scan line cross each other. The pixel is selected by the signal line and the scan line; a voltage of the signal line and a voltage (display drive signal) of the drive electrode at the time are applied to the selected pixel; and the selected pixel performs display according to a voltage gap between the signal line and the drive electrode in a period for the display (display period).

The display control device 4 is provided with a control circuit D-CNT and a signal line driver D-DRV. The control circuit D-CNT receives a timing signal supplied to an external terminal Tt, and image information supplied to an input terminal Ti; forms an image signal Sn according to the image information supplied to the input terminal Ti; and supplies the image signal Sn to the signal line driver D-DRV. The signal line driver D-DRV supplies the supplied image signal Sn to the signal line selector 3 in a time division manner in the display period. Further, the control circuit D-CNT receives the timing signal supplied to the external terminal Tt, and a control signal SW sent from the touch control device 6; and forms various types of control signals. The control signal to be formed by the control circuit D-CNT includes: selection signals SEL1 and SEL2 supplied to the signal line selector 3; a synchronization signal TSHD; a clock signal CLK; a magnetic field enable signal SC_EN; an electric field enable signal TC_EN; the drive signal TSVCOM; a control signal Y-CNT relating to the touch detection; a clock signal CLK; and the like.

Among the signals to be formed by the control circuit D-CNT, the magnetic field enable signal SC_EN is an enable signal indicating implementation of the magnetic field touch detection, and the electric field enable signal TC-EN is an enable signal indicating implementation of the electric field touch detection. In addition, the synchronization signal TSHD is a synchronization signal which identifies the period (display period), in which the display is performed in the display panel 2, and the period (touch detection period), in which the touch detection (the magnetic field touch detection and the electric field touch detection) is performed. The drive signal TSVCOM is a signal whose voltage periodically changes and which is supplied to the drive electrode as the magnetic field drive signal or the electric field drive signal in the touch detection period.

The signal line driver D-DRV supplies the image signal Sn to the signal line selector 3 in a time division manner according to the selection signals SEL1 and SEL2 in the display period. The signal line selector 3 is connected to the plurality of signal lines arranged in the display panel 2, and supplies the supplied image signal to a suitable signal line according to the selection signals SEL1 and SEL2 in the display period. The gate driver 5 forms scan line signals Vs0 to Vsp according to the timing signal sent from the control circuit D-CNT, and supplies the scan line signal to a scan line inside the display panel 2 in the display period. In the display period, a pixel, which is connected to a scan line to which a high-level scan line signal is supplied, is selected, and the selected pixel performs display according to the image signal supplied to the signal line at the time, thereby performing the display.

The touch control device 6 is provided with a detection circuit DET which receives sense signals S(0) to S(p); a processing circuit PRS which processes a detection signal DET-D sent from the detection circuit DET to extract a coordinate of a touched position; and a control circuit T-CNT. The control circuit T-CNT receives the synchronization signal TSHD, the magnetic field enable signal SC_EN, and the electric field enable signal TC_EN from the display control device 4, and performs control so that the touch control device 6 operates in synchronization with the display control device 4.

That is, the control circuit T-CNT performs control so that the detection circuit DET and the processing circuit PRS operate when the synchronization signal TSHD, the magnetic field enable signal SC_EN, and the electric field enable signal TC_EN indicate the touch detection. In addition, the control circuit T-CNT receives the detection signal from the detection circuit DET, forms the control signal SW, and supplies the control signal to the control circuit D-CNT. The processing circuit PRS outputs the extracted coordinate from an external terminal To as coordinate information.

The display panel 2 has sides 2-U and 2-D, which are parallel to the row of the pixel array LCD, and sides 2-R and 2-L which are parallel to the column of the pixel array LCD. Here, the side 2-U and the side 2-D are sides opposing each other, and are arranged so that the plurality of drive electrodes and the plurality of scan lines in the pixel array LCD are sandwiched between the two sides. In addition, the side 2-R and the side 2-L are also sides opposing each other and are arranged so that the plurality of signal lines in the pixel array LCD are sandwiched between these two sides.

The selection drive circuit SSR is arranged along the side 2-R of the display panel 2, and the selection drive circuit SSL is arranged along the side 2-L of the display panel 2. The selection drive circuit SSR is coupled with the plurality of drive electrodes arranged on the display panel 2 on the side 2-R of the display panel 2 side, and the selection drive circuit SSL is coupled with the plurality of drive electrodes arranged on the display panel 2 on the side 2-L of the display panel 2 side. That is, the selection drive circuits SSR and SSL are connected to the drive electrode arranged on the display panel 2 outside the display panel 2.

The selection drive circuit SSR is provided with a drive circuit SR-R and a selection circuit SR-C. The drive circuit SR-R is provided with a shift register having a plurality of shift stages, and selection information SEI is set to the shift register by the control signal Y-CNT. The set selection information SEI is sequentially shifted in synchronization with the clock signal CLK.

When the magnetic field touch detection is designated by the magnetic field enable signal SC_EN, the drive circuit SR-R forms and outputs a selection signal according to the selection information stored in the shift register. Although not particularly limited, the drive circuit SR-R forms two selection signals according to the selection information when the magnetic field touch detection is designated in the first embodiment. On the other hand, when the electric field touch detection is designated by the electric field enable signal TC_EN, the drive circuit SR-R also forms and outputs a selection signal according to the selection information stored in the shift register. Although not particularly limited, the drive circuit SR-R forms one selection signal according to the selection information when the electric field touch detection is designated in the first embodiment.

The selection circuit SR-C receives the selection signal from the drive circuit SR-R and connects the drive electrode, which is designated by the selection signal, to the signal wiring (magnetic field drive signal wiring) TSV and the voltage wiring (reference signal wiring) VCOM. That is, the drive electrode, which is designated by one selection signal from between the two selection signals, is connected to the signal wiring TSV, and the drive electrode designated by the other selection signal is connected to the voltage wiring VCOM at the time of magnetic field touch detection. On the other hand, the drive electrode designated by the single selection signal is connected to the signal wiring TSV at the time of electric field touch detection.

In the first embodiment, the ground voltage Vss is supplied to the voltage wiring VCOM at the time of magnetic field touch detection. In addition, the drive signal TSVCOM with the periodically changing voltage is supplied to the signal wiring TSV at each time of magnetic field touch detection and electric field touch detection. Thus, the drive signal TSVCOM is supplied to the drive electrode, which is designated by one selection signal from between the two selection signals, as the magnetic field drive signal via the selection circuit SR-C at the time of magnetic field touch detection. At this time, the ground voltage Vss is supplied to the drive electrode designated by the other selection signal via the selection circuit SR-C.

In addition, the drive signal TSVCOM is supplied to the drive electrode, which is designated by the selection signal, as the electric field drive signal via the selection circuit SR-C at the time of electric field touch detection.

The selection drive circuit SSL has the same configuration as the selection drive circuit SSR. That is, the selection drive circuit SSL is provided with a drive circuit SL-R and a selection circuit SL-C. The drive circuit SL-R is provided with a shift register having a plurality of shift stages, and the selection information SEI is set to the shift register by the control signal Y-CNT. The set selection information is sequentially shifted in synchronization with the clock signal CLK.

When the magnetic field touch detection is designated by the magnetic field enable signal SC_EN, the drive circuit SL-R forms and outputs a selection signal according to the selection information stored in the shift register. The drive circuit SL-R forms two selection signals according to the selection information when the magnetic field touch detection is designated. On the other hand, when the electric field touch detection is designated by the electric field enable signal TC_EN, the drive circuit SL-R also forms and outputs a selection signal according to the selection information stored in the shift register. However, the drive circuit SR-R forms one selection signal according to the selection information when the electric field touch detection is designated.

The selection circuit SL-C receives the selection signal from the drive circuit SL-R and connects the drive electrode, which is designated by the selection signal, to the signal wiring TSV and the voltage wiring VCOM. That is, the drive electrode, which is designated by one selection signal from between the two selection signals, is connected to the voltage wiring VCOM, and the drive electrode designated by the other selection signal is connected to the signal wiring TSV at the time of magnetic field touch detection. On the other hand, the drive electrode designated by the single selection signal is connected to the signal wiring TSV at the time of electric field touch detection.

Accordingly, the ground voltage Vss is supplied to the drive electrode, which is designated by the one selection signal from between the two selection signals via the selection circuit SL-C at the time of magnetic field touch detection. At this time, the drive signal TSVCOM is supplied to the drive electrode, which is designated by the other selection signal, as the magnetic field drive signal via the selection circuit SL-C.

In addition, the drive signal TSVCOM is supplied to the drive electrode, which is designated by the selection signal, as the electric field drive signal via the selection circuit SL-C at the time of electric field touch detection.

The selection drive circuit SSR and the selection drive circuit SSL are configured to operate in synchronization with each other. Although not particularly limited, the selection drive circuits SSR and SSL are configured to operate in a synchronized manner as the same clock signal CLK is supplied to the selection drive circuits SSR and SSL, and the same control signal Y-CNT is supplied to the selection drive circuits SSR and SSL in the first embodiment.

At the time of magnetic field touch detection, the drive electrode designated by the selection information in the selection drive circuit SSR is set to be the same as the drive electrode designated by the selection information in the selection drive circuit SSL. In other words, two drive electrodes among the plurality of drive electrodes are designated by the selection drive circuits SSR and SSL, respectively, at the time of magnetic field touch detection. In this case, the drive electrode, which is connected to the voltage wiring VCOM in the selection circuit SR-C, is connected to the signal wiring TSV in the selection circuit SL-C. In addition, the drive electrode, which is connected to the signal wiring TSV in the selection circuit SR-C, is connected to the voltage wiring VCOM in the selection circuit SL-C.

Accordingly, a current depending on a voltage change of the magnetic field drive signal (the drive signal TSVCOM) flows in each of the two designated drive electrodes, and the magnetic field is generated around each of the drive electrodes. In addition, directions of the respective currents are directly opposite to each other, and thus the magnetic fields formed by the respective drive electrodes are superimposed on each other in an area sandwiched by the two drive electrodes, thereby forming a strong magnetic field.

In addition, the same drive electrode is connected to the signal wiring TSV in each of the selection circuits SR-C and SL-C at the time of electric field touch detection. Thus, the electric field drive signal (the drive signal TSVCOM) is supplied to the designated drive electrode from both end portions thereof, and the electric field depending on the voltage change of the electric field drive signal is generated.

The switching regulator circuit SCX is arranged along the side 2-U of the display panel 2, and the switching regulator circuit SCX is coupled with the plurality of signal lines arranged in the display panel 2 on the side 2-U side. That is, the switching regulator circuit SCX is connected to the plurality of signal lines outside the display panel 2. Further, the amplifier circuit AMP is coupled with the plurality of signal lines arranged in the display panel 2 via the signal line selector 3 arranged along the side 2-D of the display panel 2.

When the magnetic field touch detection is designated by the magnetic field enable signal SC_EN, the switching regulator circuit SCX electrically connects predetermined signal lines arranged in the display panel 2 to each other. Accordingly, the signal lines, which is arranged in parallel to each other, are connected to each other on the side 2-U side, and thus a plurality of coils each of which has a one-turn winding using the signal line as a winding are formed. Each end portion of the plurality of coils is connected to the amplifier circuit AMP via the signal line selector 3 on the side 2-D side. The coil with the one-turn winding functions as the magnetic field detection coil. That is, a signal change is generated in the magnetic field detection coil configured using the signal line depending on the magnetic field generated by the pen in the magnetic field detection period TDT (FIGS. 2A and 2B). This signal change is supplied to the amplifier circuit AMP, amplified, outputted as the sense signals S(0) to S(p), and supplied to the detection circuit DET.

In addition, since the signal lines are not connected to each other via the switching regulator circuit SCX at the time of electric field touch detection, the amplifier circuit AMP amplifies the signal change of the signal line, which changes depending on presence or absence of touch by the finger, and supplies the amplified signal change to the detection circuit DET as the sense signals S(0) to S(p).

The detection circuit processes the supplied sense signals S(0) to S(p) and supplies the processed sense signals to the processing circuit PRS. Accordingly, the presence or absence of touch by the finger, a coordinate of the touch, the pen pressure, and the like are obtained by the processing circuit PRS and outputted from the external terminal To at the time of magnetic field touch detection. In addition, the presence or absence of touch by the finger, the coordinate of the touch, and the like are obtained by the processing circuit PRS and outputted from the external terminal To at the time of electric field touch detection.

The description has been given regarding the case where the magnetic field detection coil has the one-turn winding herein, the invention is not limited thereto. However, three or more signal lines may be connected in series by providing the same function as the switching regulator circuit SCX in the amplifier circuit AMP to form a coil which has a winding with one and half turns or more.

<Module Configuration of Display Device 1>

Figure 9:
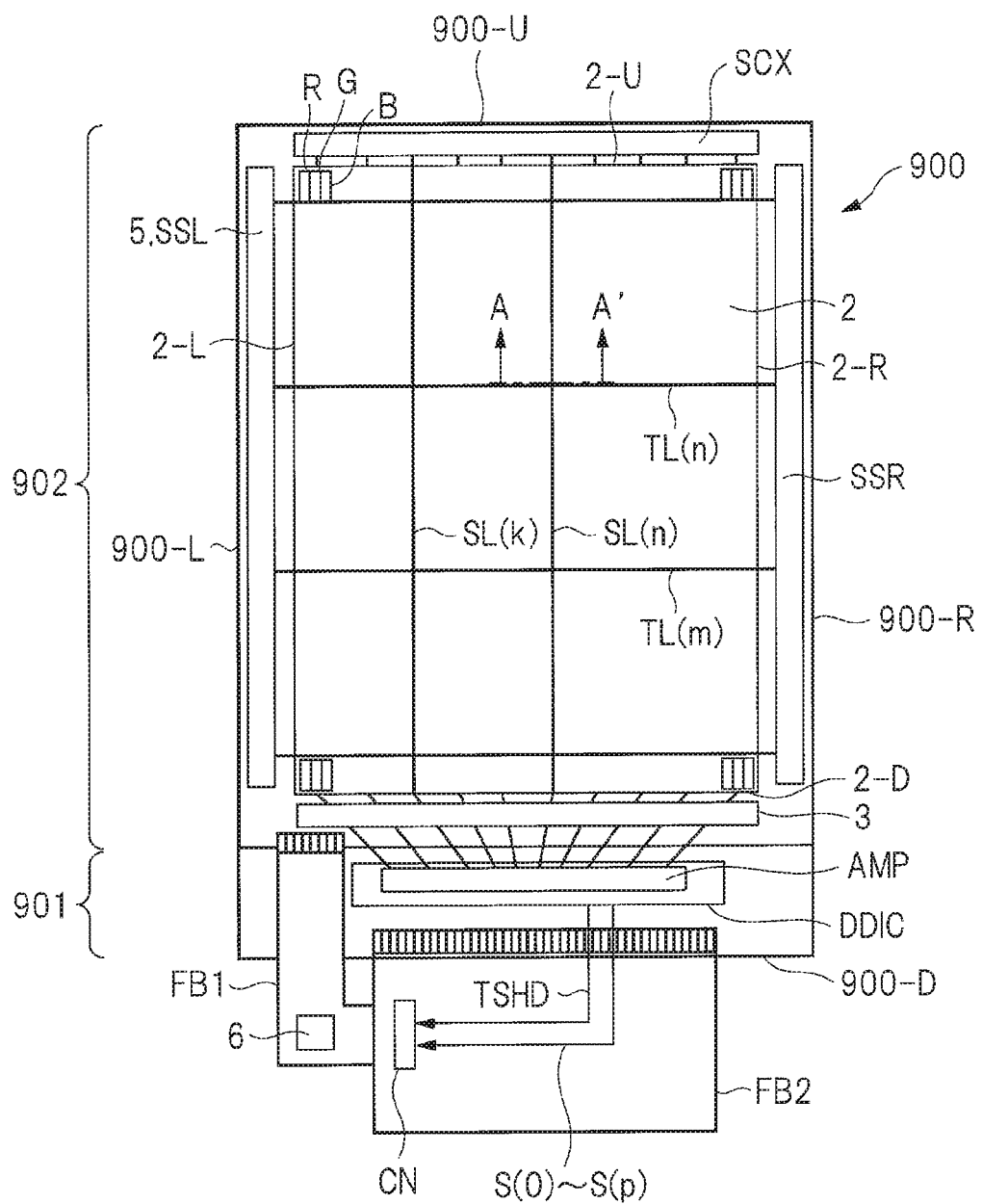
FIG. 9 is a plan view illustrating a configuration of a module of the display device according to the first embodiment.

FIG. 9 is a schematic plan view illustrating an overall configuration of a module 900 to which the display device 1 is mounted. FIG. 9 is drawn in accordance with actual arrangement although being schematic. In FIG. 9, reference numeral 901 represents an area in the TFT glass substrate TGB illustrated in FIGS. 4A and 4B, and reference numeral 902 represents an area having the TFT glass substrate TGB and the CF glass substrate CGB illustrated in FIGS. 4A and 4B. The TFT glass substrate TGB is integrated with the module 900. That is, the TFT glass substrate TGB is common to the area 901 and the area 902, and the CF glass substrate CGB and the like is further formed on an upper surface of the TFT glass substrate TGB in the area 902 as illustrated in FIGS. 4A and 4B.

In FIG. 9, numeral 900-U represents a short side of the module 900, and numeral 900-D represents a side of the module 900, that is, a short side opposing the short side 900-U. Further, numeral 900-L represents a long side of the module 900, and numeral 900-R represents a side of the module 900, that is, a long side opposing the long side 900-L.

The gate driver 5 and the selection drive circuit SSL illustrated in FIG. 8 are arranged in an area sandwiched between the side 2-L of the display panel 2 and the long side 900-L of the module 900 in the area 902. In addition, the selection drive circuit SSR illustrated in FIG. 8 is arranged in an area sandwiched between the side 2-R of the display panel 2 and the long side 900-R of the module 900 in the area 902. The switching regulator circuit SCX illustrated in FIG. 8 is arranged in an area sandwiched between the side 2-U of the display panel 2 and the short side 900-U of the module 900.

In addition, the signal line selector 3, the amplifier circuit AMP, and a drive semiconductor device DDIC illustrated in FIG. 8 are arranged in an area sandwiched between the side 2-D of the display panel 2 and the short side 900-D of the module 900.

In the first embodiment, the signal line driver D-DRV and the control circuit D-CNT illustrated in FIG. 8 are built in a single semiconductor device. In the present specification, this single semiconductor device is illustrated as the drive semiconductor device DDIC. Further, the touch control device 6 illustrated in FIG. 8 is also built in the single semiconductor device. In the present specification, the semiconductor device with the built-in touch control device 6 is referred to also as a touch semiconductor device 6 to be distinguished from the drive semiconductor device DDIC. Of course, each of the drive semiconductor device DDIC and the touch semiconductor device 6 may be configured using a plurality of semiconductor devices. In addition, the amplifier circuit AMP may be built in the drive semiconductor device DDIC, for example.

In the first embodiment, the amplifier circuit AMP is arranged in the area 901 and is configured by wirings and parts formed on the TFT glass substrate TGB in the area 901. The part includes, for example, a thin film transistor (hereinafter, referred to also as the TFT transistor). In addition, the drive semiconductor device DDIC is mounted to the TFT glass substrate so as to cover the amplifier circuit AMP when seen in a plan view. Accordingly, it is possible to suppress an increase of a lower frame of the display panel 2.

In addition, parts forming the selection drive circuits SSL and SSR and the switching regulator circuit SCX are also formed on the TFT glass substrate TGB in the area 902.

In FIG. 9, numerals FB1 and FB2 represent flexible cables. Although not particularly limited, the touch semiconductor device 6 is mounted to the flexible cable FB1, and a connector CN is mounted to the flexible cable FB2. The sense signals S(0) to S(p) described in FIG. 8 are supplied from the amplifier circuit AMP to the touch semiconductor device 6 via the connector CN. Further, transmission and reception of signals are performed between the touch semiconductor device 6 and the drive semiconductor device DDIC via the connector CN. The synchronization signal TSHD is drawn in FIG. 9 as an example of the signal to be transmitted and received.

As already described above, the display panel 2 includes the pixel array in which the plurality of pixels are arranged in the matrix form. The pixel array is provided with the plurality of drive electrodes TL(0) to TL(p) and the scan lines GL(0) to GL(p) arranged along the row of the array, and the plurality of signal lines SL(0) to SL(p) arranged along the column of the array. FIG. 9 illustrates two drive electrodes TL(n) and TL(m) and two signal lines SL(k) and SL(n), for example. Incidentally, FIG. 9 does not illustrate the scan line. The pixel is arranged at each crossing portion of the signal lines SL(0) to SL(p) and the scan lines or the drive electrodes TL(0) to TL(p). Reference signs R, G and B, which are indicated on the four sides of the display panel 2 illustrated in FIG. 9, represent pixels corresponding to three primary colors.

Figure 10:
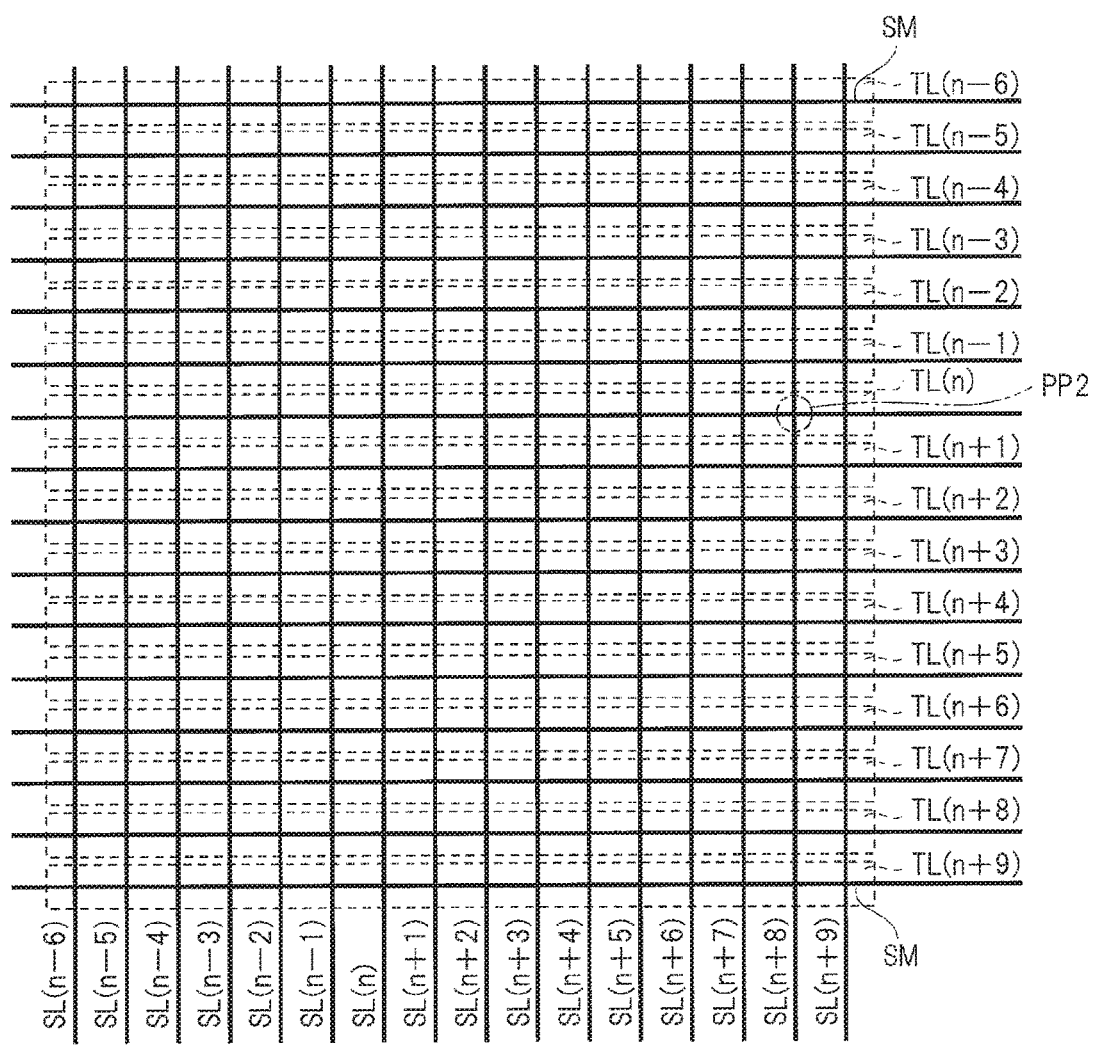
FIG. 10 is a plan view illustrating a configuration of a display panel of the display device according to the first embodiment.

FIG. 10 is a plan view illustrating a relationship between the drive electrode and the signal line provided in the display panel 2. Although the display panel 2 includes the drive electrodes TL(0) to TL(p) and the signal lines SL(0) to SL(p), some of the drive electrodes and the signal lines are exemplified as drive electrodes TL(n–6) to TL(n+9) and signal lines SL(n–6) to SL(n+9) in FIG. 10. Incidentally, FIG. 10 does not illustrate the scan line.

When the drive electrode is described by exemplifying the drive electrodes TL(n–6) to TL(n+9) illustrated in FIG. 10, each of the drive electrodes includes a first electrode and a plurality of second electrodes connected to the first electrode. Here, the first electrode is, for example, a transparent electrode, and the second electrode is an electrode which has a lower sheet resistance than the first electrode. In FIG. 10, one second electrode among the plurality of second electrodes, which are provided in each of the drive electrodes, is illustrated as an auxiliary electrode SM. Incidentally, reference sign SM is attached to only the auxiliary electrodes provided in the drive electrodes TL(n–6) and TL(n+9) in FIG. 10 to prevent the drawing from being complicated.

The auxiliary electrode SM also extends in the row direction of the array, similarly to the first electrode (transparent electrode) forming the drive electrode, and is electrically connected to the first electrode. Accordingly, reduction of combined resistance (impedance) of the drive electrode, which is provided with the first electrode and the auxiliary electrode (second electrode), is achieved. In the present specification, the first electrode (transparent electrode) and the second electrode (auxiliary electrode SM) connected to the first electrode are collectively referred to as the drive electrode unless otherwise specified.

<Structure of Display Panel>

Figure 11:
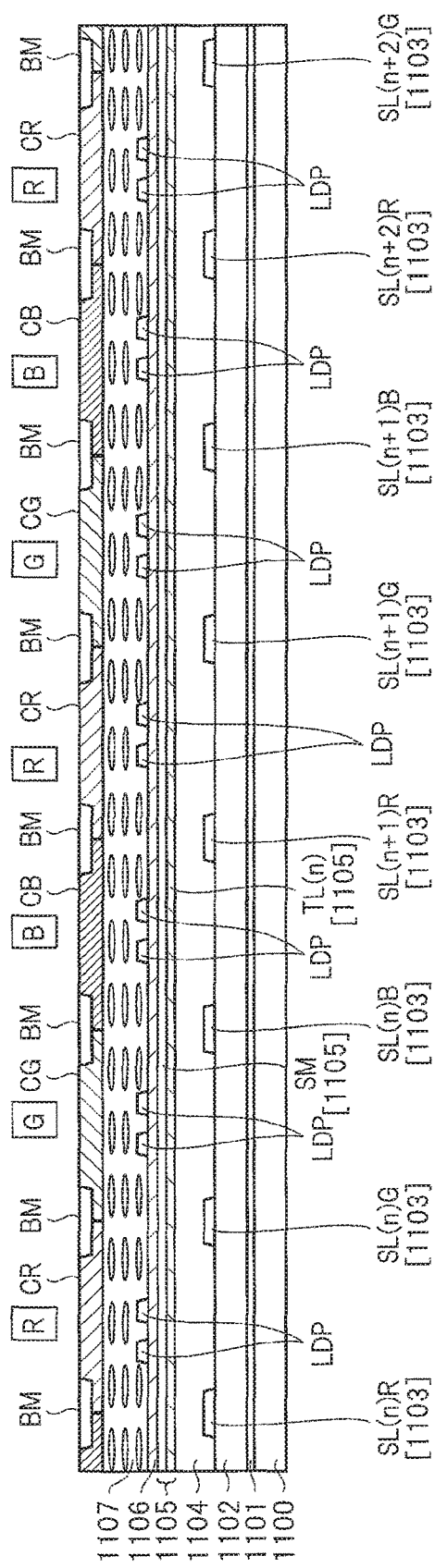
FIG. 11 is a cross-sectional view illustrating a configuration of the display device according to the first embodiment.

FIG. 11 is a cross-sectional view illustrating a configuration of the display panel 2 included in the display device 1 according to the first embodiment. When seen from the viewpoint of display, an area (first area) inside the display panel 2 is an area which is active (active area) and is a display area where the display is performed. On the other hand, an area (second area) outside the display panel 2 is an area where the display is not performed, and can be regarded as an area which is non-active (non-active area) or a peripheral area. When the description is given by exemplifying FIG. 9, the active area is an area surrounded by the sides 2-U, 2-D, 2-R and 2-L of the display panel 2.

FIG. 11 illustrates an A-A' cross section of the display panel 2 illustrated in FIG. 9. In this first embodiment, one color pixel is displayed using three pixels corresponding, respectively, to the three primary colors of R (red), G (green)

and B (blue) in order to perform color display. That is, the one color pixel can be regarded as being configured using three subpixels. In this case, a signal line that transfers a color image signal in the display period is configured using three signal lines. FIG. 11 illustrates the example of performing color display to illustrate a specific structure of the display panel 2.

Reference signs of the signal lines used in FIG. 11 will be described prior to describing FIG. 11. Each of the signal lines SL(0) to SL(p) represents the signal line that transfers the color image signal in the display period. Each of the signal lines includes three signal lines that transfer the image signal to three subpixels. FIG. 11 distinguishes the three signal lines by attaching an alphabetical character of the corresponding subpixel next to the reference sign of the signal line. When the signal line SL(n) is exemplified, the signal line SL(n) includes signal lines SL(n)R, SL(n)G and SL(n)B. Here, the alphabetical character R attached next to the reference sign SL(n) represents the signal line that transfers the image signal to the subpixel corresponding to the red (R) of the three primary colors in the display period. The alphabetical character G attached next to the reference sign SL(n) represents the signal line that transfers the image signal to the subpixel corresponding to the green (G) of the three primary colors. The alphabetical character B attached next to the reference sign SL(n) represents the signal line that transfers the image signal to the subpixel corresponding to the blue (B) of the three primary colors.

In FIG. 11, numeral 1100 represents a TFT glass substrate (TGB in FIGS. 4A and 4B). A first wiring layer (metal wiring layer) 1101 is formed on the TFT glass substrate 1100. A scan line GL(n) is configured using a wiring formed on the first wiring layer 1101. An insulating layer 1102 is formed on the first wiring layer 1101, and second wiring layers (metal wiring layers) 1103 are formed on the insulating layer 1102. The signal lines SL(n)R, SL(n)G and SL(n)B, signal lines SL(n+1)R, SL(n+1)G and SL(n+1)B and signal lines SL(n+2)R and SL(n+2)G are configured using the wirings formed in the second wiring layers 1103. In FIG. 11, in order to indicate that these signal lines are configured by the second wiring layers 1103, reference numeral 1103 representing the second wiring layer is described in [ ] next to the reference signs of the signal lines. For example, the signal line SL(n)G is indicated by SL(n)G[1103].

An insulating layer 1104 is formed on the second wiring layers 1103, and a third wiring layer (metal wiring layer) 1105 is formed on the insulating layer 1104. The drive electrode TL(n) and the auxiliary electrode SM are configured using wirings formed on the third wiring layer 1105. Here, the drive electrode TL(n) is the transparent electrode (first electrode). Further, the auxiliary electrode SM (second electrode) has a lower resistance value than the drive electrode TL(n), and is formed to be electrically connected to the drive electrode TL(n). A resistance value of the drive electrode TL(n), which is the transparent electrode, is relatively high, but it is possible to reduce the combined resistance by electrically connecting the auxiliary electrode SM to the drive electrode TL(n). Here, [1105], which is attached to the reference signs of the drive electrode and the auxiliary electrode, also indicates that the electrodes are configured using the third wiring layer 1105.

An insulating layer 1106 is formed on the third wiring layer 1105, and pixel electrodes LDP are formed on a top surface of the insulating layer 1106. In FIG. 11, each reference sign of CR, CB and CG represents the color filter. A liquid crystal layer 1107 is sandwiched between the color filters CR (red), CG (green) and CB (blue) and the insulating layer 1106. Here, the pixel electrode LDP is provided at a crossing point between the scan line and the signal line, and the color filter CR, CG or CB corresponding to each of the pixel electrodes LDP is provided above each of the point pixel electrodes LDP. A black matrix BM is provided among the respective color filters CR, CG and CB.

In addition, the CF glass substrate CGB is formed on the color filters CR, CG and CB as illustrated in FIGS. 4A, 4B, 6A and 6B although not illustrated in FIG. 11. Further, the detection electrodes RL(0) to RL(p) and the polarizing plate are formed on the CF glass substrate CGB as illustrated in FIGS. 4A and 4B.

<Pixel Array>

Next, a description will be given regarding a circuit configuration of the display panel 2. FIG. 12 is a circuit diagram illustrating the circuit configuration of the display panel 2 illustrated in FIGS. 8 and 9. Also in FIG. 12, the signal line is represented in the same display format as that of FIG. 11. In FIG. 12, each one of a plurality of reference signs SPix, which is illustrated by one-dot chain line, represents one liquid crystal display element (subpixel). The subpixels SPix are arranged in a matrix form in the display panel 2, and configures a liquid crystal element array (the pixel array) LCD. The pixel array LCD is provided with the plurality of scan lines GL(0) to GL(p) arranged in the respective rows and extending in the row direction, and the signal lines SL(0)R, SL(0)G, SL(0)B to SL(p)R, SL(p)G and SL(p)B arranged in the respective columns and extending in the column direction. In addition, the pixel array LCD includes the drive electrodes TL(0) to TL(p) arranged in the respective rows and extending in the row direction.

Figure 12:
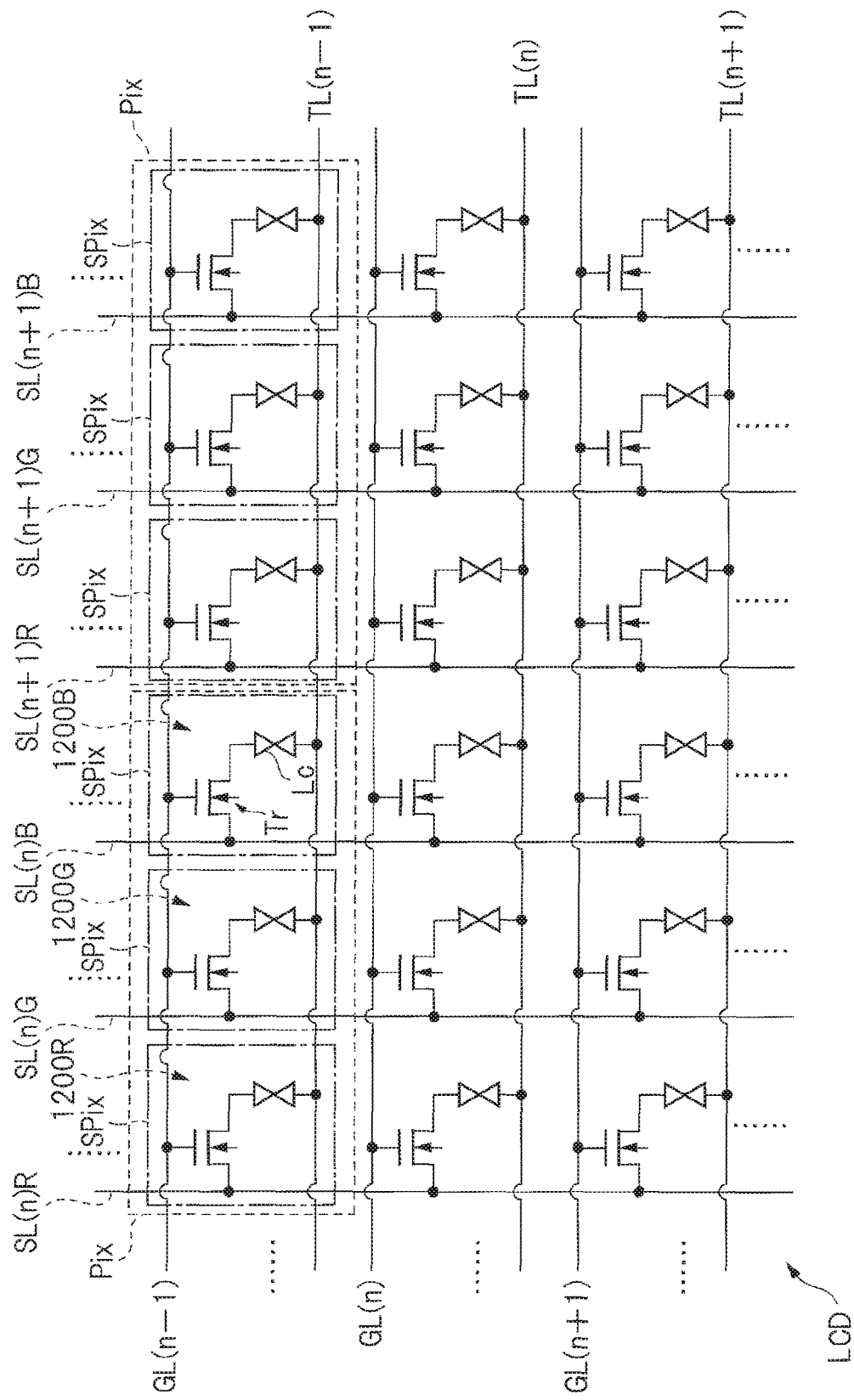
FIG. 12 is a circuit diagram illustrating a circuit configuration of the display panel of the display device according to the first embodiment.

FIG. 12 illustrates only a part of the pixel array relating to scan lines GL(n−1) to GL(n+1), the signal lines SL(n)R, SL(n)G, SL(n)B to SL(n+1)R, SL(n+1)G and SL(n+1)B, and drive electrodes TL(n−1) to TL(n+1). To make the description easy in FIG. 12, the drive electrodes TL(n−1) to TL(n+1) is shown to be arranged in the respective rows, but one drive electrode may be arranged with respect to a plurality of rows.

Each of the subpixels SPix, which are arranged at crossing points among the row and the column of the pixel array LCD, is provided with a TFT transistor Tr formed on the TFT glass substrate 1100 and a liquid crystal element LC of which one terminal is connected to a source of the TFT transistor Tr. In the pixel array LCD, gates of the TFT transistors Tr of the plurality of subpixels SPix arranged in the same row are connected to the scan line arranged in the same row, and drains of the TFT transistors Tr of the plurality of subpixels SPix arranged in the same column are connected to the signal line arranged in the same column. In other words, the plurality of subpixels SPix are arranged in the matrix form; the scan lines are arranged in the respective rows; and the plurality of subpixels SPix arranged in the corresponding row are connected to the scan line. Further, the signal lines are arranged in the respective columns, and the subpixels SPix arranged in the corresponding column are connected to the signal line. Further, the other ends of the liquid crystal elements LC of the plurality of subpixels SPix arranged in the same row are connected to the drive electrode arranged in the row.

When the description is given with the example illustrated in FIG. 12, the respective gates of the TFT transistors Tr of the plurality of subpixels SPix arranged on an uppermost row are connected to the scan line GL(n−1) arranged in the uppermost row in FIG. 12. Further, the respective drains of the TFT transistors Tr of the plurality of subpixels SPix arranged in a leftmost column are connected to the signal line SL(n)R arranged in the leftmost column in FIG. 12. Further, the respective other ends of the liquid crystal elements LC of the plurality of subpixels SPix arranged in the uppermost row are connected to the drive electrode TL(n−1) arranged in the uppermost row in FIG. 12.

As described above, the single subpixel SPix corresponds to one of the three primary colors. Accordingly, the three primary colors of R, G and B are configured using the three subpixels SPix. In FIG. 12, one color pixel Pix is formed using the three subpixels SPix, which are successively arranged in the same row, and color is expressed by the relevant pixel Pix. That is, the subpixel SPix indicated by 1200R is set as a subpixel SPix(R) of R(red); the subpixel SPix indicated by 1200G is set as a subpixel SPix(G) of G (green); and the subpixel SPix indicated by 1200B is set as a subpixel SPix(B) of B (blue) in FIG. 12. Accordingly, the color filter CR for red is provided as the color filter in the subpixel SPix(R) indicated by 1200R; the color filter CG for green is provided as the color filter in the subpixel SPix(G) indicated by 1200G; and the color filter CB for blue is provided as the color filter in the subpixel SPix(B) indicated by 1200B.

Further, among the signals each of which indicates the single pixel, an image signal corresponding to R (red) is supplied from the signal line selector 3 to the signal line SL(n)R; an image signal corresponding to G (green) is supplied from the signal line selector 3 to the signal line SL(n)G; and an image signal corresponding to B (blue) is supplied from the signal line selector 3 to the signal line SL(n)B.

The TFT transistor Tr of each of the subpixels SPix is an N-channel TFT transistor although not particularly limited thereto. Pulsed scan line signals are supplied from the gate driver 5 (FIGS. 8 and 9) to the scan lines GL(0) to GL(p), which sequentially become high levels in this order. That is, voltages of the scan lines sequentially become high levels from the scan line GL(0) arranged in the upper row toward the scan line GL(p) arranged in the lower row in the pixel array LCD. Accordingly, the TFT transistors Tr in the subpixels SPix are sequentially turned into the on-state (conductive state) from the subpixel SPix arranged in the upper row toward the subpixel SPix arranged in the lower row in the pixel array LCD.

When the TFT transistor Tr is turned into the on-state, the image signal supplied to the signal line is supplied to the liquid crystal element LC via the TFT transistor that is in the conductive state at the time. The electric field of the liquid crystal element LC is changed depending on a gap voltage between a voltage of the display drive signal supplied to the drive electrodes TL(0) to TL(p) and a voltage of the supplied image signal, and the modulation of light passing through the liquid crystal element LC is changed. Accordingly, a color image, which corresponds to the image signals supplied to the signal lines SL(0)R, SL(0)G, SL(n)B to SL(p)R, SL(p)G, and SL(p)B in synchronization with the scan line signal supplied to the scan lines GL(0) to GL(p), is displayed on the display panel 2.

Each of the plurality of subpixels SPix can be regarded as including a selection terminal and a pair of terminals. In this case, the gate of the TFT transistor Tr configuring the subpixel SPix is the selection terminal of the subpixel SPix; the drain of the TFT transistor Tr is one terminal between the pair of terminals; and the other end of the liquid crystal element LC is the other terminal of the subpixel SPix.

Here, a correspondence between the arrangement of the display panel 2 illustrated in FIGS. 8 and 9 and the circuit diagram illustrated in FIG. 12 will be described as follows.

The pixel array LCD includes a pair of sides substantially parallel to the row of the array, and a pair of sides substantially parallel to the column of the array. The pair of sides parallel to the row of the pixel array LCD are a first side and a second side corresponding to the short sides 2-U and 2-D of the display panel 2 illustrated in FIGS. 8 and 9; and the pair of sides parallel to the column of the pixel LCD are a third side and a fourth side corresponding to the long sides 2-L and 2-R of the display panel 2.

As illustrated in FIG. 9, the signal line selector 3, the amplifier circuit AMP, and the drive semiconductor device DDIC are arranged along the second side out of the pair of sides parallel to the row, that is, the short side 2-D of the display panel 2 in the pixel array LCD. The image signal from the drive semiconductor device DDIC is supplied to the signal lines SL(0)R, SL(0)G, SL(0)B to SL(p)R, SL(p)G and SL(p)B via the signal line selector 3 on the second side (the short side 2-D of the display panel 2) in the pixel array LCD.

In addition, the switching regulator circuit SCX is arranged along the first side of the pixel array LCD, that is, the other side (the short side 2-U) of the display panel 2 as illustrated in FIG. 9.

Further, the gate driver 5 and the selection drive circuit SSL are arranged along the third side out of the pair of sides parallel to the column (the third side and the fourth side), that is, the long side 2-L of the display panel 2 in the pixel array LCD. The scan line signal from the gate driver 5 is supplied to the scan lines GL(0) to GL(p) on the third side in the pixel array LCD. Although the gate driver 5 is arranged along the long side 2-L of the display panel 2 in FIG. 9, the gate driver 5 may be divided into two parts to be arranged along the long side 2-L (the third side of the pixel array LCD) and the long side 2-R (the fourth side of the pixel array LCD), respectively. In addition, the display drive signal is supplied from the selection drive circuit SSL to the drive electrode on the third side in the pixel array LCD in the display period. Further, the magnetic field drive signal or the electric field drive signal is supplied from the selection drive circuit SSL to the designated drive electrode on the third side in the magnetic field generation period TGT for the magnetic field touch detection or at the time of electric field touch detection.

The selection drive circuit SSR is arranged along the fourth side of the pixel array LCD, that is, the long side 2-R of the display panel 2 as illustrated in FIG. 9. In the display period, the display drive signal is supplied from the selection drive circuit SSR to the common electrode on the fourth side. On the other hand, the magnetic field drive signal or the electric field drive signal is also supplied to the designated drive electrode from the fourth side, similarly to the above-described selection drive circuit SSL, at the time of the magnetic field touch detection or electric field touch detection.

Although the pixel array LCD of a case where the color display is performed in the display panel 2 has been described concretely, the pixel array LCD may be regarded as being configured by the plurality of color pixels Pix (pixels) each of which is configured using the three subpixels SPix. When regarded as above, the plurality of pixels Pix are arranged in a matrix form, thereby configuring the pixel array LCD. The corresponding scan lines GL(0) to GL(p) and the corresponding drive electrodes TL(0) to TL(p) are arranged in the respective rows of the pixel array LCD configured by the pixels Pix, and the signal lines SL(0) to SL(p) are arranged in the respective columns thereof.

In this case, the three subpixels SPix are regarded as a single pixel Pix, and the pixel Pix is regarded as having the same configuration as the subpixel SPix. The respective selection terminals of the pixels Pix arranged in the matrix form in the pixel array LCD are connected to the scan lines GL(0) to GL(p) arranged in the same row as the pixels Pix; the respective one-side terminals of the pixels Pix are connected to the signal lines SL(0) to SL(p) arranged in the same column; and the respective other-side terminals of the pixels Pix are connected to the drive electrodes TL(0) to TL(p) arranged in the same column. Of course, one drive electrode may correspond to a plurality of columns of the pixel array LCD. In such a case, the other terminals of the pixels Pix arranged in the plurality of rows are connected to the common drive electrode.

Even in the case where it is regarded that the pixel array LCD is regarded as being configured by the plurality of pixels Pix in this manner, the correspondence between the arrangement of the display panel 2 illustrated in FIGS. 8 and 9 and the circuit diagram illustrated in FIG. 12 is the same as the content that has been described above.

Although the description has been given with the case where the number of the subpixels SPix configuring the single color pixel Pix is three, the number is not limited thereto. One color pixel may be configured using, for example, subpixels of white (W) and yellow (Y) in addition to R, G and B described above, or subpixels that additionally include any one or a plurality of colors among complementary colors (cyan (C), magenta (M) and yellow (Y)) of R, G and B described above.

<Selection Drive Circuit>

Next, the configurations and operations of the selection drive circuits SSL and SSR in the display device 1 according to the first embodiment will be described with reference to FIGS. 13 to 18.

<<Overview of Operation of Selection Drive Circuit>>

First, the overview of the operation will be described in order to facilitate the understanding of the selection drive circuit. In the first embodiment, the selection drive circuit SSR is provided with the drive circuit SR-R and the selection circuit SR-C as illustrated in FIG. 8. The drive circuit SR-R forms a selection signal to designate a drive electrode which generates a strong magnetic field in the magnetic field generation period TGT for the magnetic field touch detection. In addition, the drive circuit SR-R forms a selection signal to designate a drive electrode which generates an electric field at the time of electric field touch detection. The selection circuit SR-C connects drive electrodes, which sandwich the designated drive electrode, to the signal wiring TSV and the voltage wiring VCOM so that the magnetic field is generated around the drive electrode designated by the selection signal in the magnetic field generation period TGT. In addition, the selection circuit SR-C connects the drive electrode designated by the selection signal to the signal wiring TSV at the time of electric field touch detection.

The drive circuit SR-R includes the plurality of unit drive circuits USR(0) to USR(p) each of which has the shift stage, and the shift register is configured by connecting the unit drive circuits USR(0) to USR(p) in series. At each time of magnetic field touch detection and electric field touch detection, the selection information, which designates the drive electrode to be selected, is shifted in the shift register configured by the plurality of unit drive circuits, and so the drive circuit SR-R forms the selection signals which sequentially designate the drive electrodes.

The selection drive circuit SSL is also provided with the drive circuit SL-R and the selection circuit SL-C similarly to the selection drive circuit SSR. The drive circuit SL-R includes the plurality of unit drive circuits USL(0) to USL(p) similarly to the drive circuit SR-R, and operates in the same manner as the drive circuit SR-R. In addition, the selection circuit SL-C operates in the same manner as the selection circuit SR-C.

Figures 13A, 13B:
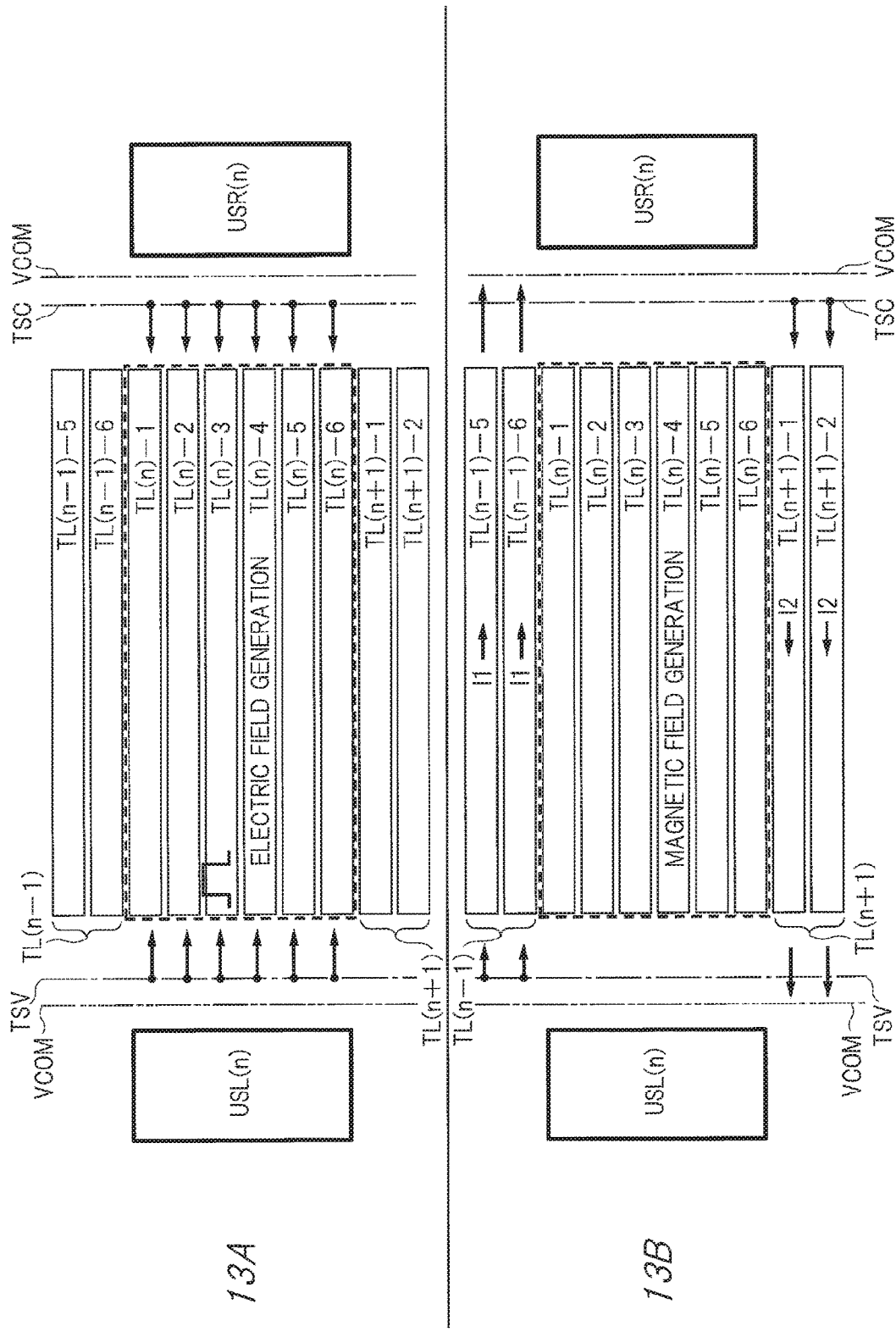
FIG. 13A is an explanatory diagram illustrating a touch detection operation of the display device according to the first embodiment.
FIG. 13B is an explanatory diagram illustrating a touch detection operation of the display device according to the first embodiment.

FIG. 13 is an explanatory diagram illustrating a touch detection operation in the display device 1 according to the first embodiment. FIG. 13A illustrates a case where the touch detection operation is the electric field touch detection, and FIG. 13B illustrates a case where the touch detection operation is the magnetic field touch detection. FIG. 13 illustrates the unit drive circuit USR(n) among the plurality of unit drive circuits USR(0) to USR(p) forming the drive circuit SR-R and the unit drive circuit USL(n) among the plurality of unit drive circuits USL(0) to USL(p) forming the drive circuit SL-R to describe the overview of operation, and does not illustrate the selection circuits SR-C and SL-C.

Each of the unit drive circuits USR(0) to USR(p) and USL(0) to USL(p) corresponds to each of the drive electrodes TL(0) to TL(p) arranged to be parallel to each other, but the unit drive circuits and the drive electrodes may not necessarily have one-to-one correspondence. That is, a plurality of drive electrodes, which are arranged to be adjacent to each other, may correspond to the unit drive circuit. FIG. 13 illustrates an example where six drive electrodes correspond to the unit drive circuit. That is, six drive electrodes TL(n)–1 to TL(n)–6, which are arranged to be proximate and adjacent to each other, are regarded as one drive electrode TL(n) and correspond to the unit drive circuits USR(n) and USL(n).

When the unit drive circuits USR(n) and USL(n) form the selection signal which designates the corresponding drive electrode TL(n) in the electric field touch detection, one end portion of each of the designated drive electrode TL(n), that is, the six drive electrodes TL(n)–1 to TL(n)–6 is connected to the signal wiring TSV on the side 2-L (FIGS. 8 and 9) side. In addition, the other end portion of each of the designated drive electrode TL(n), that is, the six drive electrodes TL(n)–1 to TL(n)–6 is connected to the signal wiring TSV on the side 2-R (FIGS. 8 and 9) side. Since the drive signal TSVCOM with the periodically changing voltage is supplied to the signal wiring TSV at the time of electric field touch detection, the drive signal TSVCOM is supplied as the electric field drive signal to both the ends of the drive electrode TL(n), that is, the six drive electrodes TL(n)–1 to TL(n)–6. As a result, the electric field is generated according to the electric field drive signal (the drive signal TSVCOM).

On the other hand, when the unit drive circuits USR(n) and USL(n) form the selection signal which designates the corresponding drive electrode TL(n) in the magnetic field generation period TGT for the magnetic field touch detection, the designated drive electrode TL(n), that is, the drive electrodes TL(n–1) and TL(n+1) arranged to sandwich the six drive electrodes TL(n)–1 to TL(n)–6 are connected to the signal wiring TSV and the voltage wiring VCOM. The drive electrode TL(n–1) is configured by six drive electrodes TL(n–1)–1 to TL(n–1)–6, and the drive electrode TL(n+1) is also configured by six drive electrodes TL(n+1)–1 to TL(n+1)–6. FIG. 13 illustrates only the drive electrodes TL(n–1)–5, TL(n–1)–6, TL(n+1)–1 and TL(n+1)–2 among these drive electrodes, and does not illustrate the remaining drive electrodes TL(n−1)-1 to TL(n−1)-4 and TL(n+1)-3 to TL(n+1)-6.

When the description is given by exemplifying the drive electrodes TL(n−1)-5, TL(n−1)-6, TL(n+1)-1 and TL(n+1)-2 illustrated in FIG. 13, one end portion of each of the drive electrodes TL(n−1)-5 and TL(n−1)-6 is connected to the signal wiring TSV on the side 2-L side. In addition, one end portion of each of the drive electrodes TL(n+1)-1 and TL(n+1)-2 is connected to the voltage wiring VCOM on the side 2-L side. At this time, the other end portion of each of the drive electrodes TL(n−1)-5 and TL(n−1)-6 is connected to the voltage wiring VCOM on the side 2-R side, and the other end portion of each of the drive electrodes TL(n+1)-1 and TL(n+1)-2 is connected to the signal wiring TSV on the side 2-R side. Similarly, one end portion of each of the drive electrodes TL(n−1)-1 to TL(n−1)-4 (not illustrated) is also connected to the signal wiring TSV on the side 2-L side, and the other end portion thereof is connected to the voltage wiring VCOM on the side 2-R side. In addition, one end portion of each of the drive electrodes TL(n+1)-3 to TL(n+1)-6 (not illustrated) is connected to the voltage wiring VCOM on the side 2-L side, and the other end portion thereof is connected to the signal wiring TSV on the side 2-R side.

In the magnetic field generation period TGT for the magnetic field touch detection, the drive signal TSVCOM with the periodically changing voltage is supplied to the signal wiring TSV, and the ground voltage Vss is supplied to the voltage wiring VCOM. Thus, a current indicated by the arrow I1 flows in the drive electrode TL(n−1) out of the drive electrodes TL(n−1) and TL(n+1) arranged with the designated drive electrode TL(n) sandwiched therebetween, and a current I2 in an opposite direction to the current I1 flows in the drive electrode TL(n+1) as indicated by the arrow, as illustrated in FIG. 13. That is, the currents in the directions opposite to each other flow, respectively, in the drive electrodes TL(n−1) and TL(n+1) that are arranged with the designated drive electrode TL(n) sandwiched therebetween, according to the voltage change of the magnetic field drive signal (the drive signal TSVCOM). Accordingly, the magnetic field generated around the drive electrode TL(n−1) and the magnetic field generated around the drive electrode TL(n+1) are superimposed on each other in the area where the drive electrode TL(n) is arranged, thereby generating a strong magnetic field.

In addition, the six drive electrodes TL(n−1)-1 to TL(n−1)-6 are provided as a bundle to form the drive electrode TL(n−1) so that the magnetic field generated around the drive electrode TL(n−1) becomes strong in the example illustrated in FIG. 13. Similarly, the six drive electrodes TL(n+1)-1 to TL(n+1)-6 are provided as a bundle to form the drive electrode TL(n+1) so that the magnetic field generated around the drive electrode TL(n+1) becomes strong. As a result, it is possible to further strengthen the superimposed magnetic field.

In this manner, it is possible to generate the strong magnetic field without forming the coil by connecting in series the drive electrode TL(n−1) and the drive electrode TL(n+1) which are arranged to be parallel to each other. As a result, the control becomes easy, and it is further possible to suppress the increase of the area occupied by the control circuit.

<<Configuration of Selection Drive Circuit>>

Figure 14:
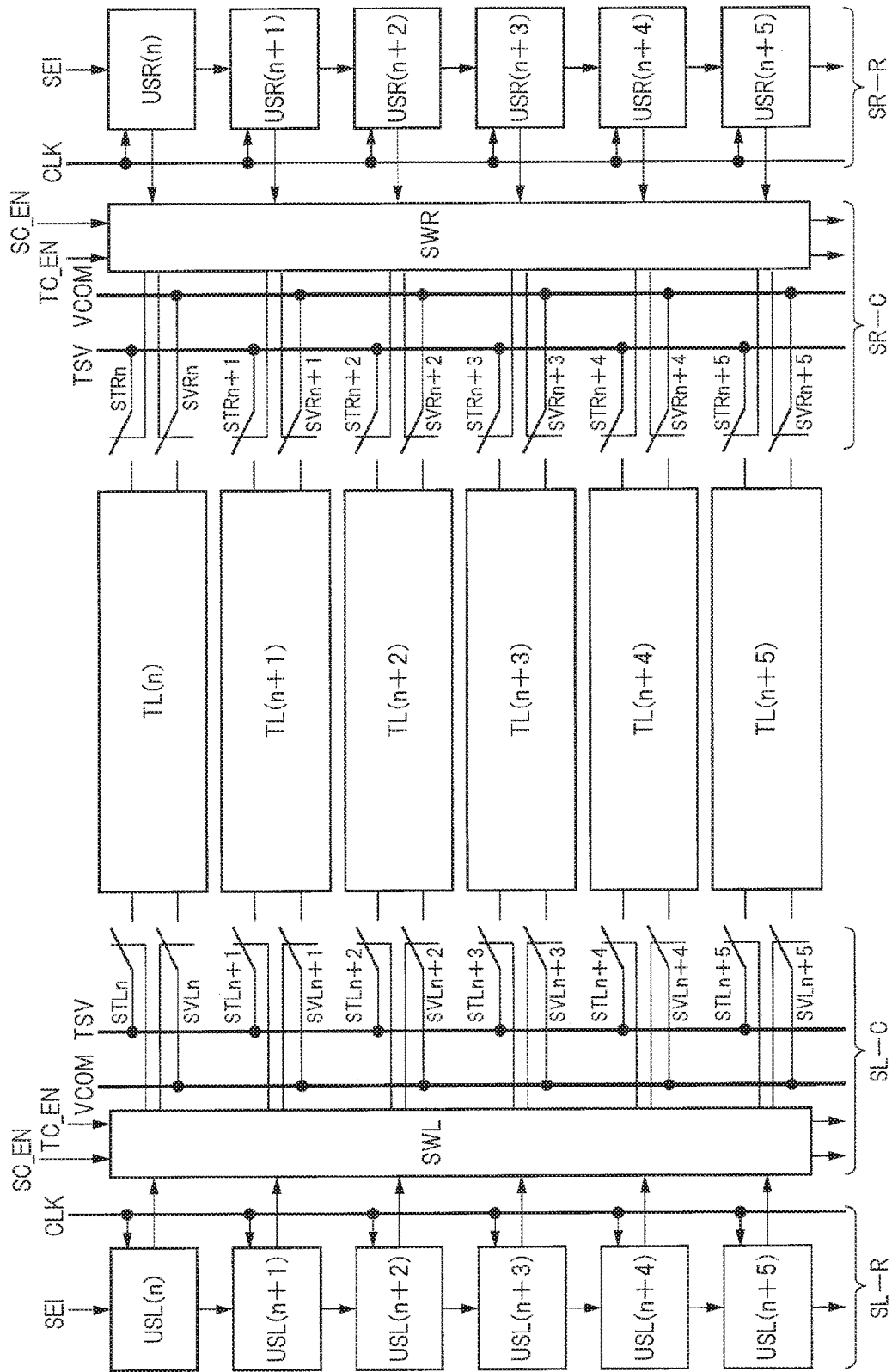
FIG. 14 is a block diagram illustrating a configuration of a selection drive circuit of the display device according to the first embodiment.
Figure 15:
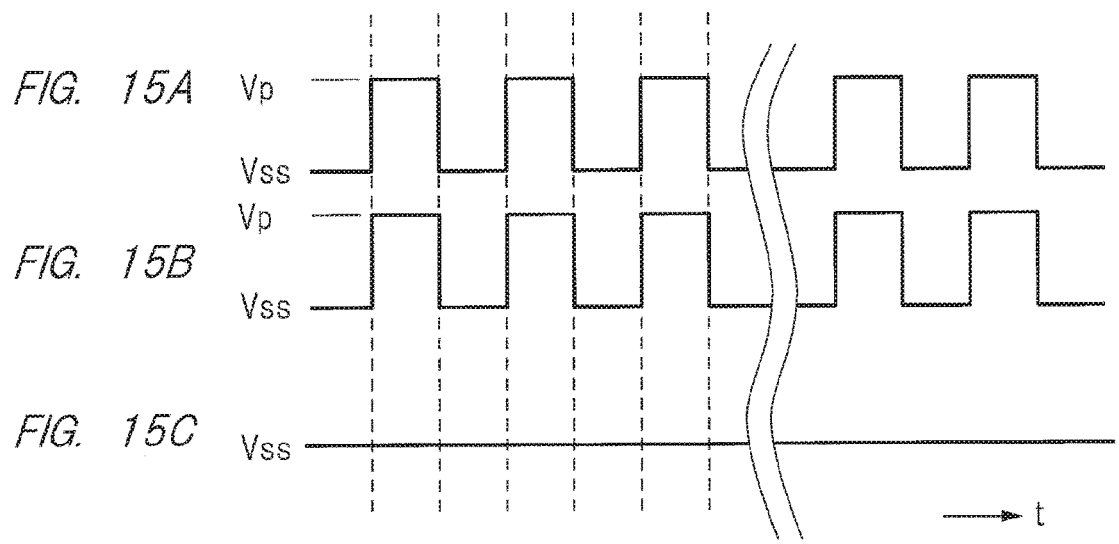
FIG. 15A is a waveform diagram illustrating a waveform in a magnetic field generation period of the display device according to the first embodiment.
FIG. 15B is a waveform diagram illustrating a waveform in a magnetic field generation period of the display device according to the first embodiment.
FIG. 15C is a waveform diagram illustrating a waveform in a magnetic field generation period of the display device according to the first embodiment.

FIG. 14 is a block diagram illustrating each configuration of the selection drive circuits SSL and SSR according to the first embodiment. The selection drive circuit SSL and the selection drive circuit SSR have the configurations similar to each other. First, the configuration of the selection drive circuit SSL will be described, and the selection drive circuit SSR will be described by mainly focusing on a different point from the selection drive circuit SSL.

The selection drive circuit SSL is provided with the drive circuit SL-R and the selection circuit SL-C as illustrated in FIG. 8. The drive circuit SL-R includes the plurality of unit drive circuits USL(0) to USL(p) which correspond, respectively, to the drive electrodes TL(0) to TL(p), and the selection circuit SL-C includes: a plurality of third switches and fourth switches corresponding to each of the drive electrodes TL(0) to TL(p); and the switch control circuit SWL. FIG. 14 illustrates the drive electrodes TL(n) to TL(n+5) among the drive electrodes TL(0) to TL(p), and a part of the selection drive circuit SSL which corresponds to these drive electrodes TL(n) to TL(n+5). Hereinafter, the selection drive circuit SSL will be described by exemplifying the part thereof which corresponds to the drive electrodes TL(n) to TL(n+5).

In FIG. 14, numerals USL(n) to USL(n+5) represent the unit drive circuits which correspond to the drive electrodes TL(n) to TL(n+5). Each of the unit drive circuits USL(n) to USL(n+5) has the shift stage. The respective shift stages of the unit drive circuits USL(n) to USL(n+5) are connected in series, thereby forming the shift register. The selection information SEI is supplied to the unit drive circuit USL(n) from the unit drive circuit USL (not illustrated) at the previous stage of the unit drive circuit USL(n) in the magnetic field generation period TGT and the electric field touch detection period. The selection information SEI is shifted in the shift register, which is configured by the shift stages of the unit drive circuits USL(n) to USL(n+5), in synchronization with the clock signal CLK, and is shifted from the unit drive circuit USL(n) toward the unit drive circuit USL(n+5). In addition, when the selection information SEI is shifted, the selection signal is outputted to the switch control circuit SWL from each of the unit drive circuits USL(n) to USL(n+5).

The switch control circuit SWL receives: the selection signals from the unit drive circuits USL(n) to USL(n+5); the magnetic field enable signal SC_EN; and the electric field enable signal TC_EN, and forms a first drive signal which performs switch control of third switches STLn to STLn+5 and a second drive signal which performs switch control of fourth switches SVLn to SVLn+5.

Each of the third switches STLn to STLn+5 and the fourth switches SVLn to SVLn+5 corresponds to each of the drive electrodes TL(n) to TL(n+5). For example, the third switch STLn and the fourth switch SVLn correspond to the drive electrode TL(n), and the third switch STLn+5 and the fourth switch SVLn+5 correspond to the drive electrode TL(n+5). Each of the remaining third switch and fourth switch also corresponds to the drive electrode one to one in the same manner.

Each of the third switches STLn to STLn+5 is connected between the signal wiring TSV and one end portion of each of the corresponding drive electrodes TL(n) to TL(n+5) on the side 2-L side of the display panel 2, and is subjected to the switch control according to the first drive signal. Further, each of the fourth switches SVLn to SVLn+5 is connected between the voltage wiring VCOM and one end portion of each of the corresponding drive electrodes TL(n) to TL(n+5) on the side 2-L side of the display panel 2, and is subjected to the switch control according to the second drive signal. When the description is given by exemplifying the third switches STLn and STLn+5 and the fourth switches SVLn and SVLn+5, the third switch STLn is connected between the signal wiring TSV and the one end portion of the drive electrode TL(n) on the side 2-L side, and the fourth switch SVLn is connected between the voltage wiring VCOM and the one end portion of the drive electrode TL(n) on the side 2-L side. In addition, the third switch STLn+5 is connected between the signal wiring TSV and the one end portion of the drive electrode TL(n+5) on the side 2-L side, and the fourth switch SVLn+5 is connected between the voltage wiring VCOM and one end portion of the drive electrode TL(n+5) on the side 2-L side. The remaining third switch and fourth switch are also configured in the same manner.

In the first embodiment, the selection circuit SL-C illustrated in FIG. 8 is configured using the third switches STLn to STLn+5, the fourth switches SVLn to SVLn+5, and the switch control circuit SWL.

In the selection drive circuit SSR, numerals USR(n) to USR(n+5) are unit drive circuits which correspond to the above-described unit drive circuits USL(n) to USL(n+5), and numeral SWR is a switch control circuit which corresponds to the above-described switch control circuit SWL. In addition, numerals STRn to STRn+5 are fifth switches which correspond to the above-described third switches STLn to STLn+5, and numerals SVRn to SVRn+5 are sixth switches which correspond to the above-described fourth switches SVLn to SVLn+5.

The shift stages in the unit drive circuits USR(n) to USR(n+5) are connected in series, and the selection information SEI is shifted from the unit drive circuit USR(n) to USR(n+5) in synchronization with the clock signal CLK. At the time of being shifted, the selection information SEI stored in the unit drive circuits USR(n) to USR(n+5) is outputted to the switch control circuit SWR as the selection signals of the unit drive circuits USR(n) to USR(n+5). The switch control circuit SWR receives: the selection signal from the unit drive circuits USR(n) to USR(n+5); the magnetic field enable signal SC_EN; and the electric field enable signal TC_EN, and forms a third drive signal which performs switch control of the fifth switches STRn to STRn+5 and a fourth drive signal which performs switch control of the sixth switches SVLn to SVLn+5.

The drive circuit SR-R configured using the unit drive circuits USR(n) to USR(n+5) and the selection circuit SR-C configured using the fifth switch, the sixth switch, and the switch control circuit SWR are arranged along the side 2-R of the display panel 2 as illustrated in FIG. 8. Thus, each of the fifth switches STRn to STRn+5 is connected between the signal wiring TSV and the other end portion of each of the corresponding drive electrodes TL(n) to TL(n+5) on the side 2-R side. In addition, each of the sixth switches SVRn to SVRn+5 is connected between the voltage wiring VCOM and the other end portion of each of the corresponding drive electrodes TL(n) to TL(n+5) on the side 2-R side.

When the description is given by exemplifying the fifth switches STRn and STRn+5 and the sixth switches SVRn and SVRn+5, the fifth switch STRn is connected between the signal wiring TSV and the other end portion of the drive electrode TL(n) on the side 2-R side, and the sixth switch SVRn is connected between the voltage wiring VCOM and the other end portion of the drive electrode TL(n) on the side 2-R side. In addition, the fifth switch STRn+5 is connected between the signal wiring TSV and the other end portion of the drive electrode TL(n+5) on the side 2-R side, and the sixth switch SVRn+5 is connected between the voltage wiring VCOM and the other end portion of the drive electrode TL(n+5) on the side 2-R side. The remaining fifth switch and sixth switch are also configured in the same manner.

The periodically changing drive signal TSVCOM is supplied to the signal wiring TSV at the time of the magnetic field touch detection in the magnetic field generation period TGT. In addition, the ground voltage Vss is supplied to the voltage wiring VCOM at this time. FIGS. 15A to 15C are waveform diagrams illustrating a waveform of each voltage supplied to the signal wiring TSV and the voltage wiring VCOM in the magnetic field generation period TGT. In FIGS. 15A to 15C, the horizontal axis represents time t, and the vertical axis represents a voltage. FIG. 15A illustrates a waveform of the drive signal TSVCOM supplied to the signal wiring TSV arranged in the selection circuit SL-C, and FIG. 15B illustrates a waveform of the drive signal TSVCOM supplied to the signal wiring TSV arranged in the selection circuit SR-C. In addition, FIG. 15C illustrates a voltage waveform of the voltage wiring VCOM arranged in the selection circuits SL-C and SR-C.

As illustrated in FIGS. 15A to 15C, the drive signal TSVCOM supplied to the selection circuit SL-C and the drive signal TSVCOM supplied to the selection circuit SR-C are synchronized with each other, and each voltage value periodically changes between the ground voltage Vss and a predetermined voltage (first voltage) Vp. On the other hand, the ground voltage Vss is supplied to the voltage wiring VCOM.

The drive signals synchronized with each other are also supplied to the signal wiring TSV arranged in the selection circuit SL-C and the signal wiring TSV arranged in the selection circuit SR-C at the time of electric field touch detection as illustrated in FIGS. 15A and 15B. Although not particularly limited, the predetermined voltage Vp of the drive signal TSVCOM is different between the magnetic field generation period TGT and the time of electric field touch detection. In addition, a period of the drive signal TSVCOM illustrated in FIGS. 15A and 15B is also different between the magnetic field generation period TGT and the electric field touch detection period. Of course, the predetermined voltage Vp and the period may be the same therebetween without being limited thereto.

The switch control circuits SWL and SWR operate differently between a case where the magnetic field touch detection is designated by the magnetic field enable signal SC_EN and a case where the electric field touch detection is designated by the electric field enable signal TC_EN. The operation in the case where the magnetic field touch detection is designated will be described with reference to FIGS. 16 and 17, and the operation in the case where the electric field touch detection is designated will be described with reference to FIG. 18.

<<Operation of Magnetic Field Generation>>

Figure 16:
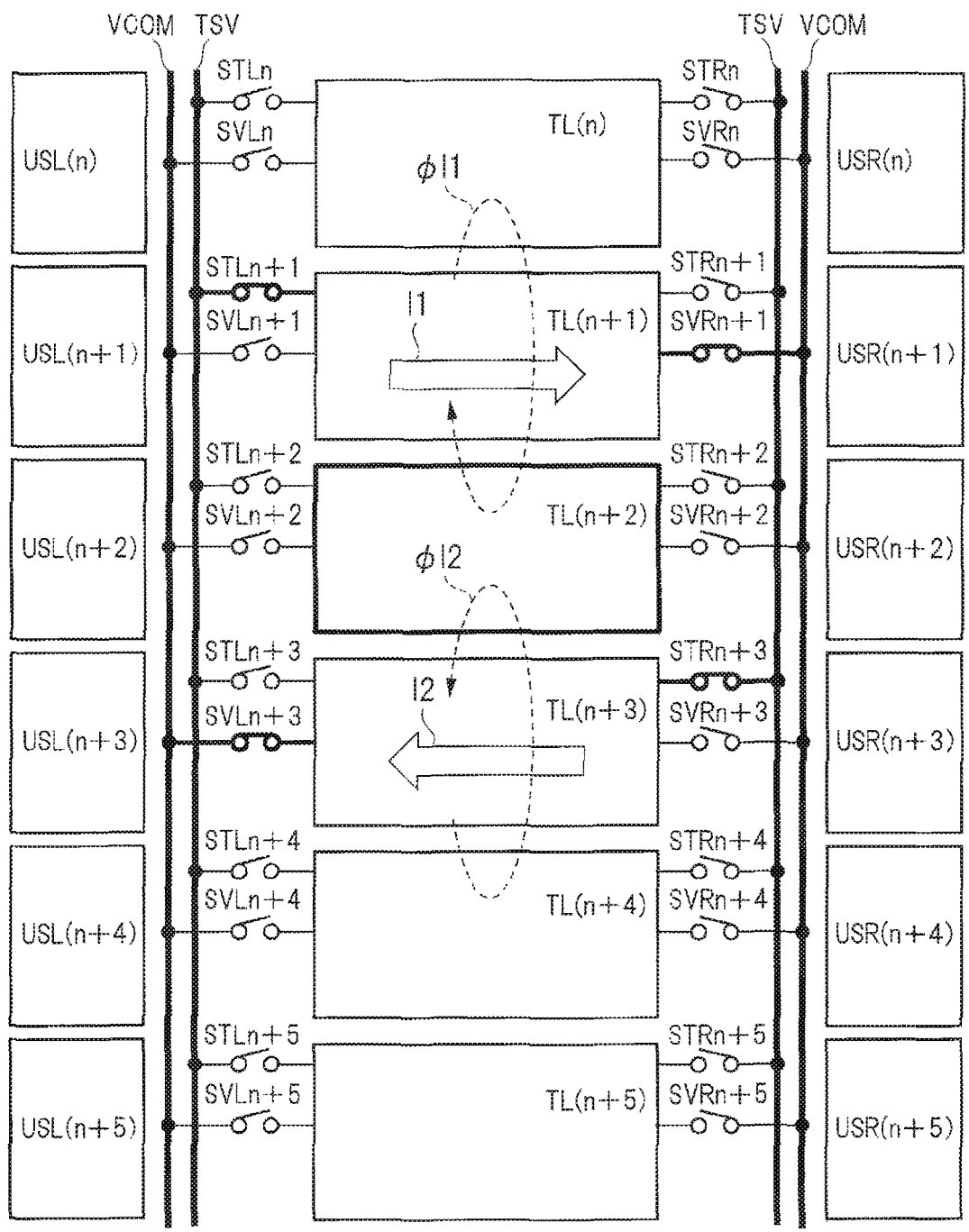
FIG. 16 is a schematic plan view illustrating a magnetic field touch detection operation of the display device according to the first embodiment.
Figure 17:
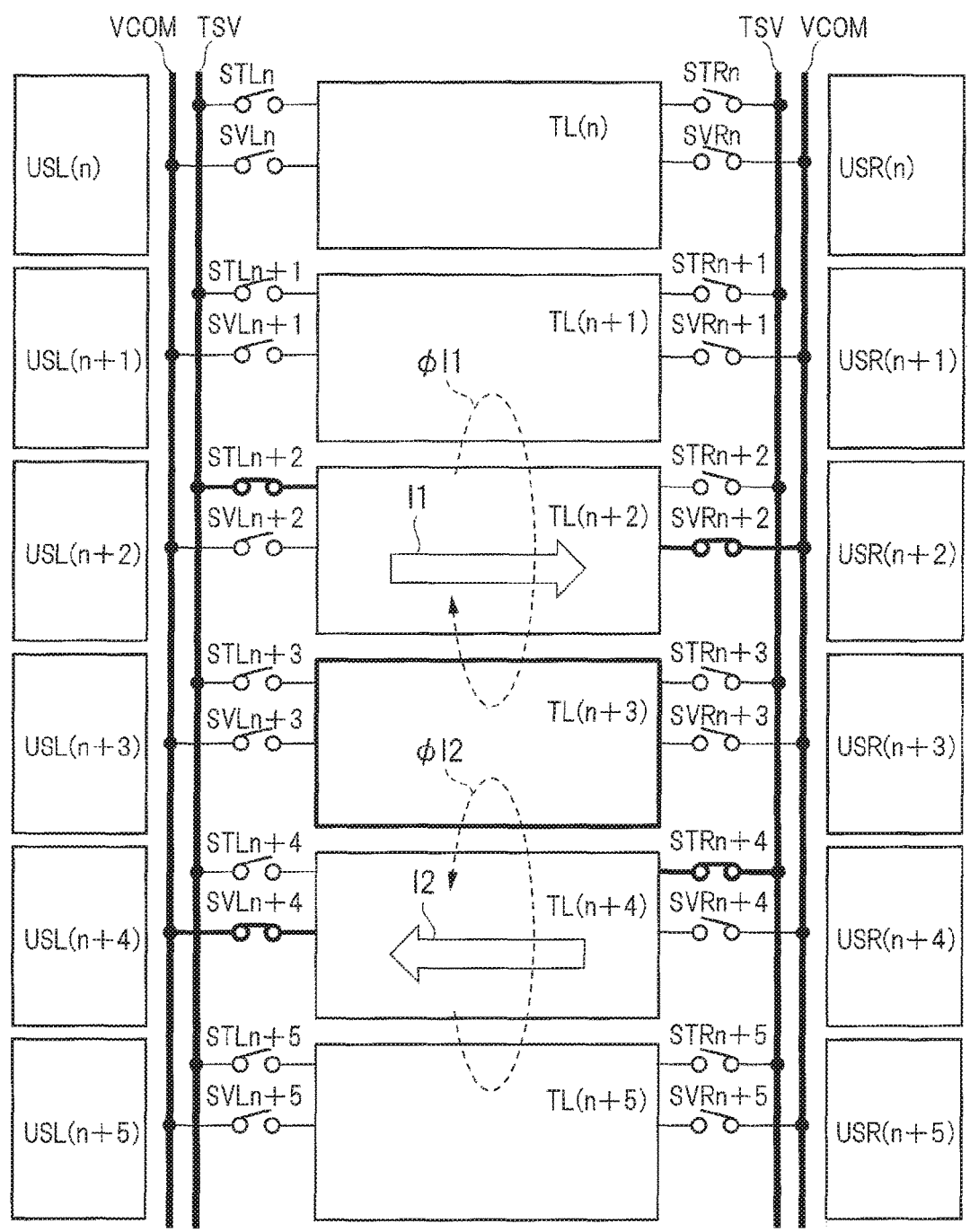
FIG. 17 is a schematic plan view illustrating the magnetic field touch detection operation of the display device according to the first embodiment.

FIGS. 16 and 17 are schematic plan views illustrating the operation in the case where the magnetic field touch detection is designated.

When the selection signal supplied from the unit drive circuit indicates selection, the switch control circuit SWL controls the third switch and the fourth switch so that two drive electrodes arranged to sandwich the drive electrode corresponding to the unit drive circuit which outputs the selection signal indicating the selection are connected to the signal wiring TSV and the voltage wiring VCOM. Although not particularly limited, the switch control circuit SWL controls the third switch to connect the drive electrode, which is closer to the side 2-U out of the two drive electrodes, to the signal wiring TSV, and the switch control circuit SWL controls the fourth switch to connect the drive electrode, which is closer to the side 2-D, to the voltage wiring VCOM in the first embodiment.

Similarly, the switch control circuit SWR also controls the sixth switch and the fifth switch when the selection signal supplied from the unit drive circuit indicates selection so that two drive electrodes arranged to sandwich the drive electrode corresponding to the unit drive circuit which outputs the selection signal indicating the selection are connected to the voltage wiring VCOM and the signal wiring TSV. In the first embodiment, the switch control circuit SWR controls the sixth switch to connect the drive electrode, which is closer to the side 2-U out of the two drive electrodes, to the voltage wiring VCOM, and the switch control circuit SWL controls the fifth switch to connect the drive electrode, which is closer to the side 2-D, to the signal wiring TSV.

The shift register configured using the unit drive circuits USL(n) to USL(n+5) and the shift register configured using the unit drive circuits USR(n) to USR(n+5) operate in synchronization with each other. Thus, the drive electrode whose one end portion is connected to the signal wiring TSV by the switch control circuit SWL has the other end portion which is connected to the voltage wiring VCOM by the switch control circuit SWR. In addition, the drive electrode whose other end portion is connected to the signal wiring TSV by the switch control circuit SWR has one end portion which is connected to the voltage wiring VCOM by the switch control circuit SWL.

FIG. 16 illustrates a state where the unit drive circuit USL(n+2) and the unit drive circuit USR(n+2) output the selection signal indicating the selection. The drive electrode corresponding to the unit drive circuits USL(n+2) and USR(n+2) is the drive electrode TL(n+2), and thus two drive electrodes arranged to sandwich the drive electrode TL(n+2) are the drive electrode TL(n+1) and the drive electrode TL(n+3). The switch control circuit SWL turns the third switch STLn+1 into the on-state by the first drive signal so that one end portion of the drive electrode TL(n+1) arranged to be closer to the side 2-U out of the two drive electrodes is connected to the signal wiring TSV. At this time, the switch control circuit SWL turns the fourth switch SVLn+3 into the on-state by the second drive signal so that one end portion of the drive electrode TL(n+3) arranged to be closer to the side 2-D is connected to the voltage wiring VCOM.

In addition, the switch control circuit SWL performs control using the first drive signal so that the remaining third switches STLn and STLn+2 to STLn+5, except for the third switch STLn+1, are turned into the off-state. Similarly, the switch control circuit SWL performs control using the second drive signal so that the remaining fourth switches SVLn to SVLn+2, SVLn+4 to SVLn+5, except for the fourth switch SVLn+3, are turned into the off-state.

On the other hand, the switch control circuit SWR turns the sixth switch SVRn+1 into the on-state by the fourth drive signal so that the other end portion of the drive electrode TL(n+1) arranged to be closer to the side 2-U out of the two drive electrodes is connected to the voltage wiring VCOM. At this time, the switch control circuit SWR turns the fifth switch STRn+3 into the on-state by the third drive signal so that the other end portion of the drive electrode TL(n+3) arranged to be closer to the side 2-D is connected to the signal wiring TSV.

In addition, the switch control circuit SWR performs control using the third drive signal so that the remaining fifth switches STRn to STRn+2, STRn+4 to STLn+5, except for the fifth switch STRn+3, are turned into the off-state at this time. Similarly, the switch control circuit SWR performs control using the fourth drive signal so that the remaining sixth switches SVLn, SVRn+2 to SVRn+5, except for the sixth switch SVRn+1, are turned into the off-state.

Accordingly, the drive electrode TL(n+1) out of the two drive electrodes arranged to sandwich the drive electrode TL(n+2) has the one end portion connected to the signal wiring TSV and the other end portion connected to the voltage wiring VCOM. At this time, the other drive electrode TL(n+3) has the one end portion connected to the voltage wiring VCOM and the other end portion connected to the signal wiring TSV. As illustrated in FIGS. 15A to 15C, when the drive signal TSVCOM whose voltage value periodically changes is supplied to the signal wiring TSV and the ground voltage Vss is supplied to the voltage wiring VCOM, the current I1 indicated by arrow in FIG. 16 flows in the drive electrode TL(n+1), and the current I2 indicated by the arrow flows in the drive electrode TL(n+3).

When the current I1 flows, the magnetic field ϕI1 indicated by the broken-line arrow is generated around the drive electrode TL(n+1). Meanwhile, the current I2 in the opposite direction to the current I1 flows in the drive electrode TL(n+3), and accordingly the magnetic field ϕI2 indicated by the broken-line arrow is generated around the drive electrode TL(n+3). Since the drive electrode TL(n+2) is sandwiched between the drive electrodes TL(n+1) and TL(n+3), the magnetic field ϕI1 and the magnetic field ϕI2 are superimposed on each other in an area of the drive electrode TL(n+2), thereby generating a strong magnetic field. In addition, each of the drive electrodes TL(n), TL(n+2), TL(n+4) and TL(n+5), except for the drive electrodes TL(n+1) and TL(n+3), are in the floating state at this time.

The selection information SEI indicating the selection is shifted from the unit drive circuits USL(n+2) and USR(n+2) to the unit drive circuits USL(n+3) and USR(n+3) as a clock signal CLK changes. Through such shift, the area where the strong magnetic field is generated is changed from an area of the drive electrode TL(n+2) to an area of the drive electrode TL(n+3). FIG. 17 illustrates a state where the strong magnetic field is generated around the drive electrode TL(n+3).

As the clock signal CLK changes, the selection information SEI indicating the selection is shifted to the unit drive circuits USL(n+3) and USR(n+3). The drive electrode corresponding to the unit drive circuits USL(n+3) and USR(n+3) is the drive electrode TL(n+3). Thus, the switch control circuits SWL and SWR connect the drive electrode TL(n+2), which is arranged to be more proximate to the side 2-U than the drive electrode TL(n+3), to the signal wiring TSV and the voltage wiring VCOM. In addition, the switch control circuits SWL and SWR connect the drive electrode TL(n+4), which is arranged to be more proximate to the side 2-D than the drive electrode TL(n+3), to the voltage wiring VCOM and the signal wiring TSV at this time. That is, the switch control circuit SWL turns the third switch STLn+2 into the on-state using the first drive signal; the fourth switch SVLn+4 into the on-state using the second drive signal; and the remaining third switch and fourth switch into the off-state. In addition, the switch control circuit SWR turns the fifth switch SVRn+2 into the on-state using the third drive signal; the sixth switch STRn+4 into the on-state using the fourth drive signal; and the remaining fifth switch and sixth switch into the off-state.

As a result, one end portion of the drive electrode TL(n+2) is connected to the signal wiring TSV via the third switch STLn+2, and the other end portion thereof is connected to the voltage wiring VCOM via the fifth switch SVRn+2. At this time, one end portion of the drive electrode TL(n+4) is connected to the voltage wiring VCOM via the fourth switch SVLn+4, and the other end portion thereof is connected to the signal wiring TSV via the sixth switch SVRn+2. When the drive signal TSVCOM is supplied to the signal wiring TSV and the ground voltage Vss is supplied to the voltage wiring VCOM, the current I1 indicated by arrow in FIG. 17 flows in the drive electrode TL(n+2), and the current I2 indicated by the arrow flows in the drive electrode TL(n+4).

When the currents I1 and I2 flow, the magnetic field φI1 indicated by the broken-line arrow is generated around the drive electrode TL(n+2), and the magnetic field φI2 indicated by the broken-line arrow is generated around the drive electrode TL(n+4). The magnetic field φI1 and the magnetic field φI2 are superimposed on each other in the area of the drive electrode TL(n+3), thereby generating the strong magnetic field. In addition, each of the drive electrodes TL(n), TL(n+1), TL(n+3) and TL(n+5), except for the drive electrodes TL(n+2) and TL(n+4), is in the floating state at this time.

As described above, it is possible to sequentially generate the magnetic field from the side 2-U to the side 2-D as the selection information SEI indicating the selection is shifted from the unit drive circuits USL(n) and USR(n) to the unit drive circuit USL(n+5), USR(n+5). In this case, it is possible to generate the strong magnetic field, without forming the magnetic field generation coil, by connecting the drive electrodes with each other.

<<Operation of Electric Field Generation>>

In a case where the electric field touch detection is instructed by the electric field enable signal TC_EN, the switch control circuits SWL and SWR control the third switch and the fifth switch when the selection signal supplied from the unit drive circuit indicates selection so that the drive electrode corresponding to the unit drive circuit which outputs the selection signal indicating the selection is connected to the signal wiring TSV. In order to generate an electric field, it is unnecessary to cause a DC current to flow in the drive electrode differently from the time of magnetic field generation, and thus the switch control circuits SWL and SWR turn the fourth switch and the sixth switch into the off-state.

Figure 18:
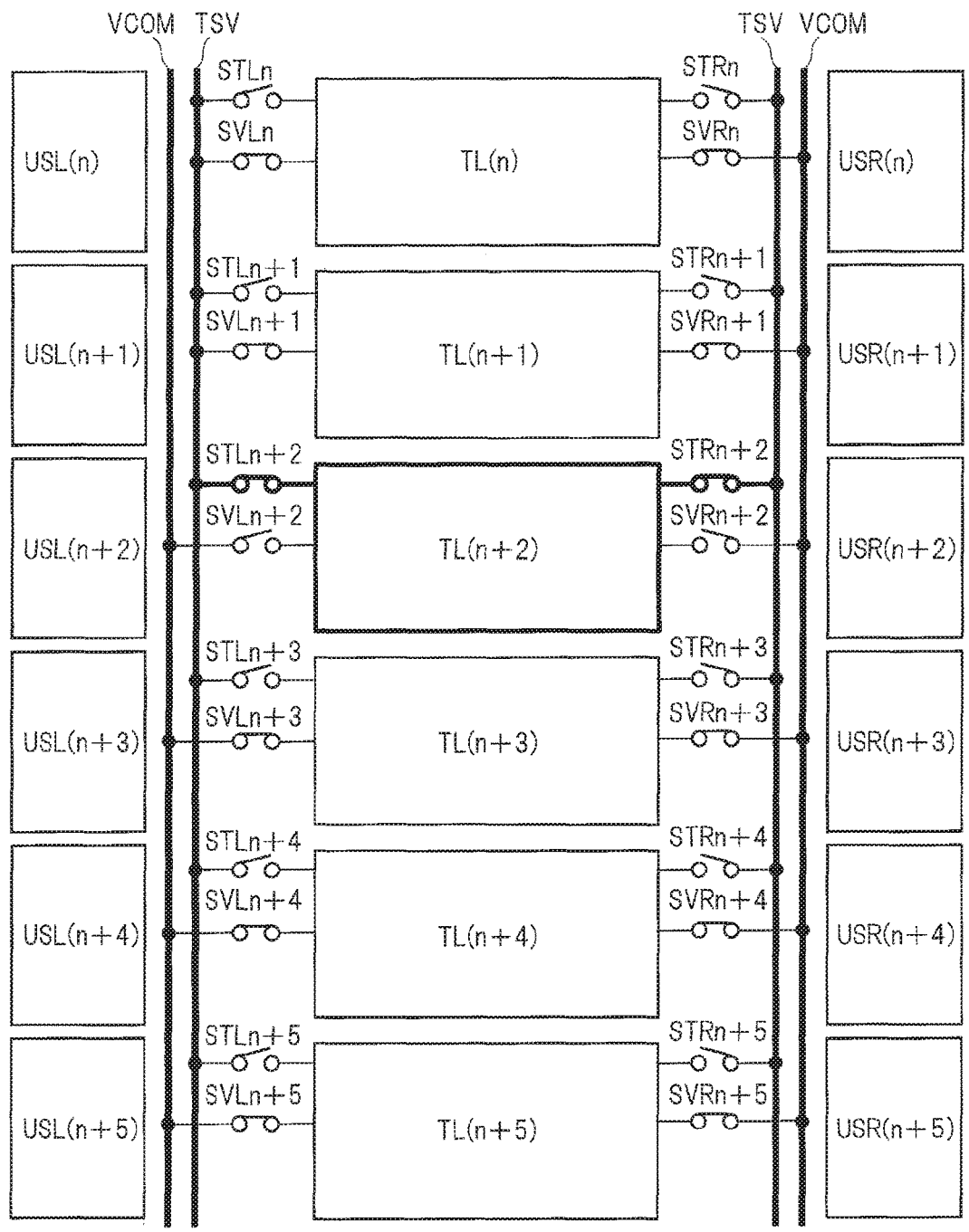
FIG. 18 is a schematic plan view illustrating an electric field touch detection operation of the display device according to the first embodiment.

FIG. 18 is a schematic plan view illustrating the operation in the case where the electric field touch detection is designated. FIG. 18 illustrates a state where the unit drive circuits USL(n+2) and USR(n+2) output the selection signal indicating the selection.

When the selection signal indicating the selection is supplied from the unit drive circuit USL(n+2), the switch control circuit SWL turns the third switch STLn+2, which is connected between one end portion of the drive electrode TL(n+2) corresponding to the unit drive circuit USL(n+2) and the signal wiring TSV, into the on-state using the first drive signal. In addition, the switch control circuit SWL performs control using the first drive signal so that the other third switches STLn to STLn+1 and STLn+3 to STLn+5, except for the third switch STLn+2, are turned into the off-state at this time.

When the selection signal indicating the selection is supplied from the unit drive circuit USR(n+2), the switch control circuit SWR turns the fifth switch STRn+2, which is connected between the other end portion of the drive electrode TL(n+2) corresponding to the unit drive circuit USR(n+2) and the signal wiring TSV, into the on-state using the third drive signal. In addition, the switch control circuit SWR performs control using the third drive signal so that the other fifth switches STRn to STRn+1 and STRn+3 to STRn+5, except for the fifth switch STRn+2, are turned into the off-state at this time.

The switch control circuits SWL and SWR turn the fourth switch and the sixth switch, except for the fourth switch SVLn+2 and the sixth switch SVRn+2 connected to the drive electrode TL(n+2) that generates the electric field, into the on-state using the second drive signal and the fourth drive signal.

The drive signal TSVCOM with the periodically changing voltage is supplied to the signal wiring TSV even at the time of the electric field touch detection. Thus, the drive signal TSVCOM is supplied to the one end portion of the drive electrode TL(n+2) via the third switch STLn+2, and the drive signal TSVCOM is supplied to the other end portion of the drive electrode TL(n+2) via the fifth switch STRn+2. As a result, the drive signal TSVCOM is supplied to the drive electrode TL(n+2) from both the end portions thereof, and accordingly the electric field according to the drive signal TSVCOM is generated around the drive electrode TL(n+2).

The selection information SEI indicating the selection is shifted from the unit drive circuits USL(n+2) and USR(n+2) to the unit drive circuits USL(n+3) and USR(n+3) as a clock signal CLK changes. Accordingly, the switch control circuit SWL turns the third switch STLn+3 into the on-state, and the switch control circuit SWR turns the fifth switch STRn+3 into the on-state. At this time, the third switch except for the third switch STLn+3 and the fifth switch except for the fifth switch STRn+3 are turned into the off-state. Accordingly, the electric field according to the drive signal TSVCOM is generated around the drive electrode TL(n+3) arranged next to the drive electrode TL(n+2).

In the above-described manner, the electric field is sequentially generated from the drive electrode arranged on the side 2-U side to the drive electrode arranged on the side 2-D side by changing the clock signal CLK.

Although FIGS. 15A to 18 illustrate the example where each one of the third switch, the fourth switch, the fifth switch, and the sixth switch is connected to one drive electrode, the invention is not limited thereto. As illustrated in FIG. 13, for example, each one of the third switch, the fourth switch, the fifth switch, and the sixth switch may be connected to the six (plural) drive electrodes arranged to be adjacent to each other.

In addition, the third switch, the fourth switch, the fifth switch, and the sixth switch, which are connected to each of the drive electrodes adjacent to each other, may be subjected to the switch control substantially at the same time based on the selection information sent from the same unit drive circuit. In FIG. 16, for example, the third switch STLn connected to the drive electrode TL(n) and the third switch STLn+1 connected to the drive electrode TL(n+1) may be turned into the on-state substantially at the same time based on the selection signal sent from the unit drive circuit USL(n+2), and the sixth switch SVRn connected to the drive electrode TL(n) and the sixth switch SVRn+1 connected to the drive electrode TL(n+1) may be turned into the on-state substantially at the same time based on the selection signal sent from the unit drive circuit USR(n+2). Accordingly, it is possible to generate the magnetic field by collectively using the drive electrode TL(n) and the drive electrode TL(n+1) and to strengthen the magnetic field thus generated.

When the drive electrode TL(n) and the drive electrode TL(n+1) are collectively used, it is possible to further strengthen the magnetic field generated in the area of the drive electrode TL(n+2) by collectively using the drive electrode TL(n+3) and the drive electrode TL(n+4) in the same manner. In this case, the configuration where the drive electrode TL(n+3) and the drive electrode TL(n+4) are collectively used is the same as the configuration where the drive electrode TL(n) and the drive electrode TL(n+1) are collectively used.

For example, it is possible to reduce the number of switches in the configuration of the first embodiment as compared to the configuration illustrated in FIGS. 36 and 37. Thus, the control becomes easy, and it is possible to suppress the increase of the occupied area.

<Configuration of Switching Regulator Circuit>

Figure 19:
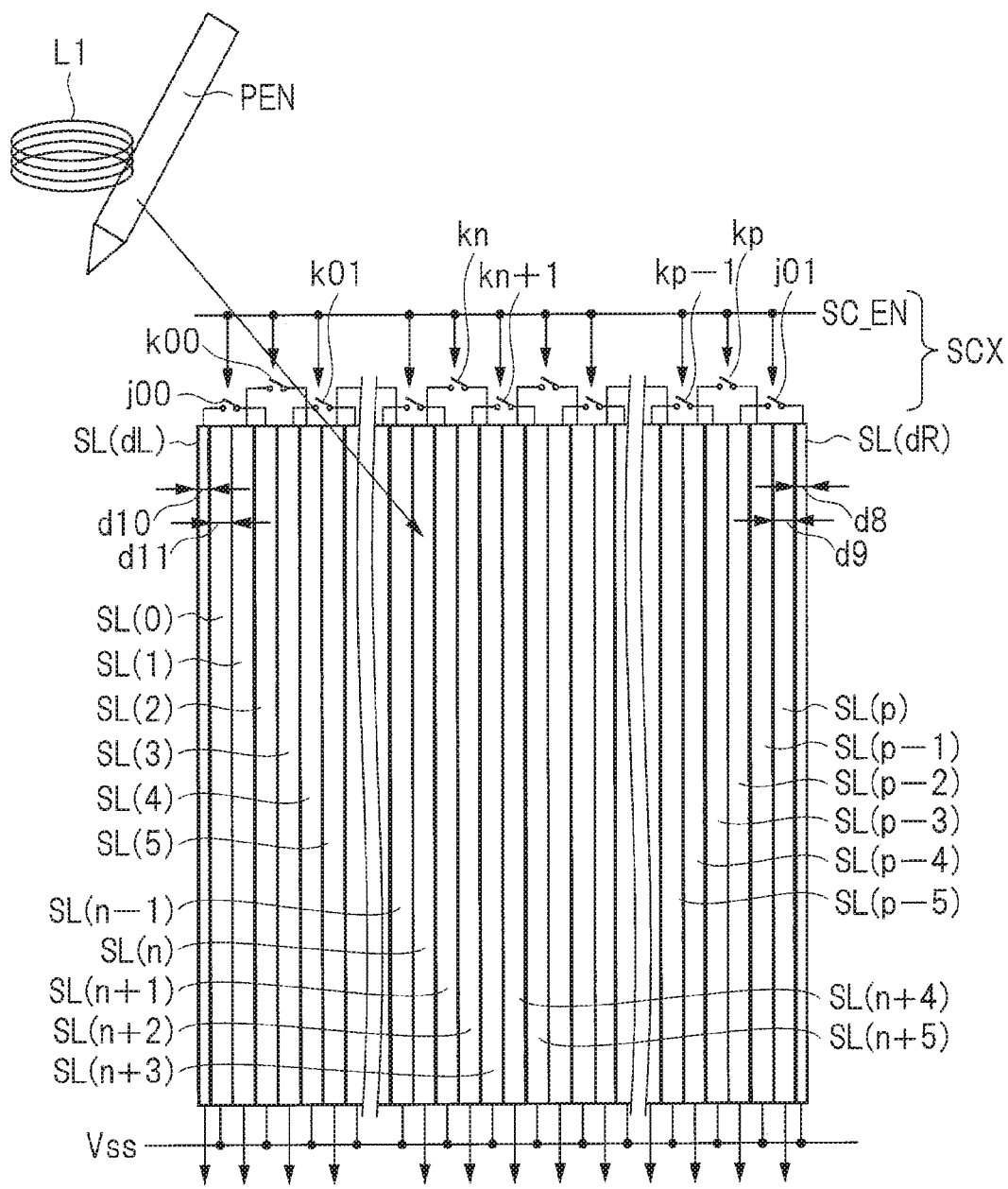
FIG. 19 is a plan view schematically illustrating a configuration of the display device according to the first embodiment.

FIG. 19 is a plan view illustrating the configuration of the display device 1 according to the first embodiment. FIG. 19 illustrates a state at the time of magnetic field touch detection. As described with reference to FIGS. 14 to 17, the magnetic field is generated using the drive electrode in the magnetic field generation period TGT at the time of magnetic field touch detection. As described with reference to FIGS. 1 to 2B, the electric charge amount to be charged in the capacitive element C inside the pen is changed by the magnetic field generated in the magnetic field generation period TGT depending on whether the pen is proximate. In the magnetic field detection period TDT, the magnetic field generated by the coil L1 inside the pen is detected based on the electric charge amount stored in the capacitive element C inside the pen.

The description has been given in FIGS. 1 to 2B by exemplifying the case where the magnetic field generation coil and the magnetic field detection coil are configured using the same coil. On the contrary, the magnetic field is generated without using the coil (magnetic field generation coil) and the magnetic field from the pen is detected by the magnetic field detection coil in the magnetic field generation period TGT in the first embodiment as described in FIGS. 14 to 17.

In the first embodiment, the magnetic field detection coil is formed using the signal line in the magnetic field detection period TDT.

FIG. 19 does not illustrate the drive electrode used for the magnetic field generation in the magnetic field generation period TGT, but illustrates only the signal line forming the magnetic field detection coil in the magnetic field detection period TDT. The signal line is used to detect the magnetic field in the magnetic field detection period TDT, and thus can be regarded as the detection electrode. When it is regarded in this manner, only the detection electrode can be regarded as being drawn in FIG. 19.

In FIG. 19, the coil L1 inside the pen generates the magnetic field based on electric charges of the capacitive element C which is charged by the voltage induced by the magnetic field in the magnetic field generation period TGT. In FIG. 19, numerals SL(0) to SL(p) represent the signal lines. The signal lines SL(0) to SL(p) cross the drive electrodes TL(0) to TL(p) as illustrated in FIG. 10. That is, the signal lines SL(0) to SL(p) are arranged in parallel to each other between the side 2-R and the side 2-L of the display panel 2.

Although not particularly limited, a signal line SL(dL) for magnetic field is arranged along the side 2-L of the display panel 2, and a signal line SL(dR) for magnetic field is arranged along the side 2-R of the display panel 2 in the first embodiment. That is, provided are the magnetic field signal line SL(dR) (second signal line) arranged to be parallel to the signal lines SL(0) to SL(p) (first signal line) along the side 2-R outside the active area of the display panel 2, and the magnetic field signal line SL(dL) (second signal line) arranged to be parallel to the signal lines SL(0) to SL(p) along the side 2-R outside the active area of the display panel 2. The magnetic field signal lines SL(dR) and SL(dL) are provided outside the active area of the display panel 2, and thus are used at the time of magnetic field touch detection without affecting the display.

In the first embodiment, the switching regulator circuit SCX is arranged along the side 2-U of the display panel 2. In FIG. 19, the upper side indicates the side 2-U of the display panel 2 side, and the lower side indicates the side 2-D of the display panel 2 side. The switching regulator circuit SCX is provided with seventh switches j00 and j01 and eighth switches k00 to kp.

The signal lines SL(0) to SL(p) are arranged from the side 2-L to the side 2-R of the display panel 2 in this order although not particularly limited thereto. In the first embodiment, the signal lines, which are arranged with two signal lines sandwiched therebetween, are connected to each other by the eighth switches k00 to kp in the magnetic field detection period TDT. When the description is given by exemplifying FIG. 19, the eighth switch k00 is connected between an end portion of the signal line SL(1) and an end portion of the signal line SL(4), and the eighth switch k01 is connected between an end portion of the signal line SL(3) and an end portion of the signal line SL(6). In addition, the eighth switch kn−1 is connected between an end portion of the signal line SL(n−2) and an end portion of the signal line SL(n+1); the eighth switch kn is connected between an end portion of the signal line SL(n) and an end portion of the signal line SL(n+3); and the eighth switch kn+1 is connected between an end portion of the signal line SL(n+2) and an end portion of the signal line SL(n+5).

Further, the eighth switch kp−1 is connected between an end portion of the signal line SL(p−6) and an end portion of the signal line SL(p−3), and the eighth switch kp is connected between an end portion of the signal line SL(p−4) and an end portion of the signal line SL(p−1).

The seventh switch j00 is connected between an end portion of the magnetic field signal line SL(dL) and an end portion of the signal line SL(2), and the seventh switch j01 is connected between an end portion of the magnetic field signal line SL(dR) and an end portion of the signal line SL(p−2).

Each of the seventh switches j00 and j01 and the eighth switches k00 to kp is subjected to the switch control by the magnetic field enable signal SC_EN. In the first embodiment, the seventh switches j00 and j01 and the eighth switches k00 to kp are turned into the on-state when the magnetic field enable signal SC_EN designates the magnetic field touch detection, and turned into the off-state in the other cases.

As a result, the signal lines with the two signal lines sandwiched therebetween are electrically connected to each other at the time of magnetic field touch detection. When the description is given by exemplifying FIG. 19, the signal lines SL(1) and SL(4), which are arranged with the signal lines SL(2) and SL(3) sandwiched therebetween, are electrically connected to each other via the eighth switch k00. In the same manner, the signal line SL(3) and the signal line SL(6), which are arranged with the signal lines SL(4) and SL(5) sandwiched therebetween, are connected to each other via the eighth switch k01; the signal line SL(n−2) and the signal line SL(n+1), which are arranged with the signal lines SL(n−1) and SL(n) sandwiched therebetween, are connected to each other via the eighth switch kn−1; the signal line SL(n) and the signal line SL(n+3), which are arranged with the signal lines SL(n+1) and SL(n+2) sandwiched therebetween, are connected to each other via the eighth switch kn; and the signal line SL(n+2) and the signal line SL(n+5), which are arranged with the signal lines SL(n+3) and SL(n+4) sandwiched therebetween, are connected to each other via the eighth switch kn+1.

Further, the signal line SL(p−6) and the signal line SL(p−3), which are arranged with the signal lines SL(p−5) and SL(p−4) sandwiched therebetween, are connected to each other via the eighth switch kp−1; and the signal line SL(p−4) and the signal line SL(p−2), which are arranged with the signal lines SL(p−3) and SL(p−2) sandwiched therebetween, are connected to each other via the eighth switch kp.

Further, the magnetic field signal line SL(dL) and the signal line SL(2), which are arranged with the signal lines SL(0) and SL(1) sandwiched therebetween, are connected to each other via the seventh switch j00; and the magnetic field signal line SL(dR) and the signal line SL(p−2), which are arranged with the signal lines SL(p−1) and SL(p) sandwiched therebetween, are connected to each other via the seventh switch j01 in the first embodiment.

Accordingly, the magnetic field detection coil is formed using a plurality of arbitrary signal lines among the signal lines SL(0) to SL(p) in the magnetic field detection period TDT. In the first embodiment, it is also possible to form the magnetic field detection coil in the vicinity of the sides 2-R and 2-L of the display panel 2 in the magnetic field detection period TDT. That is, it is possible to form the magnetic field detection coil, which inside has the signal lines SL(0) and SL(1) arranged to be proximate to the side 2-L of the display panel 2, using the magnetic field signal line SL(dL) and the signal line SL(2) as a winding. Similarly, it is possible to form the magnetic field detection coil, which inside has the signal lines SL(p−1) and SL(p) arranged to be proximate to the side 2-R of the display panel 2, using the magnetic field signal line SL(dR) and the signal line SL(p−2) as a winding. Accordingly, it is also possible to detect a case where the pen is proximate to the vicinity of the side 2-R and the side 2-L. In addition, the magnetic field detection coils to be formed overlap each other in the first embodiment as understood from FIG. 19. Accordingly, it is possible to prevent a miss in detection.

Widths d8 and d10 of the magnetic field signal lines SL(dR) and SL(dL) are narrower than widths d9 and d10 of the signal lines SL(0) to SL(p). Accordingly, it is possible to suppress the increase of the frame.

In the magnetic field detection period TDT, the ground voltage Vss is supplied to one terminal out of a pair of terminals of each of the magnetic field detection coils formed by the signal lines, and the other terminal is connected to the amplifier circuit AMP described in FIG. 8. When the description is given by exemplifying FIG. 19, the end portion of each of the signal lines SL(n−2), SL(n) and SL(n+2) is connected to the amplifier circuit AMP. When the magnetic field from the pen reaches the magnetic field detection coil configured by the signal lines, the induced voltage is generated in the magnetic field detection coil, and an input signal of the amplifier circuit AMP is changed. The amplifier circuit AMP amplifies this change of the input signal, and outputs the amplified signal as the sense signals S(0) to S(p).

Meanwhile, the seventh switches j00 and j01 and the eighth switches k00 to kp are turned into the off-state at the time of electric field touch detection. At the time of electric field touch detection, the drive electrode generates the electric field as described with reference to FIGS. 14 and 18. The electric field around the signal line is changed depending on whether the finger is touched, and this change is sent to the amplifier circuit AMP, and amplified and outputted as the sense signals S(0) to S(p).

The first embodiment has shown the example where the magnetic field signal lines SL(dR) and SL(dL), which serve as the winding at the time of forming the magnetic field detection coil, are provided along the both sides of the display panel 2, but the magnetic field signal lines SL(dR) and SL(dL) may be provided on any one side, of course.

Figure 20:
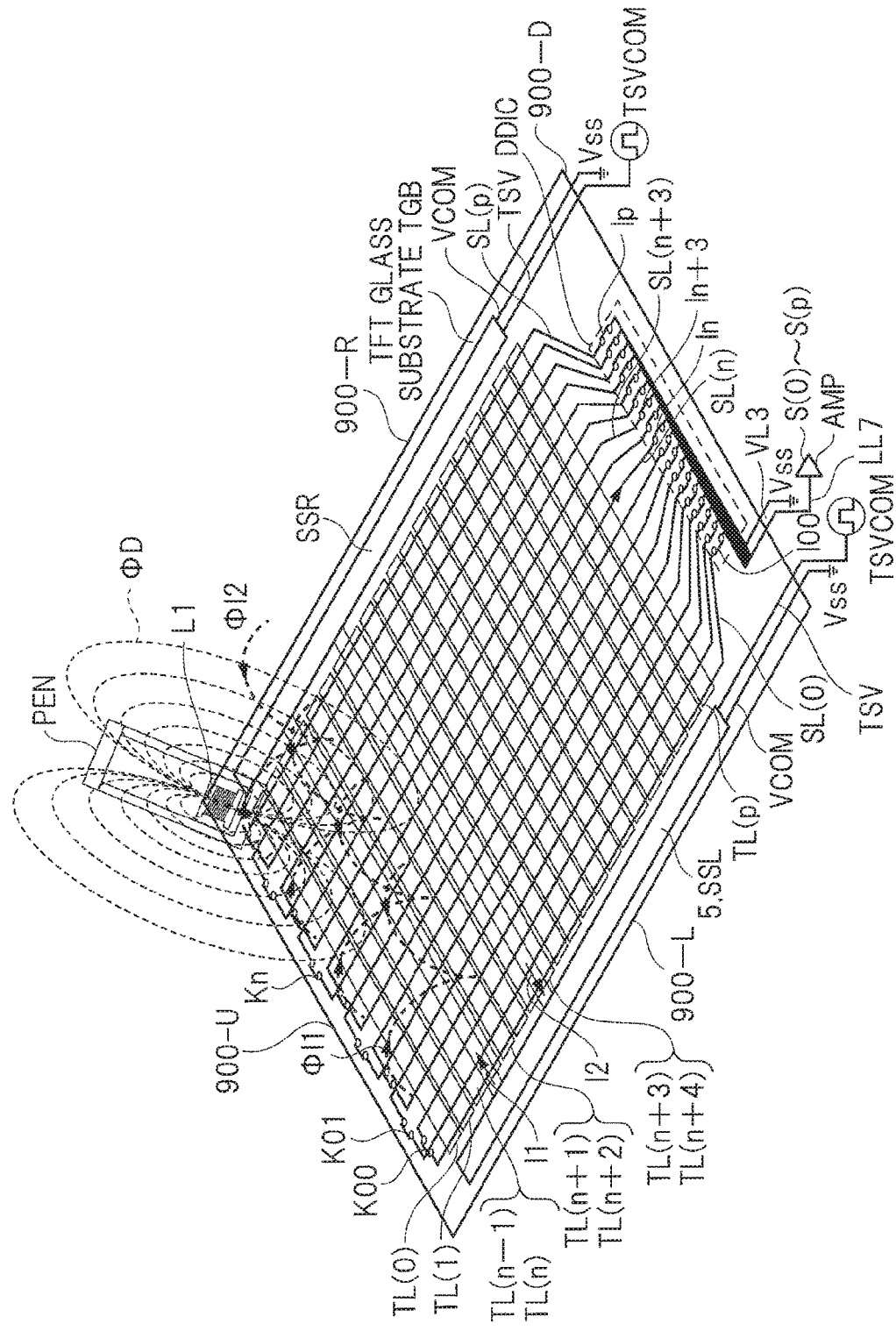
FIG. 20 is a perspective view schematically illustrating a configuration of the display device according to the first embodiment.

FIG. 20 is a perspective view schematically illustrating the configuration of the display device 1 according to the first embodiment. FIG. 20 illustrates the drive electrodes TL(0) to TL(p), the signal lines SL(0) to SL(p), the eighth switches k00 to kp, the drive semiconductor device DDIC, the selection drive circuits SSR and SSL, and the gate driver 5. These parts are formed on the TFT glass substrate TGB. Thus, FIG. 20 can be also regarded as illustrating the display device 1 mounted to the module. In addition, FIG. 20 also illustrates the pen provided with the coil L1.

The selection drive circuit SSR is arranged along the side 900-R of the module, and the selection drive circuit SSL and the gate driver 5 are arranged along the side 900-L. The signal lines SL(0) to SL(p) are arranged to be parallel to each other between the selection drive circuit SSL and the selection drive circuit SSR, and the eighth switches k00 to kp are arranged along the side 900-U of the module. The drive electrodes TL(0) to TL(p) are orthogonal to the signal lines SL(0) to SL(p), and arranged to be parallel to each other.

The eighth switches k00 to kp connect the signal lines to each other during the touch detection as described with reference to FIG. 19. In FIG. 20, ninth switches l00 to lp formed on the TFT glass substrate TGB are arranged along the side 900-D of the module.

The ninth switches l00 to lp are divided into two groups, the ninth switches of a first group being connected between an end portion of each of the signal lines, to which the ground voltage Vss needs to be supplied in the magnetic field detection period TDT, for example, the signal lines SL(2), SL(n+3), SL(p−1) etc. illustrated in FIG. 19, and a voltage wiring VL3, and being turned into the on-state in the magnetic field detection period TDT. In addition, the ninth switches of a second group are connected between an end portion of the signal line, which outputs the change of the signal in the coil in the magnetic field detection period TDT, for example, the signal lines SL(1), SL(n), SL(p−4) etc. illustrated in FIG. 19, and a corresponding signal wiring LL7. In FIG. 20, reference signs l00, ln, ln+3 and lp are attached, for example, to the ninth switch (second group) connected to the end portion of the signal line SL(0); the ninth switch (second group) connected to the end portion of the signal line SL(n); the ninth switch (first group) connected to the end portion of the signal line SL(n+3); and the ninth switch (first group) connected to the end portion of the signal line L(p), respectively. The number of signal wirings included in the signal wiring LL7 corresponds to the number of the ninth switches of the second group although illustrated as a single wiring. The ninth switches of the second group are also turned into the on-state in the magnetic field detection period. Accordingly, the signal generated in each of the coils is transmitted to the corresponding signal wiring LL7, amplified by the amplifier circuit AMP, and supplied to the touch detection semiconductor device 6 (FIG. 8) as the sense signals S(0) to S(p).

The ninth switches of the second group is also turned into the on-state, the signal change in the signal line is supplied to the amplifier circuit AMP, amplified, and supplied to the touch detection semiconductor device 6 (FIG. 8) as the sense signals S(0) to S(p) at the time of electric field touch detection.

In the first embodiment, the ninth switches l00 to lp are formed on the TFT glass substrate, and the drive semiconductor device DDIC is arranged to cover the ninth switches l00 to lp. Accordingly, it is possible to suppress widening of the frame.

Although not particularly limited, the signal wiring TSV and the voltage wiring VCOM extend along the side 900-R and 900-L of the module. The drive signal TSVCOM is supplied to the signal wiring TSV, and the ground voltage Vss is supplied to the voltage wiring VCOM in the magnetic field generation period TGT. In addition, the drive signal TSVCOM is supplied to the signal wiring TSV at the time of electric field touch detection.

The selection drive circuits SSL and SSR cause the current I1 in the direction indicated by the arrow to flow in the drive electrodes TL(n−1) and TL(n) in the magnetic field generation period TGT for the magnetic field touch detection. In addition, the selection drive circuits SSL and SSR cause the current I2 in the direction indicated by the arrow to flow in the drive electrodes TL(n+3) and TL(n+4) at this time. Accordingly, the drive signal TSVCOM periodically changes, and so the periodically changing magnetic field is generated around each of the drive electrodes TL(n−1), TL(n), TL(n+3) and TL(n+4). In FIG. 20, each state of the generated magnetic fields ϕI1 and ϕI2 is schematically illustrated in the broken line. The magnetic fields ϕI1 and ϕI2 are superimposed on each other in an area of the drive electrodes TL(n−1) and TL(n+1) sandwiched among the drive electrodes TL(n−1), TL(n), TL(n+3) and TL(n+4), thereby generating a strong magnetic field.

When the pen is present in the vicinity of the area where the strong magnetic field is generated, the coil L1 inside the pen generates the induced voltage due to the action of mutual induction. The capacitive element C (not illustrated) inside the pen PN is charged by the generated induced voltage.

The coil L1 inside the pen generates the magnetic field by the electric charges charged in the capacitive element C in the magnetic field detection period TDT. Magnetic lines at this time are represented by ϕD in FIG. 20.

As described with reference to FIG. 19, the eighth switches k00 to kp are turned into the on-state in the magnetic field detection period TDT. Accordingly, the plurality of coils are formed using the signal lines SL(0) to SL(p) as each winding. The induced voltage is generated in the coil using the signal line as the winding due to the action of mutual induction between the coil using the signal line as the winding and the pen-in coil L1, and the signal in the signal line is transmitted to the ninth switches of the second group. When the ninth switches of the second group are turned into the on-state, the signal is outputted from the amplifier circuit AMP as the sense signals S(0) to S(p). In FIG. 20, the signal transmitted to the ninth switch ln via the signal line SL(n) is indicated by the solid line with the arrow. Accordingly, the coordinate touched by the pen can be specified by specifying the detection electrode which detects the magnetic field at the time of driving the drive electrode which has generated the magnetic field.

Although the description has been given regarding the example where the magnetic field signal lines SL(dL) and SL(dR) are arranged outside the active area of the display panel 2, the invention is not limited thereto. For example, the magnetic field signal line SL(dL) and/or the magnetic field signal line SL(dR) may be arranged along each of the sides 2-L and 2-R inside the active area of the display panel 2. In this case, it is possible to reduce narrowing of the display area by setting the width d10 of the magnetic field signal wiring SL(dL) and/or SL(dR) to be arranged to be narrower than a width d11 of the signal line.

<Modified Example>

Figure 21:
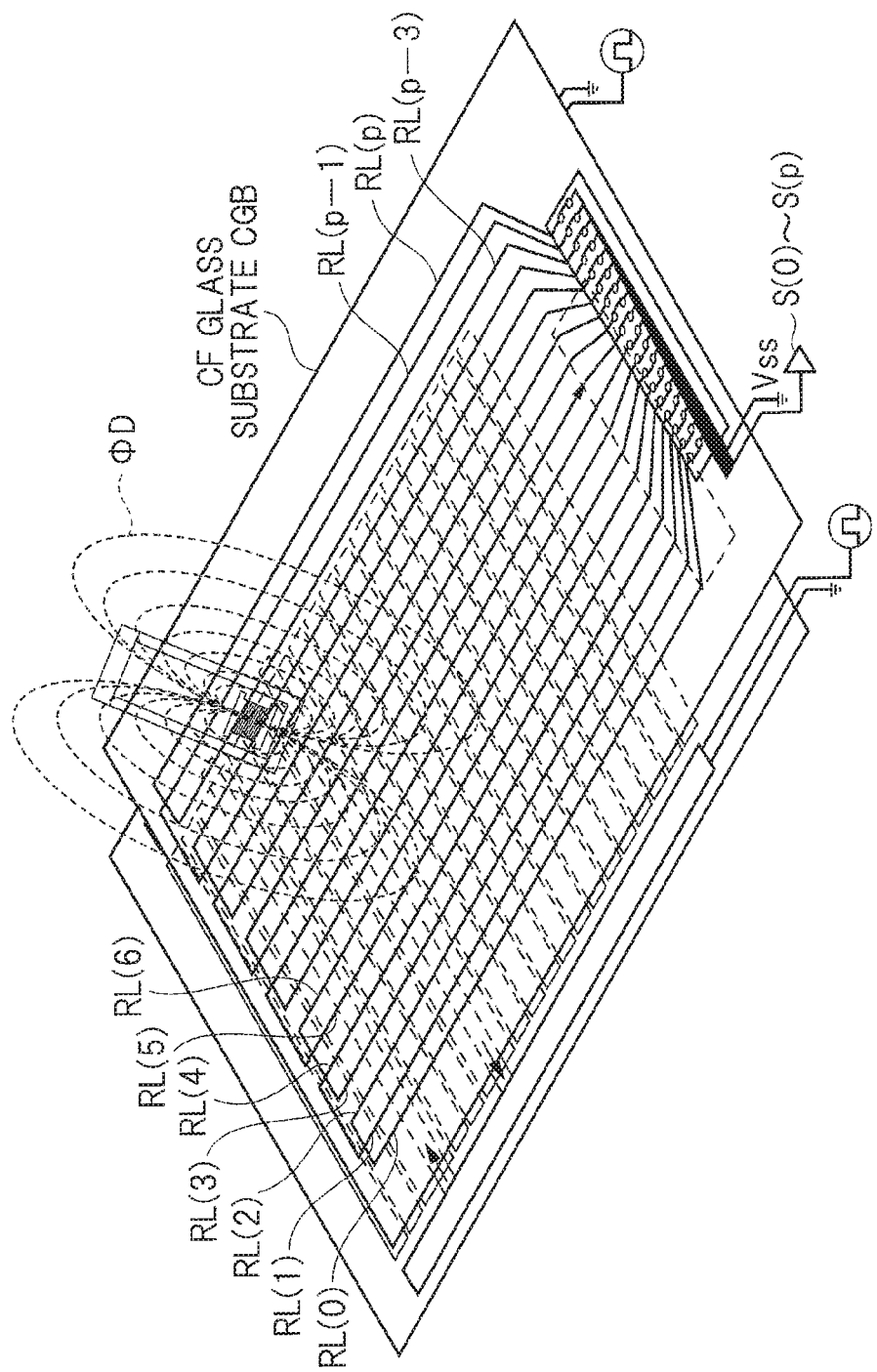
FIG. 21 is a perspective view schematically illustrating a configuration of a display device according to a modified example of the first embodiment.

FIG. 21 is a perspective view schematically illustrating a configuration of the display device 1 according to a modified example of the first embodiment. Since FIG. 21 is similar to FIG. 20, a different point from FIG. 20 will be mainly described. In the display device 1 illustrated in FIG. 20, the magnetic field detection coil has been formed using the signal lines SL(0) to SL(p) at the time of magnetic field touch detection. In addition, the change in the electric field has been also detected using the signal lines SL(0) to SL(p) at the time of electric field touch detection. In regard to this, detection electrodes RL(0) to RL(p) formed on the CF glass substrate CGB are used to form a magnetic field detection coil at the time of magnetic field touch detection in the modified example. In addition, the detection electrodes RL(0) to RL(p) are also used to detect a change in an electric field at the time of electric field touch detection. That is, the detection electrodes RL(0) to RL(p) formed on the CF glass substrate CGB are used at each time of magnetic field touch detection and electric field touch detection instead of the signal lines SL(0) to SL(p) illustrated in FIG. 20.

The detection electrodes RL(0) to RL(p) are formed on the main surface CSF1 of the CF glass substrate CGB as illustrated in FIGS. 4A and 4B. Thus, the detection electrodes RL(0) to RL(p) are formed on the drive electrodes TL(0) to TL(p) with the liquid crystal layer, the color filter, and the CF glass substrate CGB sandwiched therebetween. When seen in a plan view from the main surface CSF1 of the CF glass substrate CGB side, the detection electrodes RL(0) to RL(p) are parallel to each other and are arranged to orthogonal to the drive electrodes TL(0) to TL(p).

In FIG. 21, one end portions the detection electrodes RL(0) to RL(p) are connected to each other with a predetermined interval. In the modified example, the one end portions of the detection electrodes RL(0) to RL(p) are connected to each other with an interval that causes two detection electrodes to be sandwiched therebetween, similarly to the signal lines SL(0) to SL(p) illustrated in FIG. 20. This connection is achieved by connecting the detection electrodes using the signal wiring formed on the CF glass substrate CGB. In FIG. 21, reference signs are attached only to the detection electrodes RL(0) to RL(6), RL(n), RL(n+3) and RL(p−3) to RL(p) among the detection electrodes RL(0) to RL(p) in order to facilitate the viewability of the drawing. When the description is given by exemplifying FIG. 21, the one end portions of the detection electrodes RL(1) and RL(4) are connected to each other on the side 900-U of the module side. In addition, the one end portions of the detection electrode RL(3) and RL(6) are connected to each other. Incidentally, the one end portion of the detection electrode RL(2) is connected to the one end portion of the detection electrode RL(0), which is the most proximate to the side 900-L of the module with the single detection electrode TL(1) sandwiched therebetween. One end portions of the other detection electrodes are also connected to each other so as to sandwich two detection electrodes except for the detection electrode RL(p−3).

The respective other end portions of the detection electrodes RL(0) to RL(p) are connected to the ninth switches l00 to lp formed on the TFT glass substrate TGB. In FIG. 21, the ninth switches l00 to lp are drawn on the CF glass substrate CGB to illustrate each connection between the detection electrodes RL(0) to RL(p) and the ninth switches l00 to lp, but the ninth switches l00 to lp are formed on the TFT glass substrate TGB similarly to FIG. 20. Further, the ninth switches l00 to lp are covered by the drive semiconductor device DDIC, similarly to the illustration in FIG. 20. In FIG. 21, the drive semiconductor device DDIC is indicated by the broken line on the TFT glass substrate TGB.

The ninth switches l00 to lp illustrated in FIG. 21 are configured by a first group and a second group, similarly to the ninth switches l00 to lp illustrated in FIG. 20. In the magnetic field detection period TDT, the ground voltage Vss is supplied to an end portion of the magnetic field detection coil formed using the detection electrodes RL(0) to RL(p) as the ninth switches of the first group are turned into the on-state, and the end portion of the magnetic field detection coil is connected to the amplifier circuit AMP as the ninth switches of the second group are turned into the on-state.

In the modified example, the magnetic field is also generated by the drive electrodes TL(0) to TL(p) in the magnetic field generation period TGT similarly to FIG. 20. When the pen generates the magnetic field φD based on the generated magnetic field in the magnetic field detection period TDT, the magnetic field φD is detected by the magnetic field detection coil formed using the detection electrodes RL(0) to RL(p) and outputted from the amplifier circuit AMP as the sense signals S(0) to S(p). Thus, the coordinate touched by the pen can be specified by specifying the detection electrode which is detected the magnetic field at the time of driving the drive electrode which is generated the magnetic field.

Similarly to FIG. 20, an electric field is generated by the drive electrodes TL(0) to TL(p) at the time of electric field touch detection, and a change in the electric field caused depending on whether the finger is touched is transmitted to the amplifier circuit AMP by the detection electrodes RL(0) to RL(p) and is outputted as the sense signals S(0) to S(p).

The signal lines SL(0) to SL(p) are used to transmit the image information in the display period, and thus need to be electrically isolated from each other in the display period. Thus, the seventh switch and the eighth switch are provided in the display device 1 illustrated in FIGS. 19 and 20. In regard to this, the magnetic field touch detection and the electric field touch detection are performed using the detection electrodes RL(0) to RL(p) without using the signal lines SL(0) to SL(p) in the modified example illustrated in FIG. 21. Thus, it is unnecessary to provide the seventh switch and the eighth switch for the magnetic field touch detection, and it is possible to suppress the increase of the occupied area.

Since it is not required to form the magnetic field generation coil in the first embodiment, the control becomes easy, and it is possible to suppress the increase of the occupied area of the control circuit.

Second Embodiment

Figure 22:
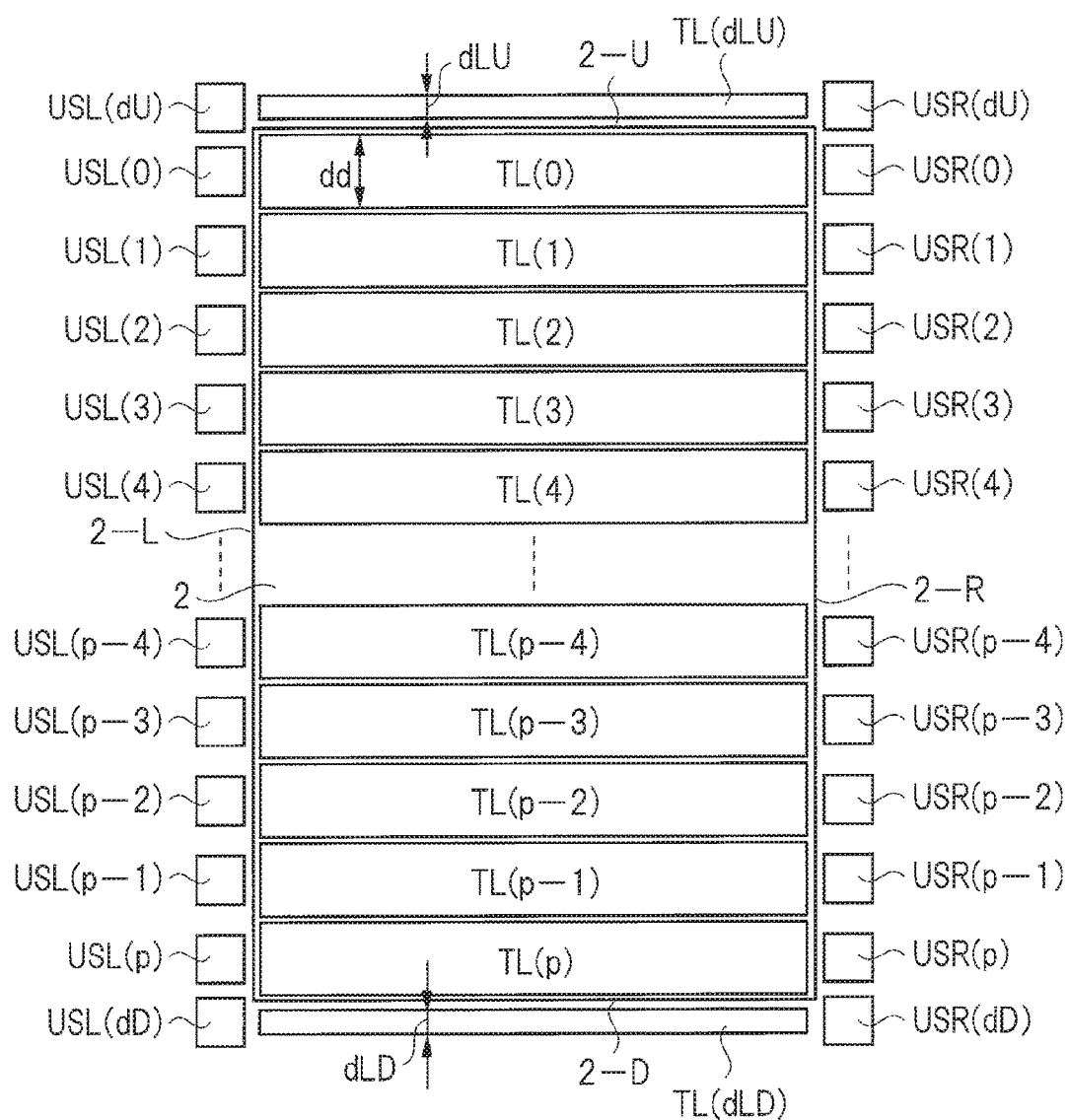
FIG. 22 is a plan view illustrating a configuration of a display device according to a second embodiment.

FIG. 22 is a plan view illustrating a configuration of the display device 1 according to a second embodiment. FIG. 22 illustrates only a part relating to the display panel 2 described in the first embodiment, and does not illustrate the other parts.

In FIG. 22, numerals TL(0) to TL(p) represent drive electrodes arranged in parallel to each other between the side 2-U and the side 2-D of the display panel 2. In addition, numeral TL(dLU) represents a dummy drive electrode for magnetic field generation, which is arranged along the side 2-U in an area (non-active area) outside the display panel 2, and numeral TL(dLD) represents a dummy drive electrode for magnetic field generation which is arranged along the side 2-D in the area (non-active area) outside the display panel 2. The dummy drive electrodes for magnetic field generation are arranged in the external area of the display panel 2, and thus will be referred to also as an external area drive electrode, hereinafter.

In addition, each of numerals USL(0) to USL(p) and USR(0) to USR(p) represents a unit drive circuit in FIG. 22. As described with reference to FIGS. 14, 16 and 17, the respective unit drive circuits USL(0) to USL(p) are arranged along the side 2-L of the display panel 2, and correspond to the drive electrodes TL(0) to TL(p). In addition, the respective unit drive circuits USR(0) to USR(p) are arranged along the side 2-R of the display panel 2, and correspond to the drive electrodes TL(0) to TL(p).

As described in the first embodiment, the drive signal TSVCOM is supplied to two drive electrodes, arranged to sandwich a drive electrode corresponding to a unit drive circuit which outputs a selection signal designating selection, in the magnetic field generation period TGT. For example, when the unit drive circuits USL(2) and USR(2) output the selection signal designating selection in the magnetic field generation period TGT, the drive signal TSVCOM is supplied to the drive electrodes TL(1) and TL(3) which are arranged to sandwich the drive electrode TL(2) corresponding to the unit drive circuits USL(2) and USR(2). That is, the drive signal TSVCOM is supplied to one end portion of the drive electrode TL(1) from the side 2-L side, and the ground voltage Vss is supplied to the other end portion of the drive electrode TL(1) from the side 2-R side. At this time, the drive signal TSVCOM is supplied to the other end portion of the drive electrode TL(3) from the side 2-R side, and the ground voltage Vss is supplied to one end portion of the drive electrode TL(3) from the side 2-L side. Accordingly, the magnetic field generated around the drive electrode TL(1) and the magnetic field generated around the drive electrode TL(3) are superimposed on each other around the drive electrode TL(2) to be selected, thereby generating a strong magnetic field.

In this case, a drive electrode proximate to the drive electrode TL(0) is only the drive electrode TL(1) when the drive electrode TL(0) arranged to be proximate to the side 2-U of the display panel 2 is selected. Thus, the magnetic field generated around the drive electrode TL(0) becomes weak when the drive electrode TL(0) is selected. Similarly, a drive electrode proximate to the drive electrode TL(p) is only the drive electrode TL(p−1) when the drive electrode TL(p) arranged to be proximate to the side 2-D of the display panel 2 is selected. Thus, the magnetic field generated around the drive electrode TL(p) becomes weak when the drive electrode TL(p) is selected.

In the second embodiment, the external area drive electrode TL(dLU) is arranged at the opposite side to the drive electrode TL(0) with the side 2-U sandwiched therebetween, and the external area drive electrode TL(dLD) is arranged at the opposite side to the drive electrode TL(p) with the side 2-D sandwiched therebetween.

When the drive electrode TL(0) is caused to generate the magnetic field, each of the drive electrode TL(1) and the external area drive electrode TL(dLU) arranged with the drive electrode TL(0) sandwiched therebetween is caused to generate the magnetic field. In addition, when the drive electrode TL(p) is caused to generate the magnetic field, each of the drive electrode TL(p−1) and the external area drive electrode TL(dLD) arranged with the drive electrode TL(p) sandwiched therebetween is caused to generate the magnetic field. Accordingly, it is possible to prevent reduction in accuracy of detection of the pen in an area closer to the sides 2-U and 2-D of the display panel 2.

Incidentally, the external area drive electrodes TL(dLU) and TL(dLD) are used only for the magnetic field generation, and thus each of line widths dLU and dLD may be narrower than each line width dd of the drive electrodes TL(0) to TL(p).

Figure 23:
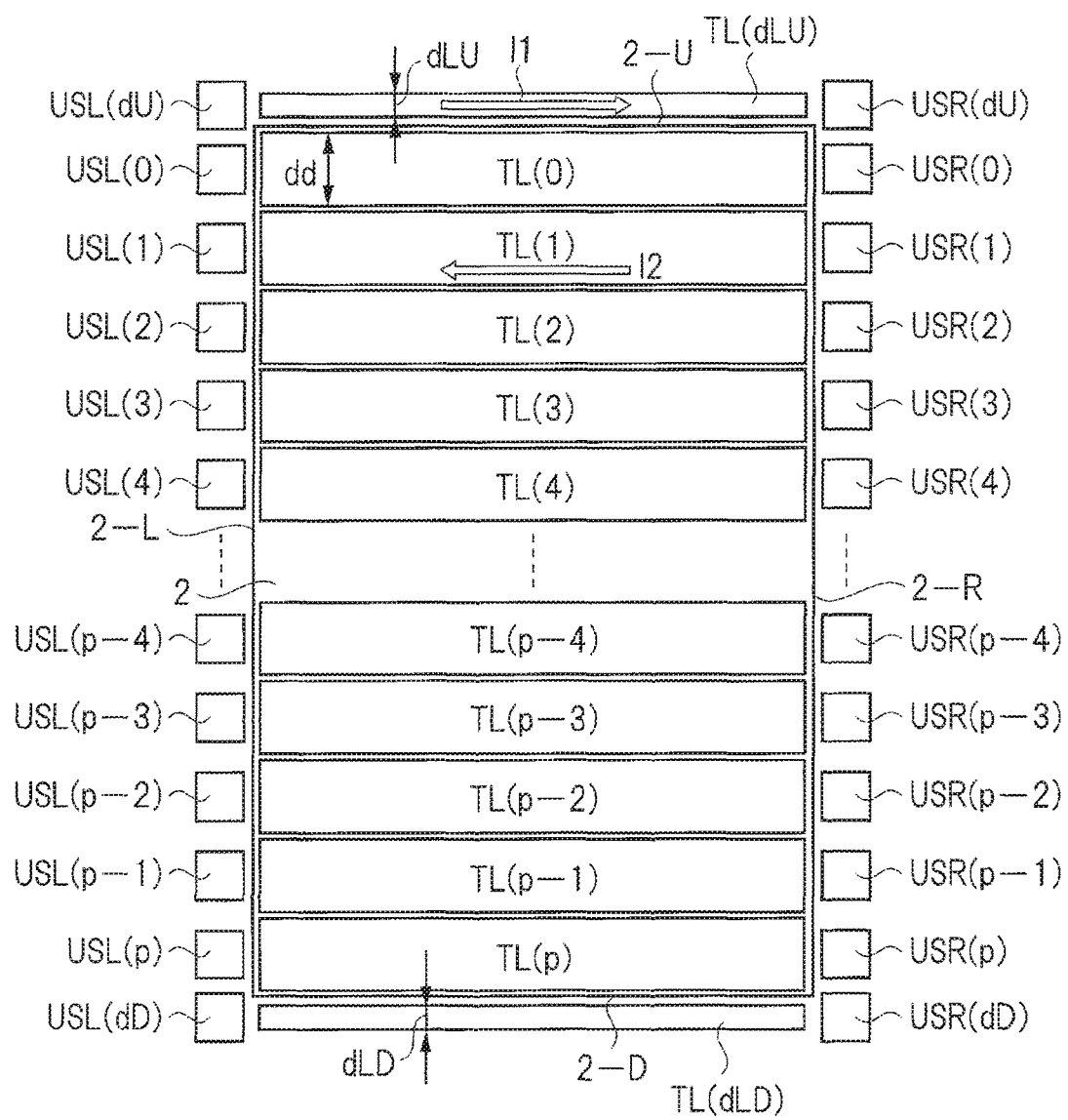
FIG. 23 is a plan view illustrating an operation of the display device according to the second embodiment.

FIG. 23 is a plan view illustrating the case of generating the magnetic field around the drive electrode TL(0). The selection circuit SL-C (FIGS. 8 and 14) is configured so that the drive signal TSVCOM is supplied to one end portion of the external area drive electrode TL(dLU) on the side 2-L side in response to the selection signal from the unit drive circuit USL(0), and that the ground voltage Vss is supplied to the one end portion of the drive electrode TL(1) on the side 2-L side when the unit drive circuits USL(0) and USR(0) corresponding to the drive electrode TL(0) output the selection signal indicating the selection in the magnetic field generation period TGT. In addition, the selection circuit SR-C (FIGS. 8 and 14) is configured so that the ground voltage Vss is supplied to the other end portion of the external area drive electrode TL(dLU) on the side 2-R side in response to the selection signal from the unit drive circuit USR(0) at this time, and that the drive signal TSVCOM is supplied to the other end portion of the drive electrode TL(1) on the side 2-R side.

Accordingly, when the drive electrode TL(0) arranged to be the most proximate to the side 2-U is selected, the current I2 with the arrow flows in the drive electrode TL(1), thereby generating the magnetic field. In addition, the current I1 with the arrow flows in the external area drive electrode TL(dLU), thereby generating the magnetic field. The magnetic field generated by the drive electrode TL(1) and the magnetic field generated by the external area drive electrode TL(dLU) are superimposed on each other in an area of the drive electrode TL(0), and so it is possible to generate a strong magnetic field in the area of the drive electrode TL(0).

Figure 24:
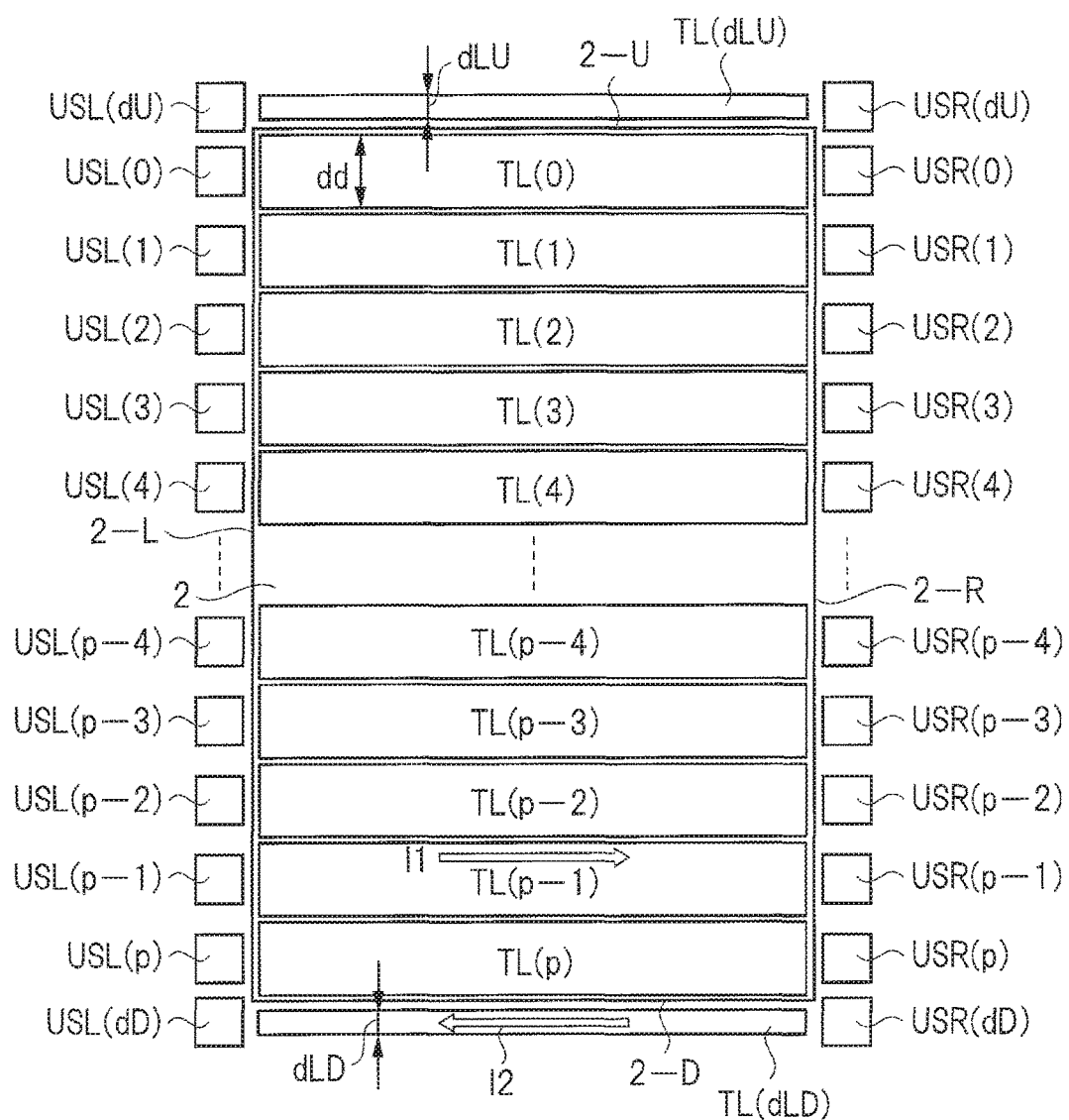
FIG. 24 is a plan view illustrating the operation of the display device according to the second embodiment.

FIG. 24 is a plan view illustrating the case of generating the magnetic field around the drive electrode TL(p). The selection circuit SL-C (FIGS. 8 and 14) is configured so that the ground voltage Vss is supplied to the one end portion of the external area drive electrode TL(dLU) on the side 2-L side in response to the selection signal from the unit drive circuit USL(p), and that the drive signal TSVCOM is supplied to one end portion of the drive electrode TL(p−1) on the side 2-L side when the unit drive circuits USL(p) and USR(p) corresponding to the drive electrode TL(p) output the selection signal indicating the selection in the magnetic field generation period TGT. In addition, the selection circuit SR-C (FIGS. 8 and 14) is configured so that the drive signal TSVCOM is supplied to the other end portion of the external area drive electrode TL(dLU) on the side 2-R side in response to the selection signal from the unit drive circuit USR(p) at this time, and that the ground voltage Vss is supplied to the other end portion of the drive electrode TL(p−1) on the side 2-R side.

Accordingly, when the drive electrode TL(p) arranged to be the most proximate to the side 2-D is selected, the current I1 with the arrow flows in the drive electrode TL(p−1), thereby generating the magnetic field. In addition, the current I2 with the arrow flows in the external area drive electrode TL(dLD), thereby generating the magnetic field. The magnetic field generated by the drive electrode TL(p−1) and the magnetic field generated by the external area drive electrode TL(dLD) are superimposed on each other in an area of the drive electrode TL(p), and so it is possible to generate a strong magnetic field in the area of the drive electrode TL(p).

The description has been given regarding the example where the drive signal TSVCOM and the ground voltage Vss are supplied to the two drive electrodes, which are arranged to sandwich the drive electrode corresponding to the unit drive circuit that outputs the selection signal indicating the selection, in the magnetic field generation period TGT, but the invention is not limited thereto. For example, two drive electrodes, which are arranged to sandwich a drive electrode corresponding to an area where a strong magnetic field is generated, may be selected by the corresponding unit selection circuit. In this case, the unit drive circuits USL(dU) and USR(dU) are arranged at both end portions of the external area drive electrode TL(dLU), and the unit drive circuits USL(dD) and USR(dD) are arranged at both end portions of the external area drive electrode TL(dLD) as illustrated in FIGS. 22 to 24.

In this case, among the unit drive circuits USL(0) to USL(p), USL(dL) and USL(dD), two unit drive circuits, which are arranged to sandwich the unit drive circuit corresponding to the drive electrode that generates the strong magnetic field, output the selection signal indicating the selection in the magnetic field generation period TGT. Similarly, among the unit drive circuits USR(0) to USR(p), USR(dL) and USR(dD), two unit drive circuits, which are arranged to sandwich the unit drive circuit corresponding to the drive electrode that generates the strong magnetic field, output the selection signal indicating the selection.

For example, when a strong magnetic field is caused to be generated in an area of the drive electrode TL(2), the unit drive circuit USL(1) and the unit drive circuit USL(3) arranged to sandwich the unit selection circuit USL(2) output the selection signal indicating the selection. The selection circuit SL-C (FIGS. 8 and 14) supplies the drive signal TSVCOM to the one end portion of the drive electrode TL(1) corresponding to the unit selection circuit USL(1) based on the selection signals from the unit selection circuits USL(1) and USL(3), and supplies the ground voltage Vss to the one end portion of the drive electrode TL(3) corresponding to the unit selection circuit USL(3).

At this time, the unit drive circuit USR(1) and the unit drive circuit USR(3), which are arranged to sandwich the unit selection circuit USR(2) corresponding to the drive electrode TL(2), output the selection signal indicating the selection. The selection circuit SR-C (FIGS. 8 and 14) supplies the ground voltage Vss to the other end portion of the drive electrode TL(1) corresponding to the unit selection circuit USR(1) based on the selection signals from the unit selection circuits USR(1) and USR(3), and supplies the drive signal TSVCOM to the other end portion of the drive electrode TL(3) corresponding to the unit selection circuit USR(3). Accordingly, the magnetic field generated around the drive electrode TL(1) and the magnetic field generated around the drive electrode TL(3) are superimposed on each other in the area of the drive electrode TL(2).

When the drive electrode TL(0) is caused to generate the strong magnetic field, the unit drive circuits USL(dU), USR(dU), USL(1) and USR(1) illustrated in FIG. 23 output the selection signal indicating the selection. In response to this, the selection circuit SL-C supplies the drive signal TSVCOM to the one end portion of the external area drive electrode TL(dLU), and supplies the ground voltage Vss to the one end portion of the drive electrode TL(1). In addition, the selection circuit SR-C supplies the ground voltage Vss to the other end portion of the external area drive electrode TL(dLU), and supplies the drive signal TSVCOM to the other end portion of the drive electrode TL(1). Accordingly, the currents I1 and I2 indicated by the arrows in FIG. 23 flow, the magnetic field is generated, and it is possible to generate the strong magnetic field in the area of the drive electrode TL(0).

When the drive electrode TL(p) is caused to generate the strong magnetic field, the unit drive circuits USL(dD), USR(dD), USL(p−1) and USR(p−1) illustrated in FIG. 24 output the selection signal indicating the selection. In response to this, the selection circuit SL-C supplies the ground voltage Vss to the one end portion of the external area drive electrode TL(dLD), and supplies the drive signal TSVCOM to the one end portion of the drive electrode TL(p−1). In addition, the selection circuit SR-C supplies the drive signal TSVCOM to the other end portion of the external area drive electrode TL(dLU), and supplies the ground voltage Vss to the other end portion of the drive electrode TL(p−1). Accordingly, the currents I1 and I2 indicated by the arrows in FIG. 24 flow, the magnetic field is generated, and it is possible to generate the strong magnetic field in the area of the drive electrode TL(p).

Of course, the external area drive electrode may be arranged only on one side of the display panel 2.

In the second embodiment, it is possible to reduce an area where the detection accuracy is decreased, within the area (the area of the display panel 2) where the display is performed.

Third Embodiment

In the display device 1, display is performed in the display panel 2, and detection on whether an external proximity object such as a pen and a finger touches inside an area of the display panel 2 or the like is performed simultaneously. In a third embodiment, the detection on whether the external proximity object touches inside the area of the display panel 2 or the like is performed by executing detection steps of a plurality of stages during one frame period that performs the display in the display panel 2. Here, a description will be given regarding an example where the touch of the external proximity object is detected by executing the detection steps of two stages during one frame period.

The detection steps of two stages include a detection step at a first stage and a detection step at a second stage which is executed after the detection step at the first stage. In the detection step at the first stage, the detection on whether an object, for example, the pen, which can be detected by magnetic field touch detection as the external proximity object, touches the area of the display panel 2 is roughly performed. When it is detected that the pen as the external proximity object touches the area of the display panel 2 in the detection step at the first stage, the magnetic field touch detection to detect a coordinate, a distance or the like of the touch is finely performed. On the other hand, when the touch by the pen is not detected in the detection step at the first stage, electric field touch detection is performed. This finely performed magnetic field touch detection or electric field touch detection becomes the detection step at the second stage. Accordingly, if any of the pen and the finger touches inside the area of the display panel 2, the touch can be detected during the one frame period in which the display is being performed.

The detection step at the second stage is realized by the touch detection semiconductor device 6 (FIG. 8) and the drive semiconductor device DDIC (FIG. 8) although not particularly limited thereto. That is, the control circuit T-CNT inside the touch detection semiconductor device 6 divides the one frame period into a first period and a second period subsequent thereto, and instructs the magnetic field touch detection using the magnetic field enable signal SC_EN in the first period. In addition, the selection drive circuits SSL and SSR are controlled using the control signal Y-CNT in the first period so that the magnetic field touch detection is roughly performed. In the first period, the control circuit D-CNT inside the drive semiconductor device DDIC is notified of whether the touch by the pen is detected by the control signal SW sent from the touch detection semiconductor device 6. In the first period, the selection drive circuits SSL and SSR are controlled by the control signal Y-CNT so that the magnetic field touch detection is roughly performed.

When the touch by the pen is detected during the magnetic field touch detection in the detection step at the first stage, the control circuit D-CNT inside the drive semiconductor device DDIC instructs the magnetic field touch detection using the magnetic field enable signal SC_EN even in the second period. In this case, the selection drive circuits SSL and SSR are controlled by the control signal Y-CNT in the second period so that the magnetic field touch detection is finely performed. Accordingly, the detection of touch by the pen is performed in the second period.

On the other hand, when the touch by the pen is not detected during the magnetic field touch detection in the detection step at the first stage, the control circuit D-CNT inside the drive semiconductor device DDIC instructs the electric field touch detection using the electric field enable signal TC_EN in the second period. Accordingly, the electric field touch detection is performed, and the detection of touch by the finger is performed in the second period.

Although the description has been given regarding the example where the drive semiconductor device DDIC executes the detection steps at the two stages based on the control signal SW sent from the touch detection semiconductor device 6, the invention is not limited thereto. For example, the touch detection semiconductor device 6 may execute control of the detection steps at the two stages so that the magnetic field enable signal SC_EN, the electric field enable signal TC_EN, and the like are outputted from the drive semiconductor device DDIC by the control signal SW.

A difference between the rough magnetic field touch detection and the fine magnetic field touch detection is a difference in the number of drive electrodes sandwiched between drive electrodes to which a drive signal is supplied in the magnetic field generation period TGT. That is, the number of drive electrodes sandwiched between the drive electrodes in the case of the rough magnetic field touch detection is larger than that in the case of the fine magnetic field touch detection in the magnetic field generation period TGT. For example, in the case of the rough magnetic field touch detection, the drive signal TSVCOM is supplied to a pair of drive electrodes with 32 drive electrodes sandwiched therebetween as described in the first and second embodiments. In regard to this, in the case of the fine magnetic field touch detection, the drive signal TSVCOM is supplied to a pair of drive electrodes that sandwiches drive electrodes equal to or more than one and smaller than 32 as described in the first and second embodiments.

For example, when the number of drive electrodes to which the drive signal TSVCOM is supplied is the same at the rough magnetic field touch detection and the fine magnetic field touch detection, it is possible to detect the touch by the pen in the entire area of the display panel 2 for a short time by performing the rough magnetic field touch detection. On the other hand, a distance between the pair of drive electrodes to which the drive signal is supplied becomes short in the case of the fine magnetic field touch detection, and so it is possible to generate a strong magnetic field and to achieve the improvement of the detection accuracy. When the magnetic field touch detection is performed in both of the first period and the second period, the first period can be regarded as the rough magnetic field touch detection period, and the second period can be regarded as the fine magnetic field touch detection period.

In addition, the magnetic field to be generated may be strengthened by increasing the number of drive electrodes to which the drive signal is supplied during the rough touch detection. As described with reference to FIG. 13B, for example, each of the pair of drive electrodes to which the drive signal TSVCOM is supplied may be provided as a bundle configured using a plurality of drive electrodes.

When the touch by the pen is not detected in the first period, the electric field touch detection is performed so that the touch by the finger is detected in the second period. Thus, it is also possible to detect the touch by the finger.

The detection of touch is performed with respect to the entire area of the display panel 2 in each of the first period and the second period. Thus, the entire area of the display panel 2 can be regarded as being subjected to the touch detection twice during one frame period. When being regarded in this manner, the touch detection at the first time is the magnetic field touch detection and the touch detection at the second time is the magnetic field touch detection or the electric field touch detection.

Figure 25:
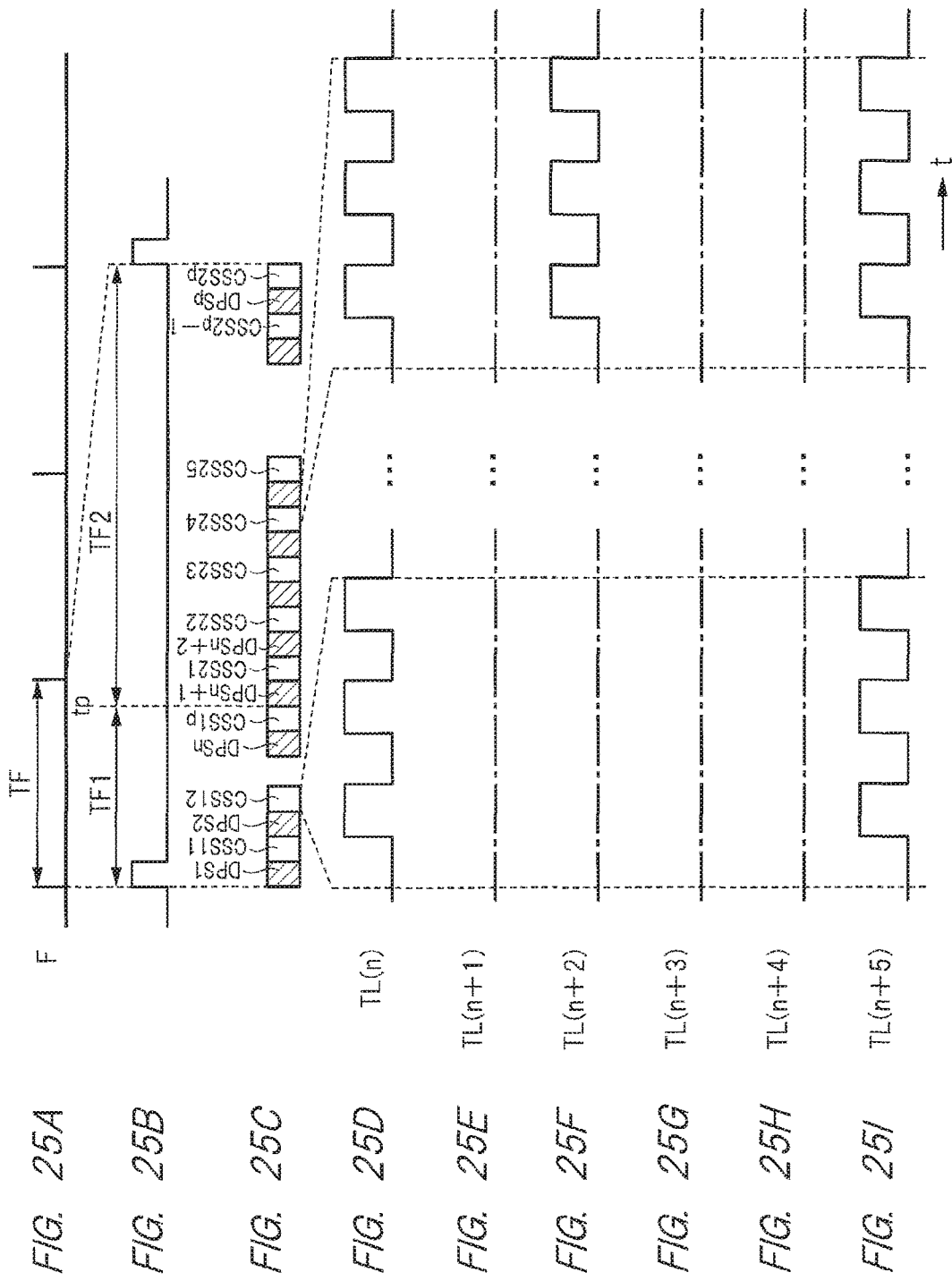
FIG. 25A is a timing diagram illustrating an operation of a display device according to a third embodiment.
FIG. 25B is a timing diagram illustrating an operation of a display device according to a third embodiment.
FIG. 25C is a timing diagram illustrating an operation of a display device according to a third embodiment.
FIG. 25D is a timing diagram illustrating an operation of a display device according to a third embodiment.
FIG. 25E is a timing diagram illustrating an operation of a display device according to a third embodiment.
FIG. 25F is a timing diagram illustrating an operation of a display device according to a third embodiment.
FIG. 25G is a timing diagram illustrating an operation of a display device according to a third embodiment.
FIG. 25H is a timing diagram illustrating an operation of a display device according to a third embodiment.
FIG. 25I is a timing diagram illustrating an operation of a display device according to a third embodiment.

FIGS. 25A to 25I are timing diagrams illustrating operations of the display device 1 according to the third embodiment. In FIGS. 25A to 25I, the horizontal axis represents time t. FIG. 25A is the timing diagram illustrating a frame signal F. The drive semiconductor device DDIC performs display on the display panel 2 according to the frame signal F. That is, the drive semiconductor device DDIC performs the display with respect to the entire area of the display panel 2 during one period TF of the frame signal F. In other words, the display for one screen is performed during one frame period (TF).

FIG. 25B is the timing diagram illustrating the one period (one frame period) TF of the periodical frame signal F. In FIG. 25B, numeral TF1 represents a first period which starts in response to the frame signal F, and numeral TF2 represents a second period which is subsequent to the first period TF1. When the display is performed in the display device 1, the frame period TF illustrated in FIG. 25B is repeated, and so the first period TF1 and the second period TF2 are alternately generated in this order.

FIG. 25C is the timing diagram schematically illustrating the display period and the touch detection period. In FIG. 25C, each of periods DPS1 to DPSp filled with the oblique line represents the display period. Incidentally, reference signs are attached only to DPS1, DPS2, DPSn to DPSn+2 and DPSp regarding the display period in FIG. 25C to prevent the drawing from being complicated. In each of the display periods DPS1 to DPSp, the image information is supplied from the drive semiconductor device DDIC to the signal line, the scan line becomes a high level, and so the image information is displayed on the display panel 2. As the display is performed in each of the display periods DPS1 to DPSp, the display for one screen is performed.

In FIG. 25C, numerals CSS11 to CSS1$p$ and CSS21 to CSS2$p$ represent the touch detection periods. Here, numerals CSS11 to CSS1$p$ represent the touch detection periods executed in the first period TF1, and numerals CSS21 to CSS2$p$ represent the touch detection periods executed in the second period TF2. The rough magnetic field touch detection is performed in each of the touch detection periods CSS11 to CSS1$p$, and the detection of touch by the pen is performed with respect to the entire area of the display panel 2 as the magnetic field touch detection is performed in each of the touch detection periods CSS11 to CSS1$p$.

The fine magnetic field touch detection or the electric field touch detection is performed in each of the touch detection periods CSS21 to CSS2$p$. As the touch detection is performed in each of the touch detection periods CSS21 to CSS2$p$, the detection of touch by the pen or the finger is performed with respect to the entire area of the display panel 2.

Since the rough magnetic field touch detection is performed in each of the touch detection periods CSS11 to CSS1$p$, it is possible to detect the touch with respect to the entire area of the display panel 2 at a small number of times. Thus, the touch detection on the entire area is completed at time tp before the display for one screen is completed. Accordingly, the time to perform the touch detection targeting the entire area of the display panel 2 can be secured until the display for one screen is completed. As a result, the touch detection on the entire area is performed again in the touch detection periods CSS21 to CSS2$p$ from the time tp.

FIG. 25D to FIG. 25I are the timing diagrams illustrating the drive signal TSVCOM which is supplied to the drive electrodes TL(n) to TL(n+5) arranged on the display panel 2.

The drive signal is supplied to each of the drive signals TL(n) to TL(n+5) from the selection drive circuits SSL and SSR illustrated in FIG. 8. In FIG. 25D to FIG. 25I, each left side illustrates the drive signal which is supplied to the drive electrodes TL(n) to TL(n+5) in the touch detection period CSS12, and each right side illustrates the drive signal which is supplied to the drive electrodes TL(n) to TL(n+5) in the touch detection period CSS24.

For example, the drive signal TSVCOM is supplied to one end portion of the drive electrode TL(n) from the selection drive circuit SSL, and the ground voltage Vss is supplied to one end portion of the drive electrode TL(n+5) in the touch detection period CSS12. At this time, the ground voltage Vss is supplied to the other end portion of the drive electrode TL(n) from the selection drive circuit SSR, and the drive signal TSVCOM is supplied to the other end portion of the drive electrode TL(n+5). Accordingly, the magnetic field is generated around each of the drive electrode TL(n) and the drive electrode TL(n+5). The generated magnetic fields are superimposed on each other in an area of the drive electrodes TL(n+1) to TL(n+4) which are sandwiched between the drive electrode TL(n) and the drive electrode TL(n+5).

On the other hand, for example, the drive signal TSVCOM is supplied to the one end portion of the drive electrode TL(n) from the selection drive circuit SSL, and the ground voltage Vss is supplied to one end portion of the drive electrode TL(n+2) in the touch detection period CSS24. At this time, the ground voltage Vss is supplied to the other end portion of the drive electrode TL(n) from the selection drive circuit SSR, and the drive signal TSVCOM is supplied to the other end portion of the drive electrode TL(n+2). Accordingly, the magnetic field is generated around each of the drive electrode TL(n) and the drive electrode TL(n+2). The generated magnetic fields are superimposed on each other in an area of the drive electrode TL(n+1) which is sandwiched between the drive electrode TL(n) and the drive electrode TL(n+2). Since only the drive electrode TL(n+1) is sandwiched between the drive electrodes to which the drive signal TSVCOM is supplied, a distance between the drive electrodes becomes short, and the magnetic field obtained through the superimposition of the magnetic field becomes strong. As a result, it is possible to achieve the improvement of the detection accuracy.

In addition, the drive signal TSVCOM may be supplied to the drive electrodes TL(n) and TL(n+1) from the selection drive circuit SSL, and the drive signal TSVCOM may be supplied to the drive electrodes TL(n+4) and TL(n+5) from the selection drive circuit SSR in the touch detection period CSS12. That is, two (a plurality of) drive electrodes may be used as a bundle to supply the drive signal TSVCOM at the time of rough magnetic field touch detection. Accordingly, it is possible to strengthen the magnetic field to be generated and to achieve the improvement of the detection accuracy even at the time of rough magnetic field touch detection.

Although the description has been given regarding the example where the magnetic field touch detection is performed in each of the touch detection periods CSS21 to CSS2$p$, the electric field touch detection is performed in each of the touch detection periods CSS21 to CSS2$p$ when no touch by the pen is detected in the first period TF1. Accordingly, it is possible to detect whether the finger touches the entire area of the display panel 2 or the like in the second period TF2

The switch between the rough magnetic field touch detection and the fine magnetic field touch detection using the control signal Y-CNT can be achieved by controlling the switch control circuits SWL and SWR using a switching control signal based on the control signal Y-CNT, for example. When the switching control signal indicates the rough magnetic field touch detection, it is possible to perform the rough magnetic field touch detection by causing the switch control circuits SWL and SWR to supply the drive signal TSVCOM and the ground voltage Vss to a pair of drive electrodes arranged to sandwich a drive electrode corresponding to a unit drive circuit, which outputs the selection signal indicating selection, and a drive electrode next to this drive electrode.

In addition, when the unit drive circuits correspond to the respective drive electrodes as illustrated in FIG. 22, it is possible to achieve the switch between the rough magnetic field touch detection and the fine magnetic field touch detection by changing a timing to supply the selection information SEI indicating the selection to a shift register configured by the unit drive circuits.

<Magnetic Field Touch Detection Operation>

FIGS. 26A to 26F are timing diagrams illustrating each relationship between the touch detection period and the display period. As illustrated in FIGS. 25A to 25I, the touch detection periods CSS11 to CSS1$p$, CSS21 to CSS2$p$ and the display periods DPS1 to DPSp are alternately generated. In FIGS. 26A to 26F, exemplified is a case where the display period is generated after the touch detection period. In addition, the touch detection period is indicated by reference sign CSS to collectively illustrate the touch detection periods CSS11 to CSS1$p$, CSS21 to CSS2$p$, and the display period is indicated by reference sign DPS to collectively illustrate the display periods DPS1 to DPSp in FIGS. 26A to 26F. Further, FIGS. 26A to 26F illustrate a case where the magnetic field touch detection is performed in the touch detection period CSS. Incidentally, the horizontal axis represents the time t also in FIGS. 26A to 26F.

Figure 26:
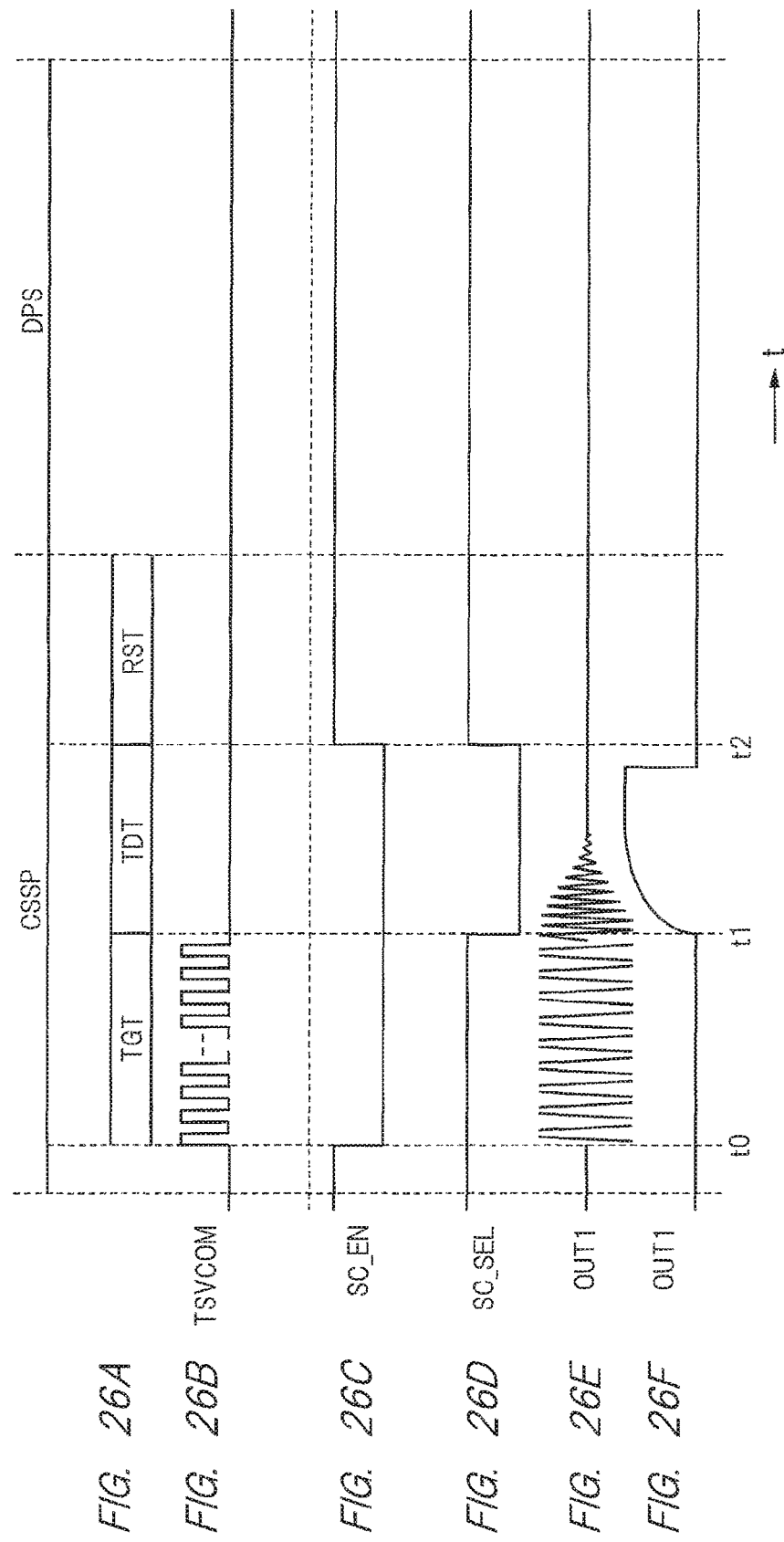
FIG. 26A is a timing diagram illustrating the operation of the display device according to the third embodiment.
FIG. 26B is a timing diagram illustrating the operation of the display device according to the third embodiment.
FIG. 26C is a timing diagram illustrating the operation of the display device according to the third embodiment.
FIG. 26D is a timing diagram illustrating the operation of the display device according to the third embodiment.
FIG. 26E is a timing diagram illustrating the operation of the display device according to the third embodiment.
FIG. 26F is a timing diagram illustrating the operation of the display device according to the third embodiment.

FIG. 26A is the schematic timing diagram illustrating the configuration of the magnetic field touch detection which is performed in the touch detection period CSS. The touch detection period includes the magnetic field generation period TGT, the magnetic field detection period TDT, and a precharge period RST. In the precharge period RST, each voltage of the drive electrodes TL(0) to TL(p), the signal lines SL(0) to SL(p), and the like is precharged to a predetermined value in order for the display period DPS to be subsequently generated.

As described above, the magnetic field generation period TGT is the period to generate the magnetic field, and the magnetic field detection period TDT is the period to detect the magnetic field from the pen by the magnetic field detection coil. The control circuit D-CNT illustrated in FIG. 8 changes the magnetic field enable signal SC_EN from a high level to a low level in the touch detection period CSS as illustrated in FIG. 26C. Accordingly, the magnetic field touch detection is designated. In addition, the control circuit D-CNT causes the drive signal TSVCOM to periodically change in the magnetic field generation period TGT as illustrated in FIG. 26B. Accordingly, as described above, the drive signal TSVCOM is supplied to each of the pair of drive electrodes arranged with the drive electrode sandwiched therebetween, the magnetic field depending on the change of the drive signal TSVCOM is generated, and the superimposition of the magnetic field is performed in the area of the drive electrode sandwiched between the pair of drive electrodes.

The capacitive element inside the pen is charged by the magnetic field generated in the magnetic field generation period TGT. When there is the touch of the pen, the magnetic field generated by the pen is detected by the magnetic field detection coil in the magnetic field detection period TDT, and the detection signal depending on the detected magnetic field is outputted from the magnetic field detection coil. In addition, the control circuit D-CNT sets the drive signal TSVCOM to the predetermined voltage, and sets the magnetic field enable signal SC_EN to the high level as illustrated in FIG. 26B in the display period DPS.

Next, an example of the detection circuit to perform the detection on whether the pen touches or not based on the detection signal sent from the magnetic field detection coil will be described with reference to FIG. 27. Although the detection circuit to detect the touch is configured using the amplifier circuit AMP and the touch semiconductor device 6 in FIG. 8, here, the detection circuit using a microcontroller MCU will be exemplified.

Figure 27:
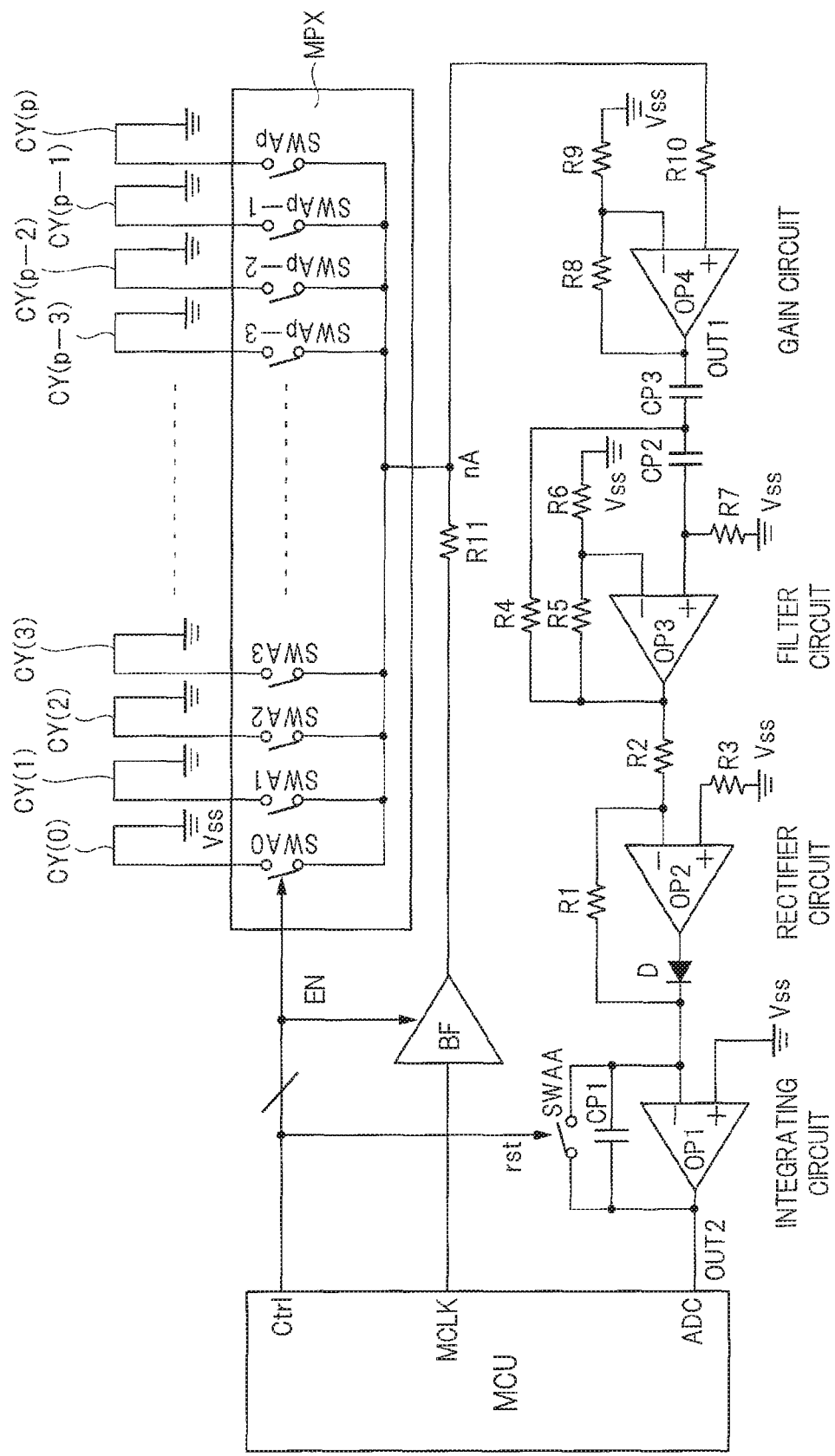
FIG. 27 is a circuit diagram illustrating a configuration of a detection circuit of the display device according to the third embodiment.

FIGS. 26D to 26F are the timing diagrams for describing the operation of the detection circuit illustrated in FIG. 27. Thus, FIGS. 26D to 26F will be referred to while describing the configuration and operation of the detection circuit illustrated in FIG. 27.

In FIG. 27, numeral MPX represents a multiplexer (selector) provided with a plurality of switches SWA0 to SWAp. As described in the first embodiment, magnetic field detection coils CY(0) to CY(p) are configured using the signal lines SL(0) to SL(p) or the detection electrodes RL(0) to RL(p) in the magnetic field detection period TDT. One end portion of each of the magnetic field detection coils is connected to each one end portion of the corresponding switches SWA0 to SWAp, and each of the other end portions thereof is connected to the ground voltage Vss. As described in FIG. 19 and the like, for example, the one end portion of the magnetic field detection coil CY(0), which is formed by connecting two signal lines arranged in parallel to each other, is connected to the one end portion of the switch SWA0, and the other end portion thereof is connected to the ground voltage Vss. The remaining magnetic field detection coils CY(1) to CY(p) are also connected between the one end portion of each of the corresponding switches SWA1 to SWAp and the ground voltage Vss in the same manner.

In addition, the other end portion of each of the switches SWA0 to SWAp is connected to a node nA. Any of the switches SWA0 to SWAp is selected and turned into the on-state in the magnetic field detection period TDT. This selection is performed by the microcontroller MCU. That is, any of the switches SWA0 to SWAp is selected and turned into the on-state by a selection signal sent from the microcontroller MCU. FIG. 26D illustrates a waveform of a selection signal SC_SEL which turns one of the switches SWA0 to SWAp into the on-state. In FIG. 26D, the switch is turned into the on-state as the selection signal SC_SEL is changed from the high level to the low level.

When any of the switches SWA0 to SWAp is turned into the on-state in the magnetic field detection period TDT, a detection signal in the magnetic field detection coil is transmitted to the node nA. A detection signal in the node nA is supplied to a gain circuit, and amplified by the gain circuit. The amplified detection signal is supplied to a filter circuit in order to remove noise, and an output of the filter circuit is rectified by a rectifier circuit, and is supplied to an integrating circuit. An output of the integrating circuit is supplied to the microcontroller MCU.

Although not illustrated in Figure, the microcontroller MCU includes an analog/digital conversion circuit, a clock signal generation circuit, a non-volatile memory in which a program is stored, and a processing unit that operates according to the program stored in the non-volatile memory. The above-described output from the integrating circuit is supplied to the analog/digital conversion circuit via a terminal ADC of the microcontroller MCU, and is converted into a digital signal. The digital signal obtained through the conversion is processed by the processing unit, and the determination is performed on whether the pen is proximate to any one of the coils CY(0) to CY(p).

The processing unit inside the microcontroller MCU forms a control signal according to the program. The control signal includes the selection signal to select the switches SWA0 to SWAp, an enable signal EN, and a reset signal rst. Further, the clock signal MCLK with a periodically changing voltage is generated by the clock signal generation circuit inside the microcontroller MCU.

The clock signal MCLK is supplied to a buffer circuit BF. The buffer circuit BF is controlled by the enable signal EN. When the enable signal EN is a high level, the clock signal MCLK is supplied to the node nA via a resistance R11. On the other hand, an output of the buffer circuit BF is set to a high-impedance state (Hi-Z) when the enable signal EN is a low level.

The gain circuit includes resistances R8 to R10, an operational amplifier OP4, and a capacitive element CP3 for cut-off of direct current. The detection signal is supplied to a positive phase input (+) of the operational amplifier OP4, and an inverting input (−) of the operational amplifier OP4 is connected to the ground voltage Vss via the resistance R9, and is connected to an output of the operational amplifier OP4 via the resistance R8.

The filter circuit includes resistances R4 to R7, a capacitive element CP2, and an operational amplifier OP3. A positive phase input (+) of the operational amplifier OP3 is connected to the ground voltage Vss via the resistance R7, and an output signal from the gain circuit is supplied via the capacitive element CP2. In addition, an inverting input (−) of the operational amplifier OP3 is supplied to the ground voltage Vss via the resistance R6, and is connected to the output of the operational amplifier via the resistance R5.

Further, the output of the operational amplifier OP3 is connected to an input of the filter circuit via the resistance R4.

The rectifier circuit includes resistances R1 to R3, an operational amplifier OP2, and a diode D. A positive phase input (+) of the operational amplifier is connected to the ground voltage Vss via the resistance R3, and an output from the filter circuit is supplied to an inverting input (−) of the operational amplifier OP2 via the resistance R2. Further, the output of the rectifier circuit is supplied via the resistance R1. An output of the operational amplifier OP2 is outputted via the diode D.

The integrating circuit includes a capacitive element CP1, a switch SWAA which receives the reset signal rst as the switch control signal, and an operational amplifier OP1. A positive phase input (+) of the operational amplifier is connected to the ground voltage Vss, and an inverting input (−) is connected to the output of the integrating circuit via the capacitive element CP1. Further, the switch SWAA is connected between the output and input of the integrating circuit.

In FIGS. 26A to 26F, the reset signal rst becomes the low level at time t0. Accordingly, the switch SWAA is turned into the off-state, and the reset is released. At this time, the microcontroller MCU sets the enable signal EN to the high level. Accordingly, the clock signal CLK is supplied from the buffer circuit BF to the node nA via the resistance R11.

The clock signal CLK supplied to the node nA is also supplied to the gain circuit. An output OUT1 of the gain circuit is changed according to a voltage change of the clock signal MCLK, and thus is changed as illustrated in FIG. 26E. The output OUT1 of the gain circuit is supplied to the rectifier circuit via the filter circuit, and the rectified output is supplied to the integrating circuit. A voltage of the node nA is periodically changed from time t0 to time t1, but is not changed in terms of an envelope curve, and thus the output of the integrating circuit becomes a constant value.

The microcontroller MCU sets the enable signal EN to the low level at the time t1. Accordingly, the node nA is set to the high-impedance state (Hi-Z). In addition, a switch SWA3 corresponding to the coil CY(3), for example, is turned into the on-state by the selection signal SC_SEL (FIG. 26D) at the time t1. Accordingly, one end portion of the coil CY(3) is in the state of being connected to the node nA.

At this time, as the pen is present in the vicinity of the coil CY(3), the induced voltage is generated in the coil inside the pen by the magnetic field generated in the magnetic field generation period TGT between the time t0 and t2, and the capacitive element C (FIG. 2) is charged.

In the time t1, the coil L1 inside the pen generates the magnetic field based on the electric charge amount charged in the capacitive element C. The induced voltage is generated in the coil CY(3) according to a change of the magnetic field generated by the coil L1.

As a result, the output OUT1 of the gain circuit is attenuated while oscillating as illustrated in FIG. 26E. That is, the voltage is attenuated in terms of an envelope curve. Since the output OUT1 of the gain circuit is attenuated while oscillating from the time t1, the output OUT2 of the integrating circuit gradually increases as illustrated in FIG. 26F. The microcontroller MCU converts the output OUT2 of the integrating circuit into a digital signal, and determines that the pen is present. At this time, the microcontroller MCU grasps the switch turned into the on-state among the switches SWA0 to SWAp using the selection signal SC_SEL, and so is capable of grasping a position of the selected magnetic field generation coil. Therefore, it is possible to determine the position at which the pen is present, that is, the touched position, the pen pressure of the pen, and the like from a value of the digital signal obtained by the conversion and from the grasped position of the magnetic field detection coil. It is possible to determine the presence or absence of the pen, the writing pressure, and the like by repeating the above-described operations.

In the detection circuit illustrated in FIG. 27, the gain circuit, the filter circuit, the rectifier circuit and the integrating circuit can be shared among the plurality of magnetic field detection coils CY(0) to CY(p), and it is possible to suppress the increase of an area occupied by the detection circuit.

Fourth Embodiment

Figure 28:
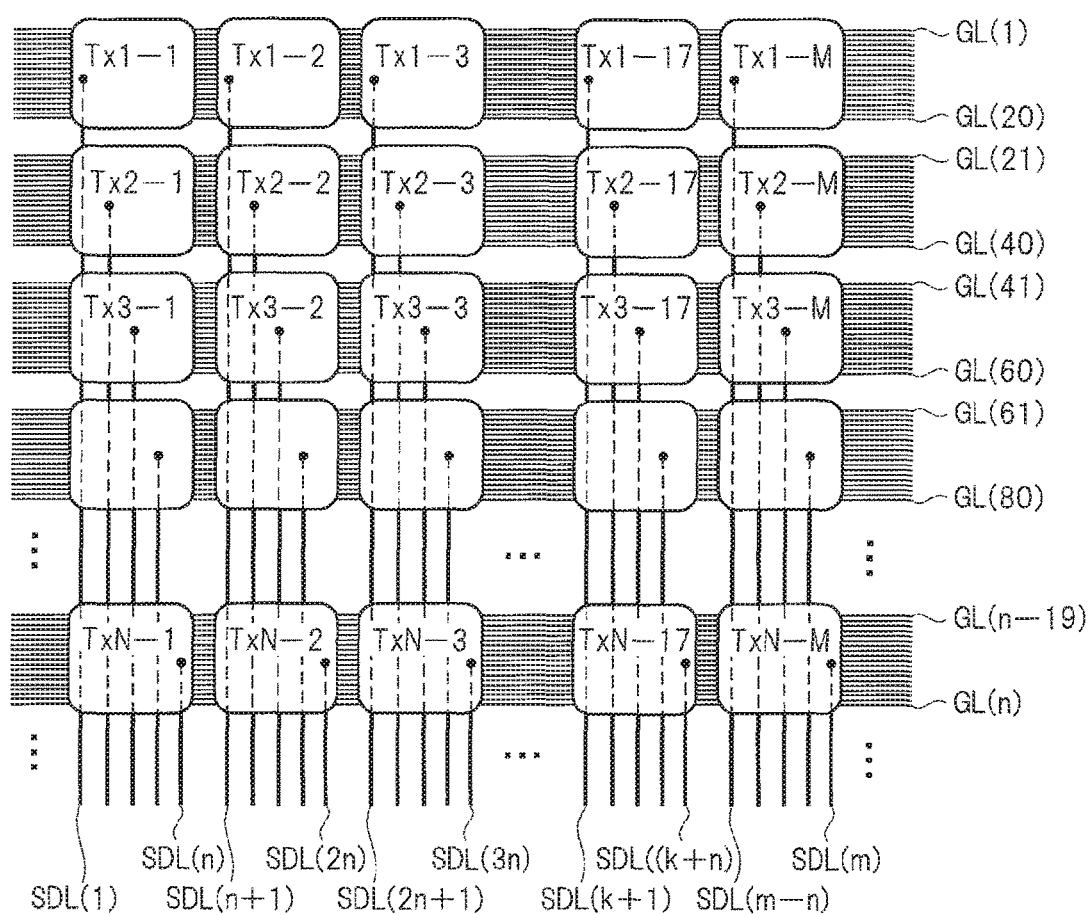
FIG. 28 is a plan view illustrating a configuration of a display device according to a fourth embodiment.

FIG. 28 is a plan view illustrating a configuration of the display device 1 according to a fourth embodiment. FIG. 28 illustrates the schematic plan view of the display panel 2.

In FIG. 28, numerals Tx1-1 to TxN–M represent drive electrodes (detection electrodes) which are arranged in a dot matrix form in the display panel 2. Whether there is touch by a finger, for example, is detected as a change of an electric charge amount by the drive electrodes arranged in the dot matrix form. In FIG. 28, the drive electrodes arranged in five rows and five columns are exemplified among the drive electrodes arranged in the dot matrix form. In addition, numerals SDL(1) to SDL(m) represent detection signal lines, and numerals GL(1) to GL(n) represent scan lines. The detection signal lines SDL(1) to SDL(m) are arranged in parallel to the signal lines SL(0) to SL(p) (not illustrated) in the display panel 2. When the description is given with reference to FIG. 10, for example, the signal lines SL(n–6) to SL(n+9) extend in the column direction and are arranged in parallel in the row direction, and the detection signal lines SDL(1) to SDL(m) extend in the column direction and are arranged in parallel in the row direction similarly to the signal lines SL(0) to SL(p).

The respective drive electrodes Tx1-1 to TxN-M arranged in the dot matrix form are connected to the detection signal lines SDL(1) to SDL(m) having one-to-one correspondence. For example, the drive electrodes Tx1-1, Tx1-2, Tx1-3, Tx1-17 and Tx1-M, which are arranged on the first row of the dot matrix, are connected to the detection signal lines SDL(1), SDL(n+1), SDL(2n+1), SDL(+1) and SDL(m-n) having one-to-one correspondence. In addition, the drive electrodes TxN-1, TxN-2, TxN-3, TxN-17 and TxN-M, which are arranged on the N-th row of the dot matrix, are connected to the detection signal lines SDL(n), SDL(2n), SDL(3n), SDL(k+n) and SDL(m) having one-to-one correspondence.

In the fourth embodiment, detection of touch by the finger is performed by detecting a signal change in each of the detection signal lines SDL(1) to SDL(m). In this case, each of the detection signal lines has one-to-one correspondence with the drive electrodes, and so it is possible to grasp the touched position by detecting the signal change in the detection signal lines SDL(1) to SDL(m).

Figure 29:
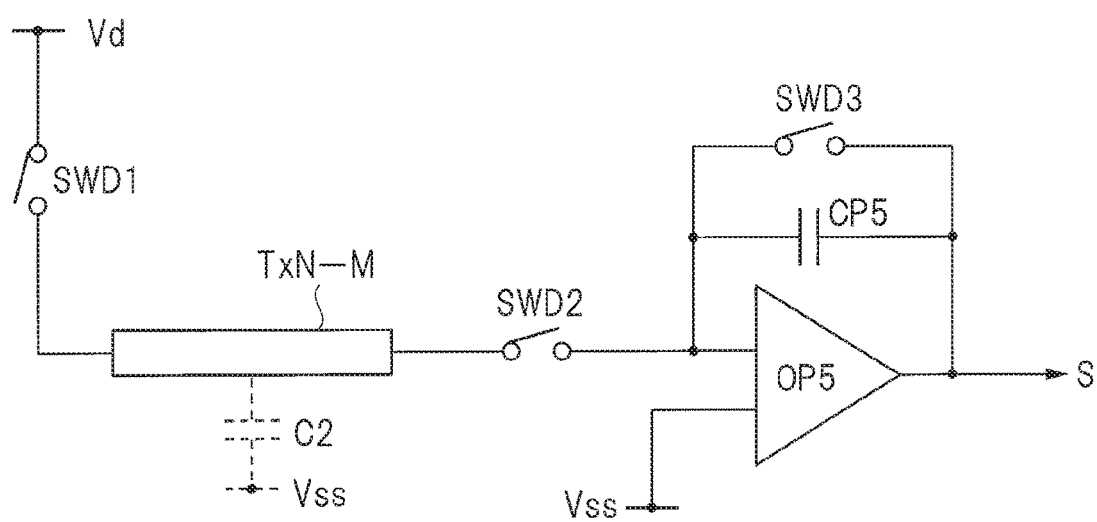
FIG. 29 is a circuit diagram illustrating a principle of touch detection of the display device according to the fourth embodiment.

FIG. 29 is a circuit diagram illustrating a principle of touch detection in the case of using the drive electrodes Tx1-1 to TxN-M arranged in the dot matrix form. Here, the description will be given by exemplifying the drive electrode TxN-M. In FIG. 29, numeral OP5 represents an operational amplifier, numeral CP5 represents a capacitive element, and numerals SWD1 to SWD3 represents switches.

A parasitic capacitance C2 is present between the drive electrode TxN-M and the ground voltage Vss. First, the switch SWD3 is turned into the on-state, and the switches SWD1 and SWD2 are turned into the off-state. Accordingly, electric charges stored in the capacitive element CP5 are discharged via the switch SWD3. Next, the switch SWD3 is turned into the off-state, and the switch SWD1 is turned into the on-state. At this time, when the drive electrode TxN-M is touched by the finger, the electric charges are also charged by the capacitance with the finger.

Next, the switch SWD1 is turned into the off-state, and the switch SWD2 is turned into the on-state. Both inputs of the operational amplifier OP5 virtually become the same potential (the ground voltage Vss in FIG. 29) by feedback of the capacitive element CP5, and so the electric charges stored in the drive electrode TxN-M are shifted to the capacitive element CP5. Thus, if the finger touches the drive electrode TxN-M, the electric charges to be shifted to the capacitive element CP5 increase. As a result, an absolute value of a voltage outputted from the operational amplifier OP5 becomes larger. The voltage (signal) outputted from the operational amplifier OP5 is changed depending on whether the finger touches the drive electrode TxN-M. The presence or absence of the touch by the finger is detected by this signal change. That is, the signal outputted from the operational amplifier OP5 becomes a sense signal S.

In this manner, it is possible to detect the touch by the finger by detecting the signal change in each of the drive electrodes Tx1-1 to TxN-M. In a detection system illustrated in FIG. 29, the switch SWD1 is turned into the on-state; the drive signal is supplied to the drive electrode (for example, TxN-M); and the signal change in the same drive electrode TxN-M is detected, thereby detecting the touch by the finger. That is, the touch by the finger is detected based on the signal change in the drive electrode to which the drive signal has been supplied. Thus, it is a so-called capacitive self-detection system.

The scan lines GL(1) to GL(n) are arranged to be orthogonal to the detection signal lines SDL(1) to SDL(m) and the signal lines SL(1) to SL(m) (not illustrated). In the fourth embodiment, the scan lines GL(1) to GL(n) are used as the signal wiring which generates the magnetic field at the time of magnetic field touch detection. That is, the scan lines GL(1) to GL(n) are used as the drive electrodes TL(0) to TL(p), which have been described in the first embodiment, in the magnetic field generation period TGT. Although not particularly limited, a plurality of scan lines are collectively used as a single drive electrode. In the example illustrated in FIG. 28, 20 scan lines are provided as a single bundle. That is, the scan lines GL(1) to GL(20) are provided as a bundle; the scan lines GL(21) to GL(40) are provided as a bundle; the scan lines GL(41) to GL(60) are provided as a bundle; the scan lines GL(61) to GL(80) are provided as a bundle; and the scan lines GL(n–19) to GL(n) are provided as a bundle.

The drive signal is supplied to the scan lines used as the bundle in the magnetic field generation period TGT, similarly to the first embodiment. For example, the drive signal TSVCOM is supplied to one end portion of the scan lines GL(1) to GL(20) used as the bundle from the side 2-L of the display panel 2 side, and the ground voltage Vss is supplied to the other end portion thereof from the side 2-R of the display panel 2 side. At this time, for example, the ground voltage Vss is supplied to one end portion of the scan lines GL(41) to GL(60) used as the bundle from the side 2-L of the display panel 2 side, and the drive signal TSVCOM is supplied to the other end portion thereof from the side 2-R of the display panel 2 side. Accordingly, the magnetic field is generated around each of the bundle of the scan lines GL(1) to GL(20) and the bundle of the scan lines GL(41) to GL(60), and the magnetic fields are superimposed on each other in an area of the scan lines GL(21) to GL(40).

In the fourth embodiment, the drive electrodes Tx1-1 to TxN-M and the detection signal lines SDL(1) to SDL(m) are formed on the TFT glass substrate TGB, and a magnetic field detection coil is configured using the detection electrodes RL(0) to RL(p) formed on the CF glass substrate CGB. The magnetic field detection coil, which is configured using the detection electrodes RL(0) to RL(p) formed on the CF glass substrate CGB, has been described already with reference to FIG. 21, and so the description thereof will be omitted. In the fourth embodiment, the detection of touch by the finger is performed by the drive electrodes which are formed on the TFT glass substrate TGB and arranged in the dot matrix form. Thus, the detection electrodes RL(0) to RL(p) formed on the CF glass substrate CGB are not necessarily used for the detection of touch by the finger, and so the detection electrodes RL(0) to RL(p) can be fixed in a shape (for example, a coil shape) which is suitable for detection of the magnetic field.

In addition, since the plurality of scan lines are handled as the bundle in the fourth embodiment, it is possible to reduce a combined resistance of the scan lines in the magnetic field generation period TGT and to strengthen the generated magnetic field.

<First Modified Example>

In FIG. 28, the description has been given regarding the case of using the detection electrodes RL(0) to RL(p) formed on the CF glass substrate CGB for the detection of the magnetic field. In a first modified example, each of the detection electrodes Tx1-1 to TxN-M illustrated in FIG. 28 is used for the magnetic field detection. Accordingly, it is unnecessary to arrange the detection electrodes RL(0) to RL(p) for the magnetic field detection on the CF glass substrate CGB, and it is possible to manufacture the display device 1 with low cost.

<Second Modified Example>

Figure 38:
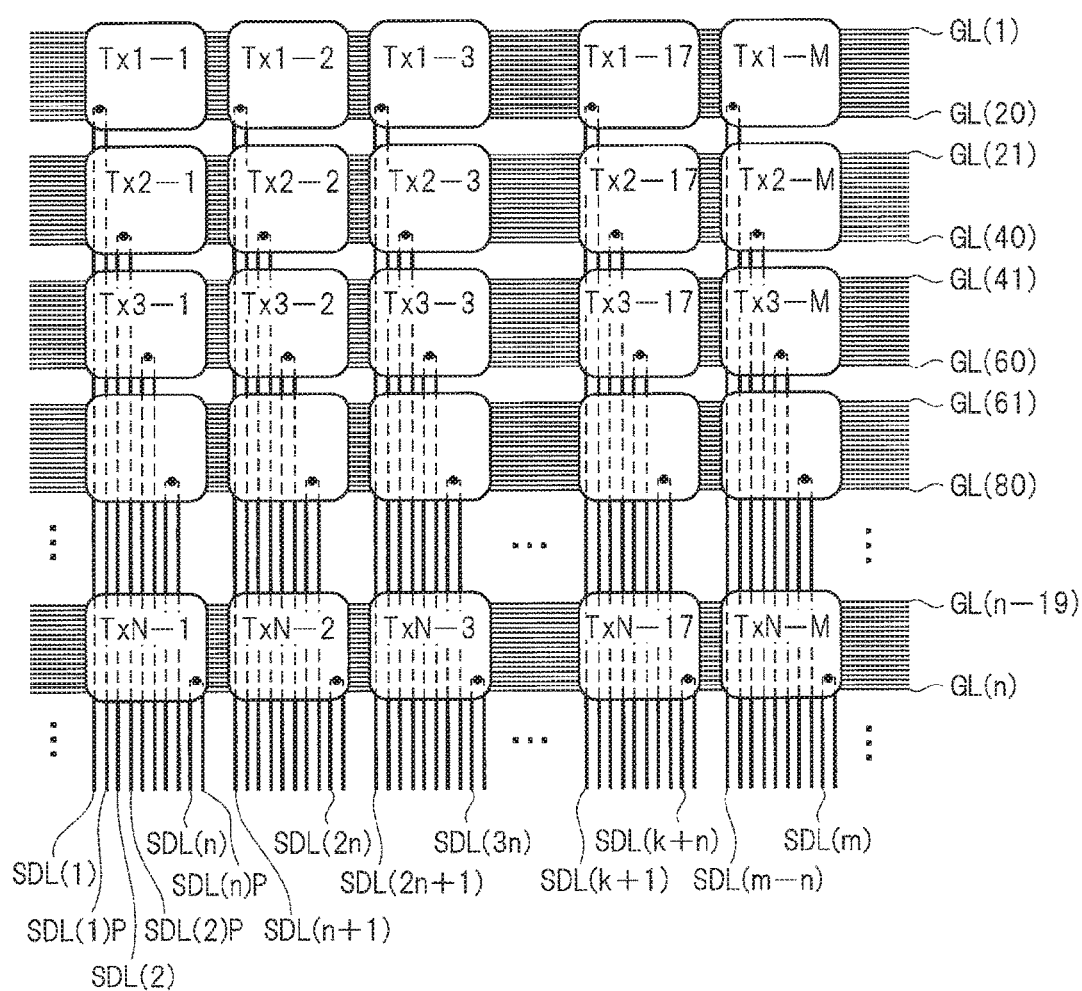
FIG. 38 is a plan view illustrating a configuration of a display device according to a modified example of the fourth embodiment.

FIG. 38 is a plan view illustrating a configuration of the display device 1 according to a second modified example of the fourth embodiment. FIG. 38 illustrates the schematic plan view of the display panel 2. FIG. 38 is similar to FIG. 28, and so a different point will be described here.

In the second modified example illustrated in FIG. 38, detection signal lines SDL(1)P to SDL(m)P, each of which is paired with the detection signal lines SDL(1) to SDL(m), extend in parallel to the paired detection signal lines SDL(1) to SDL(m). In FIG. 28, reference signs SDL(1)P, SDL(2)P and SDL(n)P are attached only to the detection signal lines, each of which is paired with the detection signal lines SDL(1), SDL(2) and SDL(n), and reference signs of the other detection signal lines are not illustrated to prevent the drawing from being complicated.

Here, the description will be given by exemplifying one column (the drive electrodes Tx1-1 to TxN-1) arranged at the leftmost side in FIG. 38, and the other columns are also configured in the same manner. The detection signal line SDL(1) and the detection electrode SDL(1)P extend in parallel to each other and are connected to the drive electrode Tx1-1, and the detection signal line SDL(2) and the detection electrode SDL(2)P also extend in parallel to each other and are connected to the drive electrode Tx2-1. Hereinafter, the detection signal line SDL(n) and the detection electrode SDL(n)P extend in parallel to each other and are connected to the drive electrode TxN-1 in the same manner.

A magnetic field detection coil is formed using the detection signal lines extending in parallel as a pair at the time of magnetic field touch detection. For example, a magnetic field detection coil is formed using the detection signal lines SDL(1) and SDL(1)P forming a pair; a magnetic field detection coil is formed using the detection signal lines SDL(2) and SDL(2)P forming as a pair; and a magnetic field detection coil is formed using the detection signal lines SDL(n) and SDL(n)P forming as a pair. In this case, a signal change of one detection signal lines, for example, the detection signal lines SDL(1), SDL(2) and SDL(n), among the detection signal lines each forming a pair is outputted as the sense signal S. At this time, the ground voltage Vss is supplied to each of the other detection signal lines SDL(1)P, SDL(2)P and SDL(n)P among the detection signal lines each forming the pair.

Since the magnetic field detection coil is formed using each of the detection signal lines SDL(1) to SDL(m) and SDL(1)P to SDL(m)P, it is unnecessary to arrange the detection electrode for the magnetic field detection on the CF glass substrate CGB, and so it is possible to manufacture the display device 1 with the low cost. In addition, the electric field touch detection can be performed in the same manner as described with reference to FIG. 28.

In addition, the magnetic field may be detected at the time of magnetic field touch detection using only a specific pair of detection signal lines among the plurality of pairs of detection signal lines arranged on one column (the drive electrodes Tx1-1 to TxN-1). The detection signal lines SDL(1) and SDL(1)P illustrated in FIG. 38 correspond to such a specific pair of detection signal lines. Since the detection signal lines SDL(1) and SDL(1)P are connected to the drive electrode Tx1-1 arranged on the first row, the number of scan lines which are orthogonal thereto increases, and a detectable range at the time of magnetic field touch detection becomes wide. Accordingly, the detection signal lines SDL(1) and SDL(1)P are suitably used for the magnetic field touch detection. A pair of detection signal lines, which is connected to the drive electrodes Tx1-2 to Tx1-M arranged on the first row among the plurality of pairs of detection signal lines included in the respective columns, is used as the magnetic field detection coil at the time of magnetic field touch detection in the same manner for other columns of the dot matrix.

<Third Modified Example>

Figure 39:
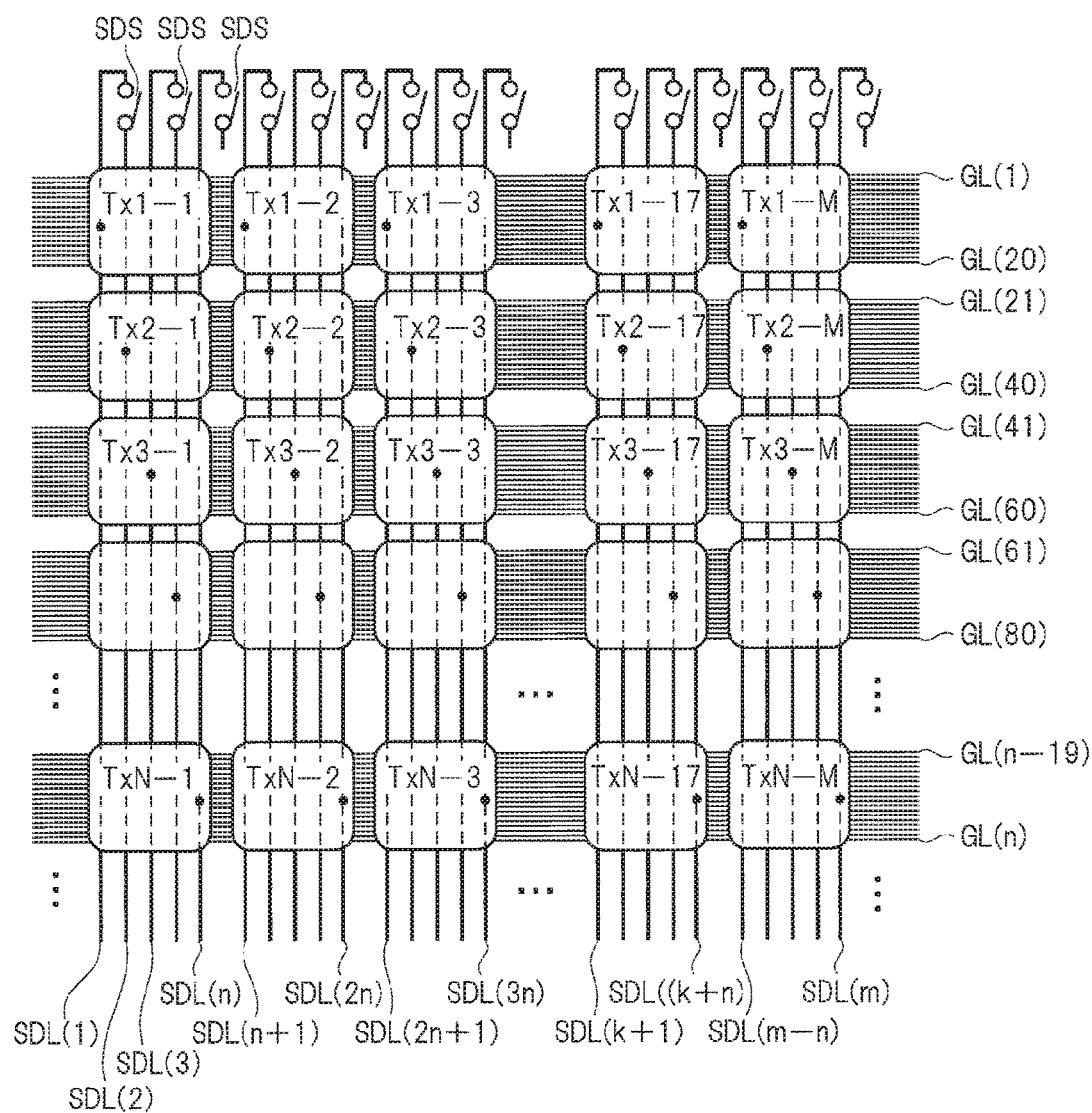
FIG. 39 is a plan view illustrating a configuration of a display device according to a modified example of the fourth embodiment.

FIG. 39 is a plan view illustrating a configuration of the display device 1 according to a third modified example of the fourth embodiment. FIG. 39 illustrates the schematic plan view of the display panel 2. FIG. 39 is similar to FIG. 28, and so a different point will be described here.

In FIG. 28, the detection signal line extends to the area connected to the corresponding drive electrode. In regard to this, each of the detection signal lines SDL(1) to SDL(m) extends to cross the display panel 2 in the third modified example. For example, the detection signal line is arranged to extend from the side 2-D to the side 2-U of the display panel 2. Here, the description will be given by exemplifying a first column (the drive electrodes Tx1-1 to TxN-1) of the dot matrix, and other columns are also configured in the same manner.

The detection signal line SDL(1) extends from the side 2-D to the side 2-U and is connected to the drive electrode Tx1-1 on the way to the extension, and the detection signal line SDL(2) also extends from the side 2-D and the side 2-U and is connected to the drive electrode Tx2-1 on the way to the extension. Next, the detection signal line SDL(n) also extends from the side 2-D to the side 2-U and is connected to the drive electrode TxN-1 on the way to the extension in the same manner.

On the side 2-U side, the switch SDS is connected between predetermined detection signal lines. FIG. 39 illustrates only the switch SDS connected between the detection signal lines SDL(1) and SDL(2), and the switch SDS connected between the detection signal lines SDL(3) and SDL (n).

The switch SDS is turned into the on-state at the time of magnetic field touch detection, similarly to the eighth switches k00 to kp illustrated in FIG. 19. Accordingly, a plurality of detection signal lines are connected to each other. In the example of FIG. 39, the detection signal lines SDL(1) and SDL(2) are connected to each other on the side 2-U side. Accordingly, a magnetic field detection coil is formed using the detection signal lines SDL(1) and SDL(2) at the time of magnetic field touch detection. At this time, for example, the ground voltage Vss is supplied to the detection signal line SDL(2), and a signal change in the detection signal line SDL(1) is outputted as the sense signal S.

Accordingly, since the magnetic field detection coil is formed using the detection signal lines SDL(1) to SDL(m), it is unnecessary to arrange the detection electrode for the magnetic field detection on the CF glass substrate CGB, and so it is possible to manufacture the display device 1 with the low cost. In addition, the electric field touch detection can be performed in the same manner as described with reference to FIG. 28.

Although the description has been given in FIG. 39 regarding the example where the magnetic field detection coil is formed using the adjacent detection signal lines SDL(1) and SDL(2), the invention is not limited thereto. That is, the detection signal lines, which are arranged with the detection signal lines sandwiched therebetween, may be connected using switches to form magnetic field detection coils that overlap each other. In addition, a winding with one and half turns or more may be used instead of the winding with one turn.

<Fourth Modified Example>

Figure 30:
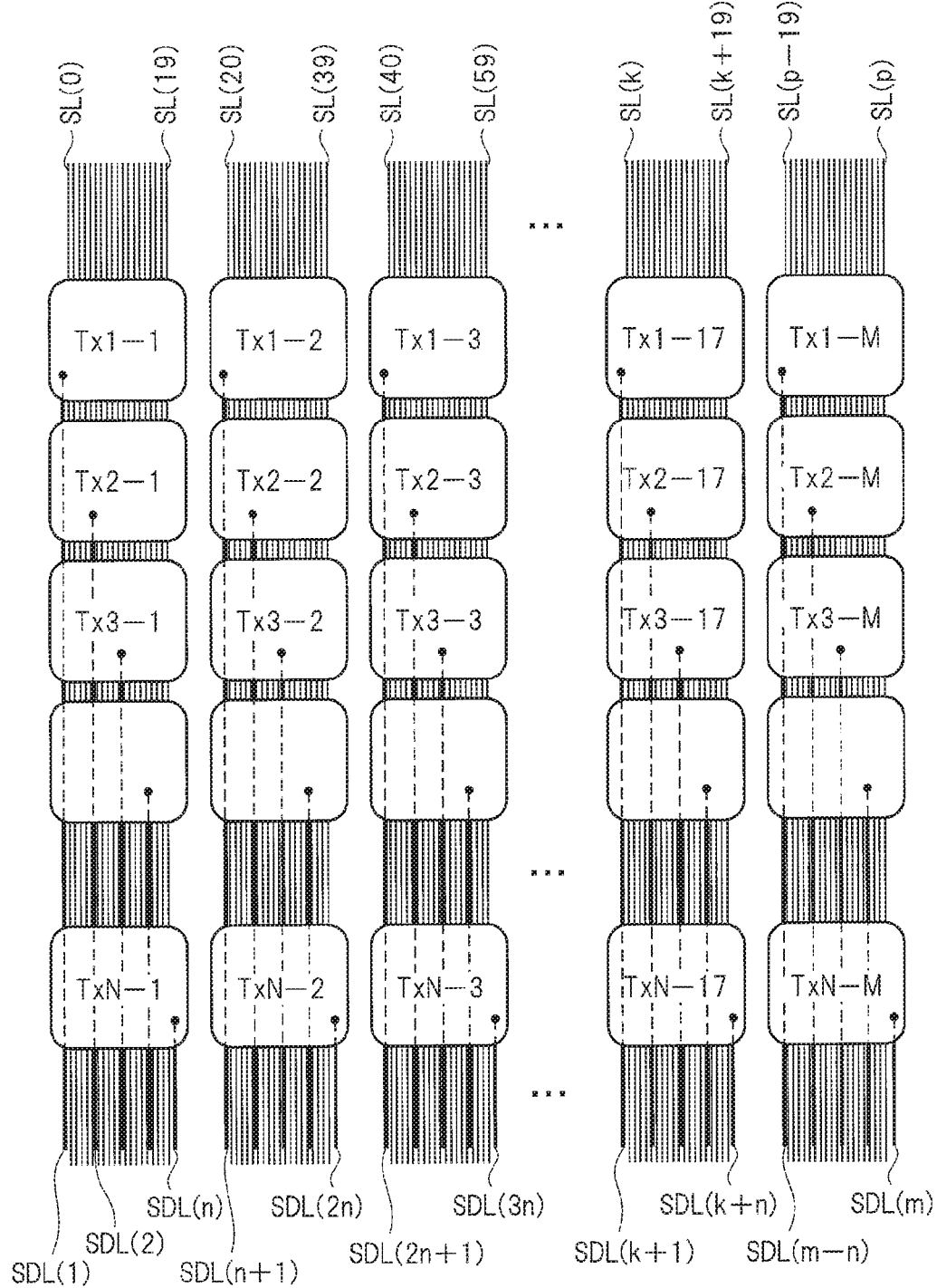
FIG. 30 is a plan view illustrating a configuration of a display device according to a modified example of the fourth embodiment.

FIG. 30 is a plan view illustrating a configuration of the display device 1 according to a fourth modified example of the fourth embodiment. FIG. 30 is similar to FIG. 28, and so a different point will be mainly described here. In FIG. 30, numerals SL(0) to SL(p) represent the signal lines. As described with reference to FIG. 28, the detection signal lines SDL(1) to SDL(m) are arranged in parallel to the signal lines SL(0) to SL(p) on the display panel 2.

In this modified example, the signal lines SL(0) to SL(p) are used as a signal wiring to generate a magnetic field. Although not particularly limited, the plurality of signal lines are collectively used as a bundle, and the drive signal TSVCOM is supplied in the magnetic field generation period TGT in this modified example. When the description is given by exemplifying FIG. 30, the signal lines SL(0) to SL(19) are collectively used as a bundle, the signal lines SL(20) to SL(39) are collective used as a bundle, and the signal lines SL(40) to SL(59) are collectively used as a bundle in the magnetic field generation period TGT. In addition, the signal lines SL(k) to SL(k+19) are collectively used as a bundle, and the signal lines SL(p−19) to SL(p) are collectively used as a bundle.

The drive signal is supplied to the bundled signal lines in the magnetic field generation period TGT. For example, the drive signal TSVCOM is supplied to one-end portions of the bundled signal lines SL(0) to SL(19) from the side 2-U of the display panel 2 side, and the ground voltage Vss is supplied to the other-end portions thereof from the side 2-D of the display panel 2 side. At this time, for example, the ground voltage Vss is supplied to one-end portions of the bundled signal lines SL(40) to SL(59) from the side 2-U of the display panel 2 side, and the drive signal TSVCOM is supplied to the other-end portions thereof from the side 2-D of the display panel 2 side. Accordingly, a superimposed magnetic field is formed in an area of the signal lines SL(20) to SL(39) in the magnetic field generation period TGT.

In this modified example, a magnetic field detection coil is configured using the detection electrodes RL(0) to RL(p) formed on the CF glass substrate CGB, for example. When the magnetic field detection coil is formed using the detection electrodes RL(0) to RL(p), each of the detection electrodes RL(0) to RL(p) is formed to be orthogonal to each of the signal lines SL(0) to SL(p) and to be parallel to each other, and predetermined detection electrodes are connected to each other as illustrated in FIG. 21. In addition, the magnetic field detection coil may be formed using the scan lines GL(0) to GL(p).

In addition, the magnetic field may be detected by the detection electrodes Tx1-1 to TxN-M. If the magnetic field is detected by the detection electrodes Tx1-1 to TxN-M, for example, it is unnecessary to arrange the detection electrode for the magnetic field detection on the CF glass substrate CGB, and it is possible to manufacture the display device 1 with the low cost.

<Fifth Modified Example>

Figure 40:
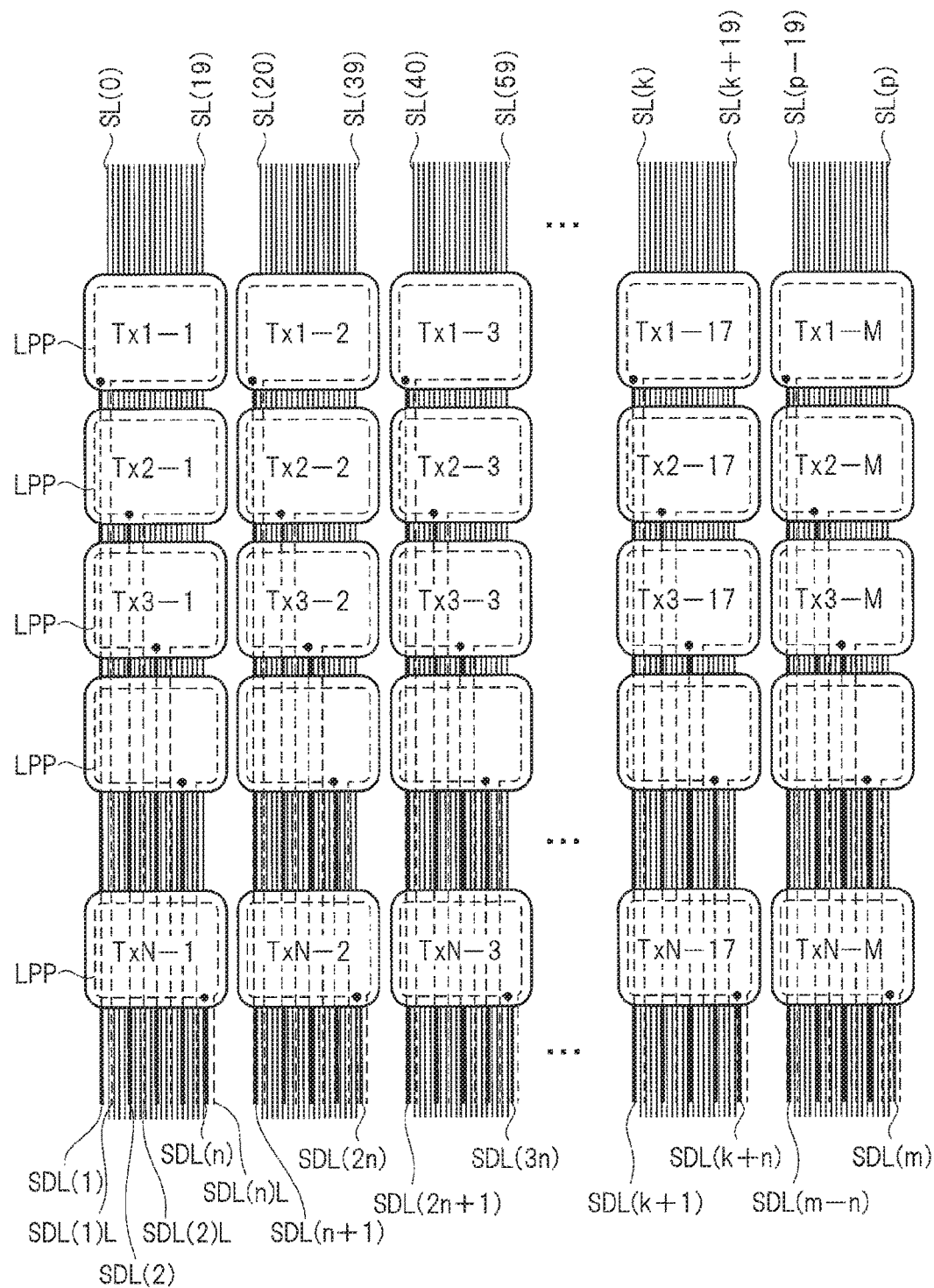
FIG. 40 is a plan view illustrating a configuration of a display device according to a modified example of the fourth embodiment.

FIG. 40 is a plan view illustrating a configuration of the display device 1 according to a fifth modified example of the fourth embodiment. FIG. 40 is similar to FIG. 30, and so a different point will be mainly described here. In the fifth modified example, detection signal lines SDL(1)L to SDL (m)L, which extend in parallel to the respective detection signal lines SDL(1) to SDL(m), are arranged. In FIG. 40, reference signs SDL(1)L, SDL(2)L and SDL(n)L are attached only to the detection signal lines arranged at the drive electrodes Tx1-1 to TxN-1 on the first column in order to prevent the drawing from being complicated.

Here, the description will be given by exemplifying the drive electrodes on the first column, but the other columns are also configured in the same manner. The detection signal line SDL(1)L extends in parallel to the detection signal line SDL(1), and the detection signal line SDL(1) and the detection signal line SDL(1)L are connected to each other, in an area of the drive electrode Tx1-1 to which the detection signal line SDL(1) is connected, so as to form a loop LPP. In addition, the detection signal line SDL(2)L extends in parallel to the detection signal line SDL(2), and the detection signal line SDL(2) and the detection signal line SDL(2)L are connected to each other, in an area of the drive electrode Tx2-1 to which the detection signal line SDL(2) is connected, so as to form a loop LPP. In the same manner after this, the detection signal line SDL(n)L extends in parallel to the detection signal line SDL(n), and the detection signal line SDL(n) and the detection signal line SDL(n)L are connected to each other, in an area of the drive electrode TxN-1 to which the detection signal line SDL(n) is connected, so as to form a loop LPP.

Each loop LPP is formed by bending and connecting the detection signals connected to each other when seen in a plan view.

In the fifth modified example, each loop LPP functions as a magnetic field detection coil. That is, a signal change in one detection signal line out of the detection signal lines connected to each other is detected as the sense signal S, and the ground voltage Vss is supplied to the other detection signal line at the time of magnetic field touch detection. Accordingly, when the vicinity of the drive electrode is touched by a pen, a signal change occurs in the detection signal line forming the loop LPP in the area of the drive electrode by the magnetic field generated around the pen, and the touch by the pen and a coordinate thereof can be obtained.

For example, when each of the detection signal lines SDL(1)L, SDL(2)L to SDL(n)L is set as the other detection signal line between the detection signal lines forming each loop, the ground voltage Vss is supplied to each of the detection signal lines SDL(1)L, SDL(2)L to SDL(n)L. At this time, the signal change in each of the detection signal lines SDL(1) and SDL(2) to SDL(n), which serves as one detection signal line between the detection signal lines forming each loop, is detected as the sense signal S. Accordingly, it is possible to make the detection about which part of the first column the pen is touched at, and simultaneously to make the detection about which row (which area out of the drive electrodes Tx1-1 to TxN-1) of the first column the touch is performed at (in).

Since the detection signal line is also used as the magnetic field detection coil in the fifth modified example, it is possible to manufacture the display device 1 with the low cost. In addition, the electric field touch detection can be performed in the same manner as the fourth modified example. Further, the detection signal line can be shared between the magnetic field detection and the electric field detection, and so it is possible to suppress the increase of price of the display device which is capable of the magnetic field touch detection and the electric field touch detection.

Fifth Embodiment

In the first to fourth embodiments, the description has been given mainly regarding the example where the magnetic field is generated in the magnetic field generation period TGT using the signal wiring orthogonal to the signal lines SL(0) to SL(p) in the display panel 2. In a fifth embodiment, the description will be given regarding an example where a magnetic field is generated in the magnetic field generation period TGT using a signal wiring arranged in parallel to the signal lines SL(0) to SL(p) in the display panel 2. Here, the description will be given regarding a case where drive electrodes are used as the signal wiring arranged in parallel to the signal lines SL(0) to SL(p).

Figure 31:
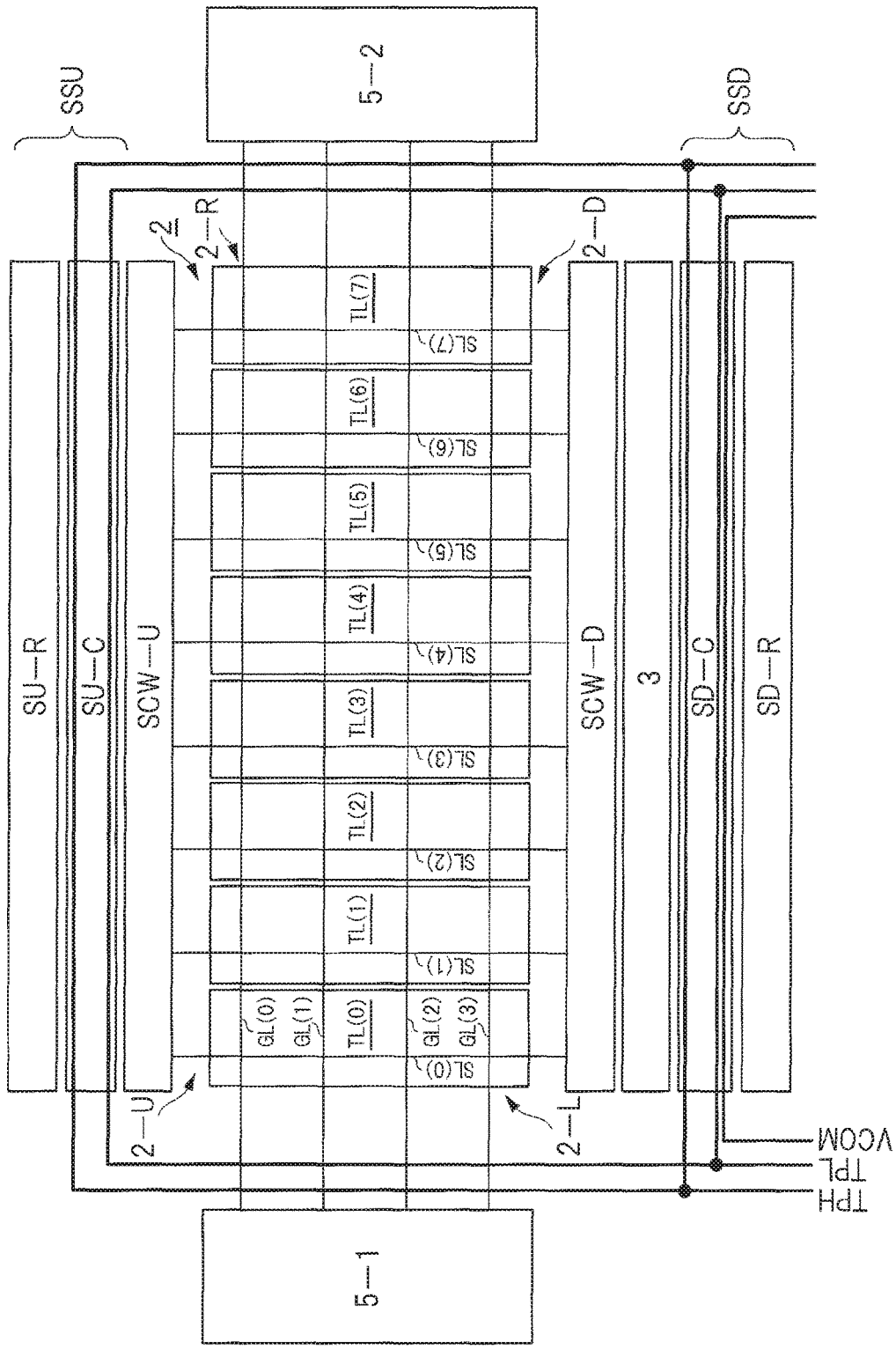
FIG. 31 is a plan view schematically illustrating a configuration of a display device according to a fifth embodiment.

FIG. 31 is a plan view schematically illustrating a configuration of the display device 1 according to the fifth embodiment. FIG. 31 illustrates a part relating to the display panel 2. Although the plurality of signal lines SL(0) to SL(p), the plurality of scan lines GL(0) to GL(p), the plurality of drive electrodes TL(0) to TL(p) and the like are arranged in the display panel 2. However, FIG. 31 illustrates the display panel 2 in which the signal lines SL(0) to SL(7), the scan lines GL(0) to GL(3), and the drive electrodes TL(0) to TL(7) are arranged to make the description easy. The signal lines SL(0) to SL(7) extend in the column direction and are arranged in parallel in the row direction in the display panel 2. In the fifth embodiment, the drive electrodes TL(0) to TL(7) to which the drive signal is supplied in the magnetic field generation period TGT are arranged in parallel to the signal lines SL(0) to SL(7). That is, the drive electrodes TL(0) to TL(7) also extend in the column direction and are arranged in parallel in the row direction in the display panel 2.

The scan lines GL(0) to GL(3) extend in the row direction and are arranged in parallel in the column direction in the display panel 2. In the fifth embodiment, gate drivers 5-1 and 5-2 are arranged along the side 2-L and the side 2-R of the display panel 2, respectively, although not particularly limited thereto. The scan lines GL(0) to GL(3) are connected to the gate driver 5-1 on the side 2-L side and are connected to the gate driver 5-2 on the side 2-R side. When display is performed in the display panel 2, for example, the gate driver 5-1 supplies a scan line signal with a high level to the scan line GL(0), and the gate driver 5-2 supplies the scan line signal with the high level to the next scan line GL(1) at the next timing. That is, the scan line signal with the high level is supplied to the scan lines GL(0) to GL(3) alternately from the gate drivers 5-1 and 5-2. Accordingly, it is possible to prevent the increase of the frame.

In FIG. 31, numeral 3 represents a signal line selector. The signal line selector 3 has been described with reference to FIG. 8 and the like, and so the description thereof will be omitted. In FIG. 31, numerals SCW-D and SCW-U represent connection circuits which electrically connect the signal lines SL(0) to SL(7) and the common electrodes TL(0) to TL(7), which overlap each other when seen in a plan view, during the touch detection. That is, the connection circuit SCW-D connects the drive electrode TL(0) and the signal line SL(0) on the side 2-D side, and the connection circuit SCW-U connects the drive electrode TL(0) and the signal line SL(0) on the side 2-U side during the touch detection. Similarly, the drive electrode TL(1) and the signal line SL(1) are connected by the connection circuits SCW-D and SCW-U during the touch detection. Similarly, the remaining drive electrodes and signal lines are also electrically connected during the touch detection. Accordingly, the drive electrodes and the signal lines, which overlap each other when seen in a plan view, are connected in parallel during the touch detection, and it is possible to achieve the reduction of the combined resistance.

In FIG. 31, numerals SU-R and SD-R represent drive circuits, and numerals SU-C and SD-C represent selection circuits. Similarly to the first embodiment, a selection drive circuit (a first drive circuit or a second drive circuit) SSU is configured using the drive circuit SU-R and the selection circuit SU-C, and a selection drive circuit (a second drive circuit or a first drive circuit) SSD is configured using the drive circuit SD-R and the selection circuit SD-C. The selection drive circuit SSU is arranged along the side 2-U of the display panel 2, and the selection drive circuit SSD is arranged along the side 2-D of the display panel 2.

The selection drive circuit SSU supplies a drive signal from the side 2-U side to one drive electrode out of the selected pair of drive electrodes and supplies the ground voltage Vss to the other drive electrode in the magnetic field generation period TGT for the magnetic field touch detection. In addition, the selection drive circuit SSD supplies the ground voltage Vss from the side 2-D side to the other drive electrode out of the above-described pair of drive electrodes and supplies the drive signal to the one drive electrode. Accordingly, a strong superimposed magnetic field is generated between the selected pair of drive electrodes in the magnetic field generation period TGT.

In FIG. 31, numeral VCOM represents a voltage wiring to which a predetermined voltage VCOMDC is supplied. In addition, numeral TPL represents a voltage wiring to which the ground voltage Vss is supplied, and numeral TPH represents a voltage wiring to which a predetermined voltage (for example, the voltage Vp illustrated in FIGS. 15A to 15C) is supplied. The selection drive circuits SSU and SSD connect the voltage wiring TPL to the selected drive electrode in order to supply the ground voltage Vss to the selected drive electrode. In addition, the selection drive circuits SSU and SSD connect the voltage wiring TPH to the selected drive electrode in order to supply the drive signal to the selected drive electrode.

A magnetic field detection coil is configured using the detection electrodes RL(0) to RL(p) formed on the CF glass substrate CGB, for example. In the fifth embodiment, the detection electrodes RL(0) to RL(p) extend in the row direction and are arranged in parallel in the column direction in the display panel 2, similarly to the scan line. In addition, the predetermined detection electrodes are connected to form the magnetic field detection coil in the magnetic field detection period TDT. In addition, the magnetic field detection coil may be formed using the scan lines GL(0) to GL(3).

In the fifth embodiment, the selection drive circuit SSD supplies the drive signal to the selected drive electrode at the time of electric field touch detection. Accordingly, an electric field is generated around the selected drive electrode. In this case, a change in the electric field is detected by the detection electrodes RL(0) to RL(p) or the scan lines GL(0) to GL(3) formed on the CF glass substrate CGB, for example.

Incidentally, each of the gate drivers 5-1 and 5-2 has a function of turning the scan lines GL(0) to GL(3) into the floating state, and turns the scan lines GL(0) to GL(3) into the floating state, for example, in the magnetic field generation period TGT although not particularly limited.

<Configuration of Selection Drive Circuit>

Figure 32:
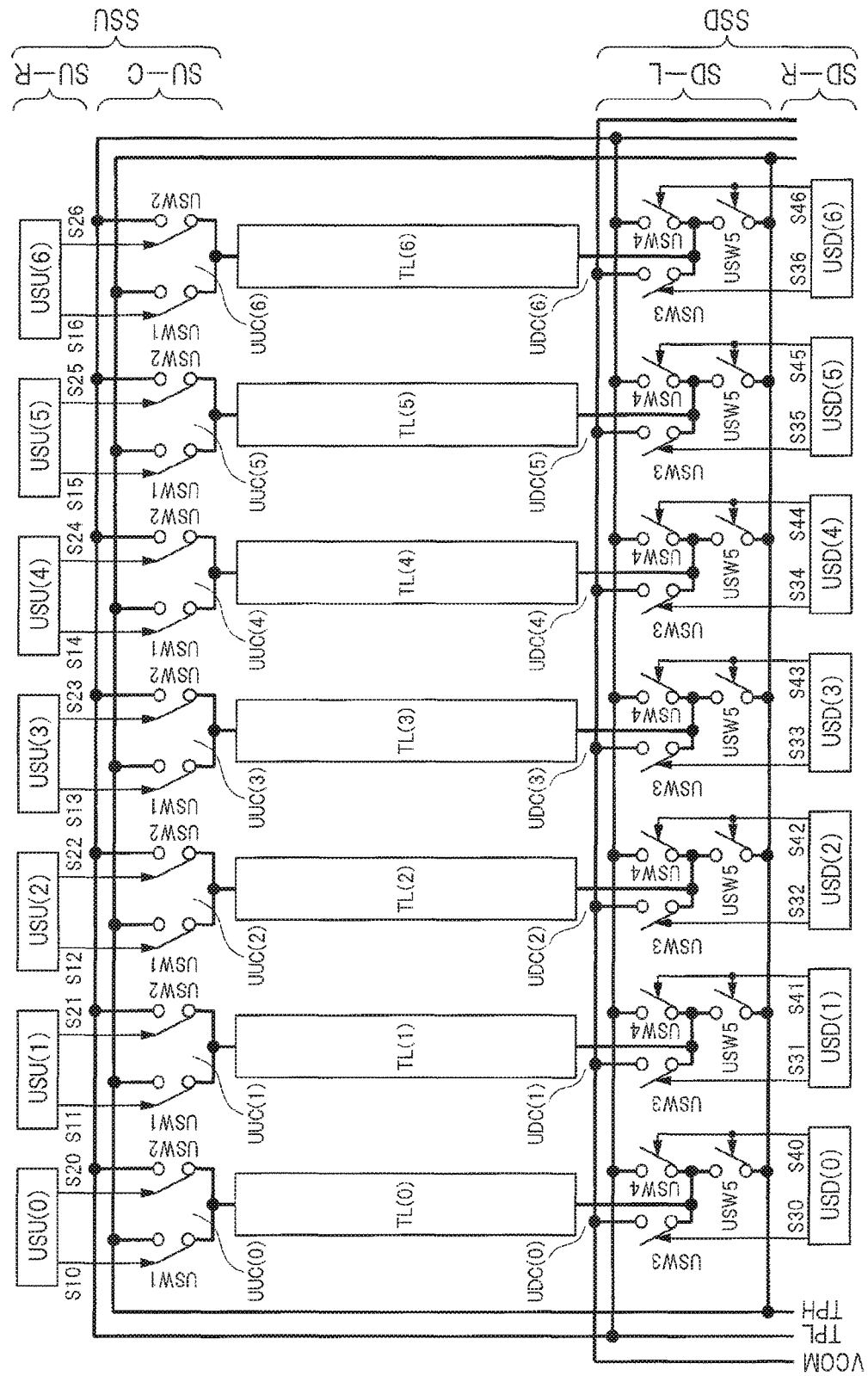
FIG. 32 is a circuit diagram illustrating a configuration of a selection drive circuit of the display device according to the fifth embodiment.

FIG. 32 is a circuit diagram illustrating each configuration of the selection drive circuits SSU and SSD according to the fifth embodiment. FIG. 32 is drawn in accordance with actual arrangement although being schematic. FIG. 32 illustrates the drive electrodes TL(0) to TL(6) among the drive electrodes TL(0) to TL(7) illustrated in FIG. 31, and each part of the selection drive circuits SSU and SSD corresponding to these drive electrodes TL(0) to TL(6).

As illustrated in FIG. 31, the selection drive circuit SSU is arranged along the side 2-U of the display panel 2, and the selection drive circuit SSD is arranged along the side 2-D of the display panel 2. The drive circuit SU-R inside the selection drive circuit SSU is provided with unit drive circuits USU(0) to USU(6) which correspond to the respective drive electrodes TL(0) to TL(6) and which are arranged along the side 2-U. Similarly, the drive circuit SD-R inside the selection drive circuit SSD is provided with unit drive circuits USD(0) to USD(6) which correspond to the respective drive electrodes TL(0) to TL(6) and which are arranged along the side 2-D.

In the fifth embodiment, the voltage wirings TPL and TPH are arranged to surround the display panel 2. When the description is given by exemplifying the module illustrated in FIG. 9, the voltage wirings TPL and TPH are arranged to pass through an area between the side 2-L of the display panel 2 and the side 900-L of the module 900, an area between the side 2-U of the display panel 2 and the side 900-U of the module 900, an area between the side 2-R of the display panel 2 and the side 900-R of the module 900, and an area between the side 2-D of the display panel 2 and the side 900-D of the module 900. That is, the voltage wirings TPL and TPH are arranged in upper, lower, right and left frames of the module 900. Meanwhile, the voltage wiring VCOM is arranged in the area between the side 2-D of the display panel 2 and the side 900-D of the module 900.

The selection circuit SU-C inside the selection drive circuit SSU is provided with unit selection circuits UUC(0) to UUC(6) which correspond to the respective unit drive circuits USU(0) to USU(6) in the fifth embodiment. Each of the unit selection circuits UUC(0) to UUC(6) is provided with a tenth switch USW1 and an eleventh switch USW2. In each of the unit selection circuits UUC(0) to UUC(6), the tenth switch USW1 is connected between the voltage wiring TPH and one end portion of the corresponding drive electrode and is subjected to switch control by a selection signal sent from the corresponding unit drive circuit; and the eleventh switch USW2 is connected between the voltage wiring TPL and one end portion of the corresponding drive electrode and is subjected to switch control by a selection signal sent from the corresponding unit drive circuit.

That is, the tenth switch USW1 is connected between the voltage wiring TPH and one end portion of the drive electrode TL(0) and is subjected to switch control by a selection signal C10 sent from the unit selection circuit USU(0) in the unit selection circuit UUC(0). In addition, the eleventh switch USW2 is connected between the voltage wiring TPL and the one end portion of the drive electrode TL(0) and is subjected to switch control by a selection signal C20 sent from the unit selection circuit USU(0) in the unit selection circuit UUC(0). In the unit selection circuit UUC(1), each of the tenth switch USW1 and the eleventh switch USW2 is connected between each of the voltage wirings TPH and TPL and one end portion of the drive electrode TL(1) and is subjected to switch control by each of selection signals C11 and C21 sent from the unit selection circuit USU(1). In the unit selection circuit UUC(2), each of the tenth switch USW1 and the eleventh switch USW2 is connected between each of the voltage wirings TPH and TPL and one end portion of the drive electrode TL(2) and is subjected to switch control by each of selection signals C12 and C22 sent from the unit selection circuit USU(2).

Similarly, each of the tenth switch USW1 and the eleventh switch USW2 is connected between each of the voltage wirings TPH and TPL and one end of the drive electrode TL(3) and is subjected to switch control by each of selection signals C13 and C23 sent from the unit selection circuit USU(3) in the unit selection circuit UUC(3). Each of the tenth switch USW1 and the eleventh switch USW2 is connected between each of the voltage wirings TPH and TPL and one end portion of the drive electrode TL(4) and is subjected to switch control by each of selection signals C14 and C24 sent from the unit selection circuit USU(4) in the unit selection circuit UUC(4). Each of the tenth switch USW1 and the eleventh switch USW2 is connected between each of the voltage wirings TPH and TPL and one end portion of the drive electrode TL(5) and is subjected to switch control by each of selection signals C15 and C25 sent from the unit selection circuit USU(5) in the unit selection circuit UUC(5). Each of the tenth switch USW1 and the eleventh switch USW2 is connected between each of the voltage wirings TPH and TPL and one end portion of the drive electrode TL(6) and is subjected to switch control by each of selection signals C16 and C26 sent from the unit selection circuit USU(6) in the unit selection circuit UUC(6).

The drive circuit SD-R inside the selection drive circuit SSD is also provided with the unit drive circuits USD(0) to USD(6) which correspond to the respective drive electrodes TL(0) to TL(6). In addition, the selection circuit SD-L is provided with unit selection circuits UDC(0) to UDC(6) which correspond to the respective drive electrodes and unit drive circuits. Each of the unit selection circuits UDC(0) to UDC(6) is provided with a twelfth switch USW3, a thirteenth switch USW4, and a fourteenth switch USW5 which are subjected to switch control by control signals sent from the corresponding unit selection circuits. Here, the twelfth switch USW3 is connected between the other end portion of the corresponding drive electrode and the voltage wiring VCOM; the thirteenth switch USW4 is connected between the other end portion of the corresponding drive electrode and the voltage wiring TPL; and the fourteenth switch USW5 is connected between the other end portion of the corresponding drive electrode and the voltage wiring TPH.

That is, the twelfth switch USW3 is connected between the other end portion of the drive electrode TL(0) and the voltage wiring VCOM; the thirteenth switch USW4 is connected between the other end portion of the drive electrode TL(0) and the voltage wiring TPL; and the fourteenth switch USW5 is connected between the other end portion of the drive electrode TL(0) and the voltage wiring TPH in the unit selection circuit UDC(0). In addition, the twelfth switch USW3 in the unit selection circuit UDC(0) is subjected to switch control by a selection signal S30 sent from the unit drive circuit USD(0); the thirteenth switch USW4 is subjected to switch control by a selection signal S40 sent from the unit drive circuit USD(0); and the fourteenth switch USW5 is subjected to switch control by the selection signal S40 sent from the unit drive circuit USD(0).

In addition, each of the twelfth switch USW3, the thirteenth switch USW4, and the fourteenth switch USW5 is connected between the other end portion of the drive electrode TL(1) and each of the voltage wirings VCOM, TPL and TPH and is subjected to switch control by selection signals S31 and S41 sent from the unit drive circuit USD(1) in the unit selection circuit UDC(1). Each of the twelfth switch USW3, the thirteenth switch USW4, and the fourteenth switch USW5 is connected between the other end portion of the drive electrode TL(2) and each of the voltage wirings VCOM, TPL and TPH and is subjected to switch control by selection signals S32 and S42 sent from the unit drive circuit USD(2) in the unit selection circuit UDC(2). In the unit selection circuit UDC(3), each of the twelfth switch USW3, the thirteenth switch USW4, and the fourteenth switch USW5 is connected between the other end portion of the drive electrode TL(3) and each of the voltage wirings VCOM, TPL and TPH and is subjected to switch control by selection signals S33 and S43 sent from the unit drive circuit USD(3).

Similarly, each of the twelfth switch USW3, the thirteenth switch USW4, and the fourteenth switch USW5 is connected between the other end portion of the drive electrode TL(4) and each of the voltage wirings VCOM, TPL and TPH and is subjected to switch control by selection signals S34 and S44 sent from the unit drive circuit USD(4) in the unit selection circuit UDC(4). Each of the twelfth switch USW3, the thirteenth switch USW4, and the fourteenth switch USW5 is connected between the other end portion of the drive electrode TL(5) and each of the voltage wirings VCOM, TPL and TPH and is subjected to switch control by selection signals S35 and S45 sent from the unit drive circuit USD(5) in the unit selection circuit UDC(5). In addition, each of the twelfth switch USW3, the thirteenth switch USW4, and the fourteenth switch USW5 is connected between the other end portion of the drive electrode TL(6) and each of the voltage wirings VCOM, TPL and TPH and is subjected to switch control by selection signals S36 and S46 sent from the unit drive circuit USD(6) in the unit selection circuit UDC(6).

Figure is illustrated so that the thirteenth switch USW4 and the fourteenth switch USW5 are subjected to the switch control by the single selection signal (for example, the selection signal S40) in each of the unit selection circuits UDC(0) to UDC(6) in order to prevent the drawing from being complicated, but the thirteenth switch USW4 and the fourteenth switch USW5 are separately switch-controlled by the corresponding unit drive circuit.

In the fifth embodiment, the drive signal or the ground voltage Vss is supplied to the drive electrode corresponding to the unit drive circuit which indicates selection in the magnetic field generation period TGT, similarly to the description in FIG. 22. In this case, the drive signal corresponds to the predetermined voltage in the voltage wiring TPH, and the supply of the predetermined voltage of the voltage wiring TPH to the drive electrode corresponds to the supply of the drive signal.

Each of the unit drive circuits USU(0) to USU(6) has a shift stage, and the respective shift stages are connected in series in this order. Similarly, each of the unit drive circuits USD(0) to USD(6) also has a shift stage, and the respective shift stages are connected in series in this order. For example, the selection information SEI indicating the selection is set to the unit drive circuits USU(0), USU(1), USD(0) and USD(1), and the selection information SEI is sequentially shifted to the unit drive circuit USU(6) and USD(6) in synchronization with a clock signal (not illustrated).

For example, when the selection information SEI indicating the selection is set to the unit drive circuits USU(0), USU(1), USD(0) and USD(1), the unit drive circuit USU(0) turns the eleventh switch USW2 inside the unit selection circuit UUC(0) into the on-state using the selection signal S20, and turns the tenth switch USW1 into the off-state using the selection signal S10 in the magnetic field generation period TGT. At this time, the unit drive circuit USU(1) turns the tenth switch USW1 inside the unit selection circuit UUC(1) into the on-state using the selection signal S11, and turns the eleventh switch USW2 into the off-state using the selection signal S21.

In addition, at this time, the unit drive circuit USD(0) turns the fourteenth switch USW5 into the on-state using the selection signal S40, and turns the thirteenth switch USW4 into the off-state. In addition, the unit drive circuit USD(0) turns the twelfth switch USW3 into the off-state using the selection signal S30. Further, at this time, the unit drive circuit USD(1) turns the thirteenth switch USW4 into the on-state using the selection signal S41, and turns the fourteenth switch USW5 into the off-state. In addition, the unit drive circuit USD(1) turns the twelfth switch USW3 into the off-state using the selection signal S30.

Accordingly, the one end portion of the drive electrode TL(0) is connected to the voltage wiring TPL via the eleventh switch USW2 inside the unit selection circuit UUC(0), and the other end portion of the drive electrode TL(1) is connected to the voltage wiring TPL via the thirteenth switch USW4 inside the unit selection circuit UDC(1). At this time, the other end portion of the drive electrode TL(0) is connected to the voltage wiring TPH via the fourteenth switch USW5 inside the unit selection circuit UDC(0); and the one end portion of the drive electrode TL(1) is connected to the voltage wiring TPH via the tenth switch USW1 inside the unit selection circuit UUC(1). As a result, the ground voltage Vss is supplied to the one end portion of the drive electrode TL(0) and the other end portion of the drive electrode TL(1); and the predetermined voltage is supplied to the other end portion of the drive electrode TL(0) and the one end portion of the drive electrode TL(1) as the drive signal.

A current flows in the drive electrode TL(0) in a direction from the other end portion toward the one end portion thereof (upward direction in the drawing) by the predetermined voltage; a current flows in the drive electrode TL(1) in a direction from the one end portion toward the other end portion (downward direction in the drawing); a magnetic field is generated around each of the drive electrodes TL(0) and TL(1); and the magnetic fields are superimposed on each other in an area sandwiched between the drive electrodes TL(0) and TL(1).

Incidentally, each of the unit drive circuits USU(2) to USU(6) turns the tenth switch USW1 and the eleventh switch USW2 in each of the corresponding unit selection circuits UUC(2) to UUC(6) into the off-state using the selection signals S12 to S16 and S22 to S26 at this time. In addition, each of the unit drive circuits USD(2) to USD(6) turns the twelfth switch USW3, the thirteenth switch USW4, and the fourteenth switch USW5 in each of the corresponding unit selection circuits UDC(2) to UDC(6) into the off-state using the selection signals S32 to S36 and S42 to S46 at this time. As a result, each of the drive electrodes TL(2) to TL(6) is turned into a high impedance state.

When the selection information SEI is shifted to the unit drive circuits USU(1), USU(2), UDC(1) and UDC(2) as the clock signal changes, the unit drive circuit USU(1) turns the tenth switch USW1 inside the unit selection circuit UUC(1) into the off-state, and turns the eleventh switch USW2 into the on-state using the selection signals S11 and S21. At this time, the unit drive circuit USU(2) turns the tenth switch USW1 inside the unit selection circuit UUC(2) into the on-state and turns the eleventh switch USW2 into the off-state using the selection signals S11 and S21. In addition, the unit selection circuit USD(1) turns the fourteenth switch USW5 inside the unit selection circuit UDC(1) into the on-state, and turns the twelfth switch USW3 and the thirteenth switch USW4 into the off-state using the selection signals S31 and S41. In addition, the unit selection circuit USD(2) turns the thirteenth switch USW4 inside the unit selection circuit UDC(2) into the on-state, and turns the twelfth switch USW3 and the fourteenth switch USW5 into the off-state using the selection signals S32 and S42.

As a result, a current flows in the drive electrode TL(1) from the other end portion toward the one end portion thereof and a current flows in the drive electrode TL(2) from the one end portion toward the other end portion thereof. The magnetic fields are generated around the drive electrodes TL(1) and TL(2) due to these currents, thereby generating the superimposed magnetic field. At this time, the tenth switch to the fourteenth switch in each of the unit selection circuits UUC(0), UUC(3) to UUC(6), UDC(0) and UDC(3) to UDC(6) are turned into the off-state, and the drive electrodes TL(0) and TL(3) to TL(6) are turned into the high impedance state.

After this, the magnetic field is sequentially generated according to the shift of the selection information SEI toward the unit drive circuits USU(6) and USD(6) in synchronization with the clock signal. That is, the magnetic fields are generated around the drive electrodes TL(2) and TL(3); the magnetic fields are generated around the drive electrodes TL(3) and TL(4) at the subsequent timing; the magnetic fields are generated around the drive electrodes TL(4) and TL(5) at the further subsequent timing; and then the magnetic fields are generated around the drive electrodes TL(5) and TL(6).

The direction of the current flowing in the drive electrode is not limited to the above-described direction. For example, when the drive electrodes TL(0) and TL(1) are caused to generate the magnetic fields, the current may flow in the drive electrode TL(0) in a direction from the one end portion toward the other end portion thereof, and flow in the drive electrode TL(1) from the other end portion toward the one end portion thereof. That is, the respective directions of the currents may be opposite to each other between the pair of drive electrodes adjacently arranged.

Although the description has been given regarding the example of using the drive electrodes arranged to be adjacent to each other, the invention is not limited thereto. For example, the magnetic field may be generated by the drive electrodes which are arranged to sandwich one or a plurality of drive electrodes. For example, the selection information SEI indicating selection may be set to the unit drive circuits USU(0), USC(2), USD(0) and USD(2). In this manner, the magnetic field is generated around the pair of drive electrodes TL(0) and TL(2) arranged to sandwich the drive electrode TL(1). Subsequently, the magnetic fields are sequentially generated around the drive electrodes arranged to sandwich one drive electrode as the selection information SEI is shifted in synchronization with the change of the clock signal.

At the time of electric field touch detection, each of the unit drive circuits USU(0) to USU(6) turns the tenth switch USW1 and the eleventh switch USW2 inside the corresponding unit selection circuits UUC(0) to UUC(6) into the off-state using the selection signals S10 to S16 and S20 to S26. Meanwhile, the selection information SEI is sequentially shifted in the unit drive circuits USD(0) to USD(6). For example, when the selection information SEI is set to the unit drive circuit USD(0), the unit drive circuit USD(0) turns the twelfth switch USW3 into the on-state using the selection signal S30. Accordingly, the drive electrode TL(0) is connected to the voltage wiring VCOM via the twelfth switch USW3. In the fifth embodiment, the control circuit D-CNT (FIG. 8) supplies an electric field drive signal with periodically changing voltage to the voltage wiring VCOM in the case of electric field touch detection. Accordingly, the drive electrode TL(0) generates an electric field according to the electric field drive signal at the time of electric field touch detection.

Incidentally, the thirteenth switch USW4 and the fourteenth switch USW5 in the unit selection circuit UDC(0) are turned into the off-state at this time. In addition, the twelfth switch USW3, the thirteenth switch USW4, and the fourteenth switch USW5 in each of the remaining unit selection circuits USD(1) to USD(6) are also turned into the off-state.

As the selection information SEI is shifted from the unit drive circuit USD(0) toward USD(6), the electric fields are sequentially generated from the drive electrode TL(2) toward TL(6).

Although the description has been given regarding the example where the electric field drive signal with the periodically changing voltage is supplied to the voltage wiring VCOM at the time of electric field touch detection, the invention is not limited thereto. For example, the thirteenth switch USW4 and the fourteenth switch USW5 may be complementarily turned into the on/off state using the selection signal S40 instead of turning the twelfth switch USW3 into the on-state using the selection signal S30. As the thirteenth switch USW4 and the fourteenth switch USW5 are complementarily turned into the on/off state, the drive electrode TL(0) is alternately connected to the voltage wirings TPH and TPL. As a result, the voltage that changes with time is supplied to the drive electrode TL(0), and it is possible to generate the electric field that changes with time.

The magnetic field detection coil can be formed using the detection electrodes RL(0) to RL(p) or the scan lines GL(0) to GL(p) at the time of magnetic field touch detection, similarly to the description in the fourth embodiment. In addition, for example, the scan line can be used as the detection electrode to detect the change of the electric charge amount at the time of electric field touch detection.

<Modified Example>

Figure 33:
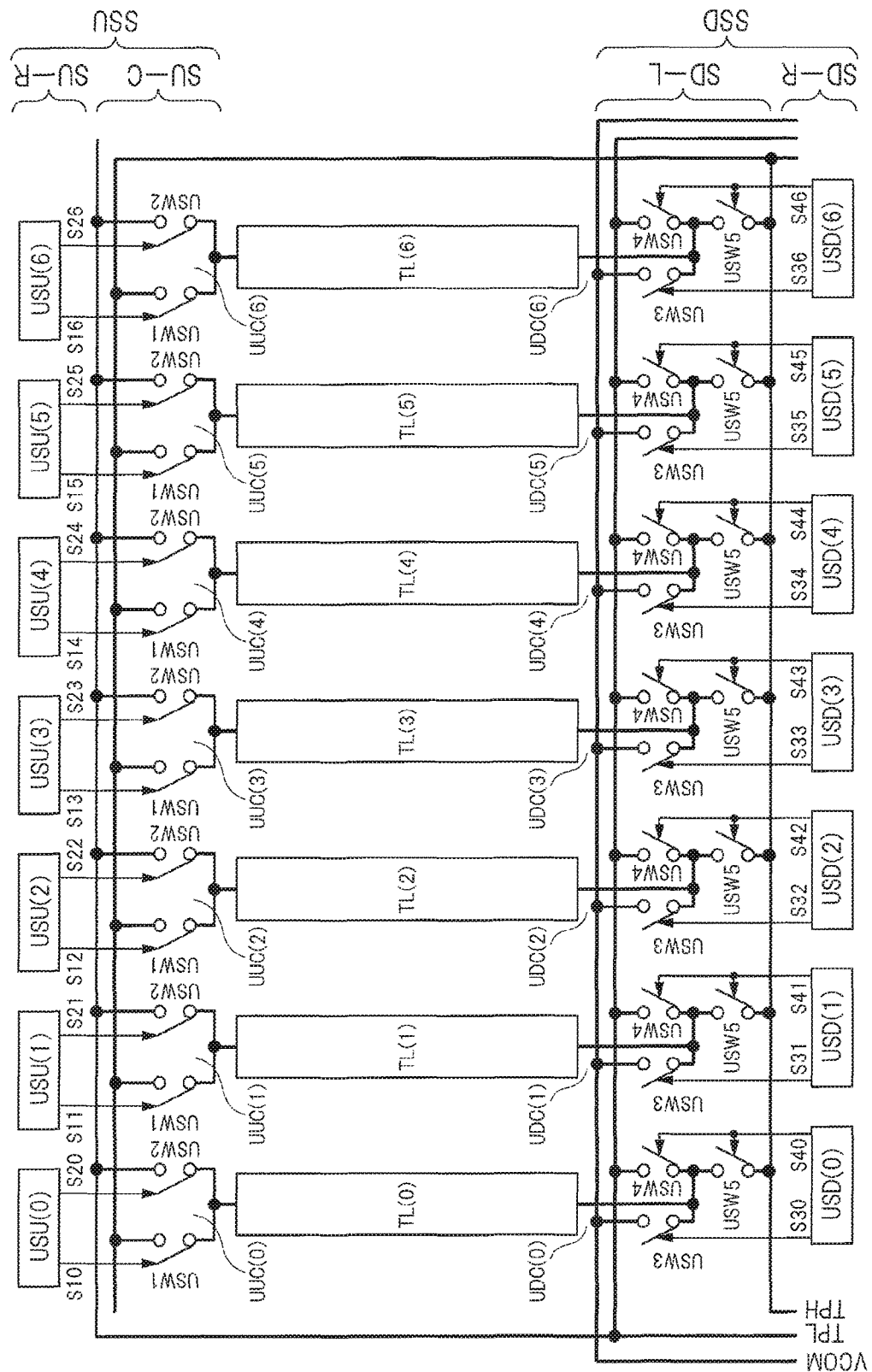
FIG. 33 is a circuit diagram illustrating a configuration of a selection drive circuit of a display device according to a modified example of the fifth embodiment.

FIG. 33 is a circuit diagram illustrating configurations of selection drive circuits SSU and SSD according to a modified example of the fifth embodiment. FIG. 33 is drawn in accordance with actual arrangement although being schematic. FIG. 33 is similar to FIG. 32, and so a different point will be mainly described here.

In the configuration illustrated in FIG. 32, each of the voltage wirings TPL and TPH is arranged to surround the display panel 2. In regard to this, the voltage wiring TPL is arranged in an area between the side 2-L of the display panel 2 and the side 900-L of the module 900 (FIG. 9), and the voltage wiring TPH is arranged in an area between the side 2-R of the display panel 2 and the side 900-R of the module 900 in the modified example illustrated in FIG. 33. In other words, the voltage wiring TPH is not arranged in the area between the side 2-L of the display panel 2 and the side 900-L of the module 900 (FIG. 9), and the voltage wiring TPL is not arranged in the area between the side 2-R of the display panel 2 and the side 900-R of the module 900 (FIG. 9). That is, only one of the voltage wirings TPH and TPL is arranged in the right and left frames.

In the modified example, the voltage wirings TPL and TPH are arranged in an area between the side 2-U of the display panel 2 and the side 900-U of the module 900, and the voltage wirings TPL and TPH are also arranged in an area between the side 2-D of the display panel 2 and the side 900-D of the module 900. In addition, the voltage wiring TPL arranged in the area between the side 2-U and the side 900-U is connected to the voltage wiring TPL arranged in the area between the side 2-D and the side 900-D via the voltage wiring TPL arranged in the area between the side 2-L and the side 900-L. Further, the voltage wiring TPH arranged in the area between the side 2-U and the side 900-U is connected to the voltage wiring TPR arranged in the area between the side 2-D and the side 900-D via the voltage wiring TPR arranged in the area between the side 2-R and the side 900-R.

Accordingly, it is possible to supply the ground voltage Vss and the predetermined voltage to the selection drive circuit SSU arranged along the side 2-U of the display panel 2 and the selection drive circuit SSD arranged along the side 2-D of the display panel 2 while suppressing the increase of the frame.

Sixth Embodiment

Figure 34:
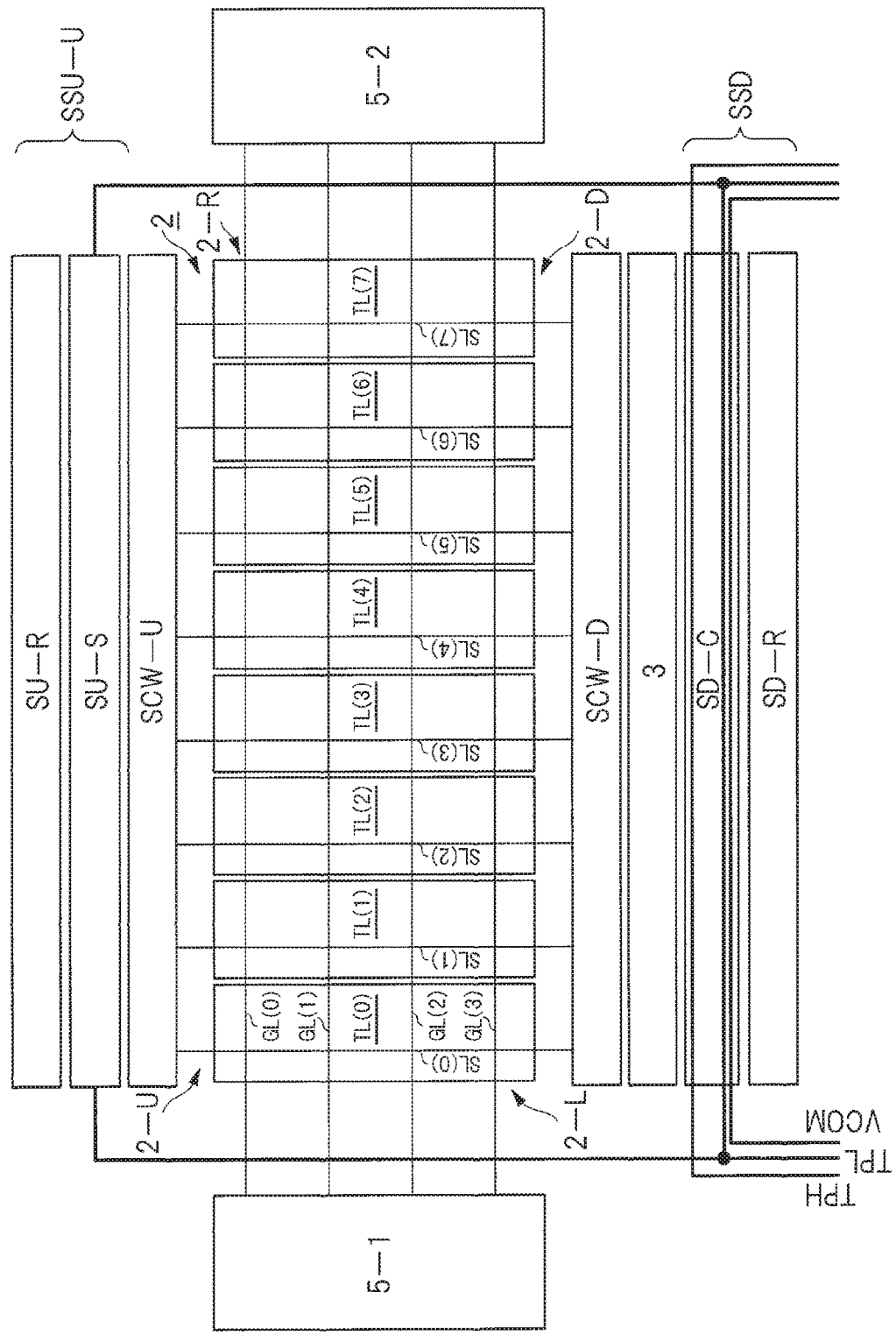
FIG. 34 is a schematic plan view illustrating a configuration of a display device according to a sixth embodiment.

FIG. 34 is a schematic plan view illustrating a configuration of the display device 1 according to a sixth embodiment. FIG. 34 is also drawn in accordance with actual arrangement although being schematic. In the display device 1 according to the sixth embodiment, the description will be given also regarding an example where a magnetic field is generated in the magnetic field generation period TGT using a drive electrode arranged in parallel to the signal lines SL(0) to SL(p) similarly to the fifth embodiment.

FIG. 34 illustrates a part relating to the display panel 2 similarly to FIG. 31. FIG. 34 is similar to FIG. 31, and so a different point will be mainly described here. In FIG. 31, the predetermined voltage serving as the drive signal and the ground voltage Vss are supplied to the pair of drive electrodes by the selection drive circuit SSU including the drive circuit SU-R and the selection circuit SU-C in the magnetic field generation period TGT to generate the magnetic field. Thus, the voltage wirings TPL and TPH are arranged along the side 2-U of the display panel 2, and the ground voltage Vss and the predetermined voltage are supplied to the selection circuit SU-C.

In the sixth embodiment, the selection drive circuit SSU-S is also arranged along the side 2-U of the display panel 2. The selection drive circuit SSU-S according to the sixth embodiment is provided with the drive circuit SU-R and a selective connection circuit SU-S. The selective connection circuit SU-S is different from the selection circuit SU-C that has been described in the fifth embodiment, and forms a magnetic field generation coil by connecting signal wirings arranged to be parallel to the signal lines SL(0) to SL(p) to each other in the magnetic field generation period TGT. Here, drive electrodes and voltage wirings arranged along the sides 2-L and 2-R of the display panel 2 correspond to the signal wirings arranged to be parallel to the signal lines SL(0) to SL(p).

In the case of focusing on the voltage wiring TPH arranged in the area between the side 2-L of the display panel 2 and the side 900-L of the module 900 and the voltage wiring TPL arranged in the area between the side 2-R of the display panel 2 and the side 900-R of the module 900, both voltage wirings are used to supply the predetermined voltage and the ground voltage Vss to the selection circuit SU-C in the fifth embodiment. In regard to this, the voltage wirings TPL and TPH, which are arranged along the side 2-L and the side 2-R of the display panel 2, are also used as windings of a magnetic field generation coil in the sixth embodiment although not particularly limited thereto.

<Configuration of Selective Connection Circuit>

Figure 35:
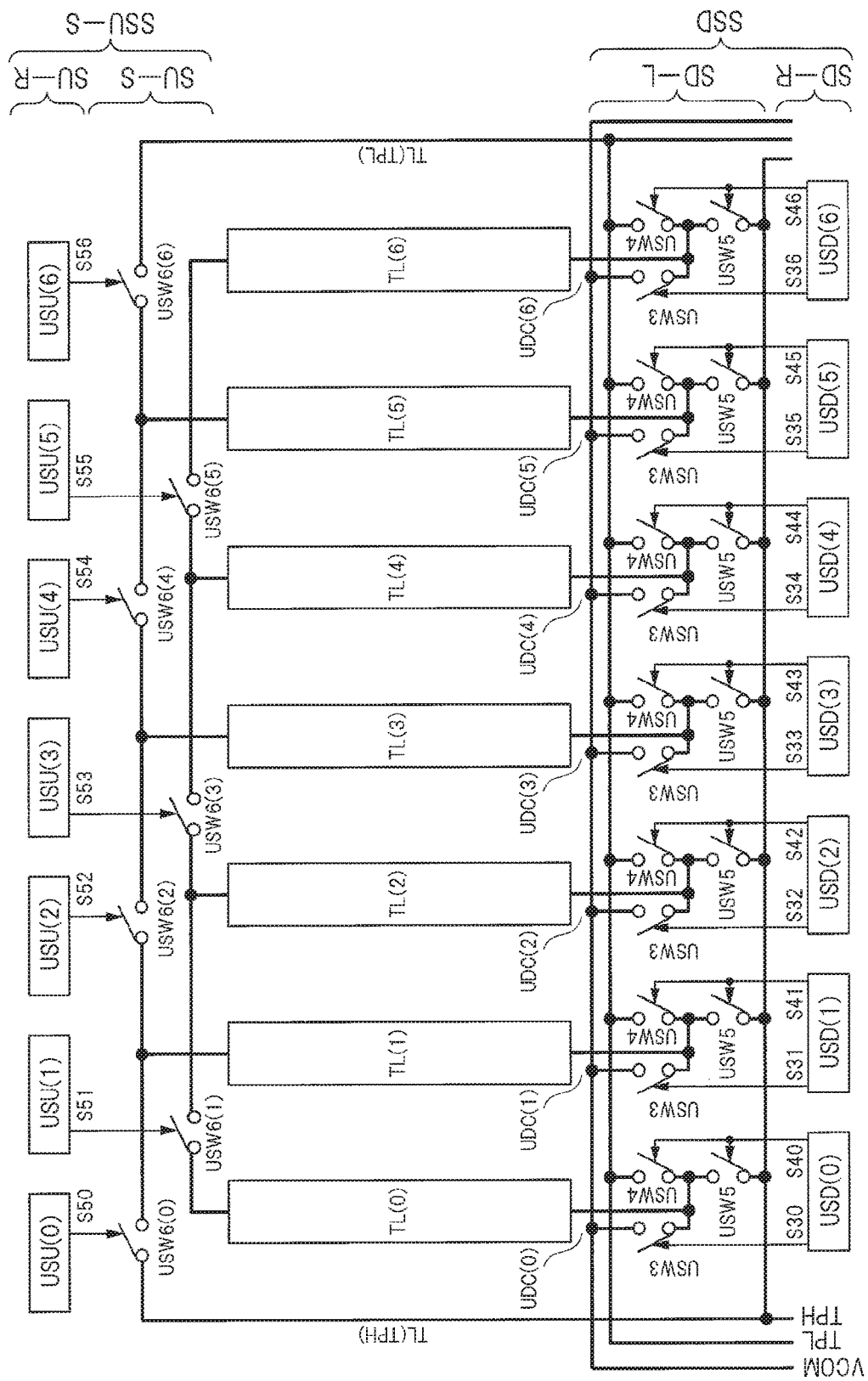
FIG. 35 is a circuit diagram illustrating a configuration of a selective connection circuit of the display device according to the sixth embodiment.

FIG. 35 is a circuit diagram illustrating a configuration of the selection drive circuit SSU-S according to the sixth embodiment. FIG. 35 is drawn in accordance with actual arrangement although being schematic. In FIG. 35, the selection drive circuit SSD and the drive electrodes TL(0) to TL(6) are the same as those in FIG. 32, and so the description thereof will be omitted.

Similarly to FIG. 32, the drive circuit SU-R includes the plurality of unit drive circuits USU(0) to USU(6). Each of the unit drive circuits USU(0) to USU(6) has the shift stage. The respective shift stages of the unit drive circuits USU(0) to USU(6) are connected in series, and the selection information SEI set to the unit drive circuit USU(0) is shifted toward the unit drive circuit USU(6) in synchronization with a clock signal (not illustrated). Each of the unit drive circuits USU(0) to USU(6) outputs selection signals S50 to S56 indicating selection as the selection information SEI indicating selection is set thereto. For example, the unit drive circuit USU(3) outputs the selection signal S53 indicating the selection when the selection information SEI indicating the selection is shifted from the unit drive circuit USU(2) at the previous stage and is supplied thereto.

The selective connection circuit SU-S includes fifteenth switches USW6(0) to USW6(6) which correspond to the unit drive circuits USU(0) to USU(6), respectively. Each of the fifteenth switches USW6(0) to USW(6) is connected among each of the drive electrodes TL(0) to TL(6), a voltage wiring TL(TPH) arranged along the side 2-L of the display panel 2, and a voltage wiring TL(TPL) arranged along the side 2-R of the display panel 2 so that one drive electrode is sandwiched therebetween. In FIG. 35, the voltage wiring TL(TPH) represents an area arranged along the side 2-L of the display panel 2 in the voltage wiring TPH, and the voltage wiring TL(TPL) represents an area arranged along the side 2-R of the display panel 2 in the voltage wiring TPL. The voltage wirings TL(TPH) and TL(TPL) are arranged along the side 2-L and the side 2-R of the display panel 2, and thus are parallel to the drive electrodes TL(0) to TL(6).

The fifteenth switch USW6(0) is connected between the voltage wiring TL(TPH) and one end portion of the drive electrode TL(1) and is subjected to switch control by the selection signal S50 sent from the unit drive circuit USU(0); the fifteenth switch USW6(1) is connected between the one end portions of the respective drive electrode TL(0) and drive electrode TL(2), and is subjected to switch control by the selection signal S51 sent from the unit drive circuit USU(1); and the fifteenth switch USW6(2) is connected between one end portions of the respective drive electrode TL(1) and drive electrode TL(3), and is subjected to switch control by the selection signal S52 sent from the unit drive circuit USU(2). In addition, the fifteenth switch USW6(3) is connected between one end portions of the respective drive electrode TL(2) and drive electrode TL(4), and is subjected to switch control by the selection signal S53 sent from the unit drive circuit USU(3); and the fifteenth switch USW6(4) is connected between one end portions of the respective drive electrode TL(3) and drive electrode TL(5), and is subjected to switch control by the selection signal S54 sent from the unit drive circuit USU(4).

Similarly, the fifteenth switch USW6(5) is connected between one end portions of the respective drive electrode TL(4) and drive electrode TL(6), and is subjected to switch control by the selection signal S55 sent from the unit drive circuit USU(5); and the fifteenth switch USW6(6) is connected between one end portion of the drive electrode TL(5) and the voltage wiring TL(TPL), and is subjected to switch control by the selection signal S56 sent from the unit drive circuit USU(6).

In the sixth embodiment, when the unit drive circuit USU(0) outputs the selection signal S50 indicating the selection in the magnetic field generation period TGT, the unit drive circuit USD(1) outputs the selection signal S41 so that the thirteenth switch USW4 inside the unit selection circuit UDC(1) is turned into the on-state, and that the fourteenth switch USW5 is turned into the off-state. Since the fifteenth switch USW6(0) is turned into the on-state by the selection signal S50, the voltage wiring TL(TPH) and the drive electrode TL(1), which are arranged in parallel to each other, are connected in series. As a result, a magnetic field generation coil using the voltage wiring TL(TPH) and the drive electrode TL(1) as a winding is formed. When a current flows in the voltage wiring TL(TPH) and the drive electrode TL(1) connected in series, a magnetic field is generated around each of the voltage wiring TL(TPH) and the drive electrode TL(1). The generated magnetic fields are superimposed on each other in an area of the drive electrode TL(0) sandwiched between the voltage wiring TL(TPH) and the drive electrode TL(1), thereby generating a strong magnetic field.

Next, when the selection information SEI indicating the selection is shifted to the unit drive circuit USU(1), the fifteenth switch USW6(1) is turned into the on-state by the selection signal S51. At this time, the unit drive circuit USD(0) outputs the selection signal S40 so that the fourteenth switch USW5 inside the unit selection circuit UDC(0) is turned into the on-state and the thirteenth switch USW4 is turned into the off-state. In addition, the unit selection circuit UDC(2) outputs the selection signal S42 so that the thirteenth switch USW4 inside the unit selection circuit UDC(2) is turned into the on-state and the fourteenth switch USW5 is turned into the off-state. Since the fifteenth switch USW6(1) is turned into the on-state, the drive electrodes TL(0) and TL(2), which are arranged in parallel to each other, are connected in series, and a magnetic field generation coil using these drive electrodes as a winding is formed. In addition, magnetic fields are generated as a current flows in the drive electrodes TL(0) and TL(2) connected in series, and the generated magnetic fields are superimposed on each other in an area of the drive electrode TL(1).

In the same manner after this, the fifteenth switches are sequentially turned into the on-state, two drive electrodes are connected in series, and a current flows in the drive electrodes connected in series, thereby generating a strong magnetic field. In addition, a magnetic field generation coil using the drive electrode TL(5) and the voltage wiring TL(TPL) as a winding is formed when the fifteenth switch USW6(6) is turned into the on-state by the selection signal S56 sent from the unit drive circuit USU(6). In this case, a strong magnetic field is generated in an area of the drive electrode TL(6).

Although the description has been given in FIG. 35 regarding the case where one drive electrode is sandwiched therebetween, the invention is not limited thereto. For example, two or more drive electrodes may be sandwiched, or no drive electrode may be sandwiched therebetween. For example, when the two drive electrodes are sandwiched therebetween, the fifteenth switch USW6(0) is connected between the voltage wiring TL(TPH) and the drive electrode TL(2), and the fifteenth switch USW6(1) is connected between the drive electrode TL(0) and the drive electrode TL(3). On the other hand, when no drive electrode is sandwiched therebetween, the fifteenth switch USW6(0) is connected between the voltage wiring TL(TPH) and the drive electrode TL(0), and the fifteenth switch USW6(1) is connected between the drive electrode TL(0) and the drive electrode TL(1).

The magnetic field detection coil and the electric field detection electrode may be provided in the same manner as the fifth embodiment. In addition, the electric field touch detection can be realized in the same manner as the fifth embodiment.

In the sixth embodiment, the voltage wirings TL(TPH) and TL(TPL), which are arranged outside the display panel 2 along the sides of the display panel 2, are also used as the winding of the magnetic field generation coil. Thus, it is possible to detect touch by a pen even in each part proximate to the side 2-L and the side 2-R of the display panel 2. Of course, only one of the voltage wirings may be used as the winding of the magnetic field generation coil, or the voltage wirings TL(TPH) and TL(TPL) may not necessarily used as the winding of the magnetic field generation coil. In addition, the description has been given in FIG. 35 by exemplifying the magnetic field generation coil having a one-turn winding, but the magnetic field generation coil may have a winding with one and half turns or more.

In the present specification, the drive wiring, for example, the drive electrode, the signal line or the scan line, which generates the magnetic field in the magnetic field generation period TGT, includes a pair of end portions. The other end portion (or one end portion) out of the pair of end portions is present in the extending direction of the drive wiring with respect to one end portion (or the other end portion). The drive signal is supplied to the one end portion (or the other end portion), and the ground voltage Vss serving as a reference signal is supplied to the other end portion (or the one end portion) at the time of generating the magnetic field. When the one end portion and the other end portion are regarded as a first area and a second area of the drive wiring, the drive signal can be regareded as being supplied to the first area (or the second area) of the drive wiring, and the reference signal can be regarded as being supplied to the second area (or the first area) in the magnetic field generation period TGT.

When FIG. 8 of the first embodiment is exemplified, the drive wiring which generates the magnetic field correspond to the drive electrodes TL(0) to TL(p) extending in the row direction in the magnetic field generation period TGT, and the first area (second area) is present in the direction extending in the row direction with respect to the second area (first area). In addition, when the plurality of drive electrodes TL(0) to TL(p) are regarded as a plurality of drive wirings, one drive electrode out of a pair of drive electrodes, which is selected by the selection signal sent from the unit drive circuit in the magnetic field generation period TGT, can be regarded as a first drive wiring, and the other drive electrode can be regarded as a second drive wiring. In this case, respective one end portions (for example, the first areas) of the first drive wiring and the second drive wiring are arranged on the same side (for example, the side 2-L) of the display panel 2 side, and the respective other end portions (the second areas) are arranged on the same side (the side 2-R) of the display panel 2 side. Thus, the respective first areas (one end portions) of the first drive wiring and the second drive wiring are proximate to each other, and the respective second areas (the other end portions) of the first drive wiring and the second drive wiring are proximate to each other.

In addition, when one or more drive wirings (the drive electrode in FIG. 8) are sandwiched between the selected pair of drive wirings in the magnetic field generation period TGT, the sandwiched drive wiring(s) can be regarded as a third drive wiring. Further, when the drive electrodes TL(0) to TL(p) are regarded as the drive wirings by exemplifying FIG. 8, the signal lines SL(0) to SL(p), which extend in the column direction to cross the drive electrodes TL(0) to TL(p), can be regarded as detection wirings. Of course, the detection wirings are not limited to the signal lines SL(0) to SL(p) but may be the scan lines GL(0) to GL(p) or the detection electrodes RL(0) to RL(p).

It is understood that those skilled in the art can derive various types of modified examples and corrections in the category of the idea of the present invention, and these modified example and corrections are encompassed within the scope of the present invention.

Any one obtained when those skilled in the art appropriately modify the above embodiments by addition, deletion, or design change of components, or by addition, omission, or condition change of steps is also encompassed within the scope of the invention as long as it includes a gist of the invention.

For example, the description has been given in the embodiments regarding the case where the common electrodes TL(0) to TL(p) and the signal lines SL(0) to SL(p) extend in the column direction and are arranged in the row direction, but the row direction and the column direction are changed depending on a point of view. A case where the point of view is changed so that the common electrodes TL(0) to TL(p) and the signal lines SL(0) to SL(p) extend in the row direction and are arranged in the column direction is also included in the scope of the present invention. In addition, the expression "parallel" used in the present specification means to extend without intersecting each other from one end to the other end. Thus, when lines do not intersect each other from one end to the other end even though a part or the entire part of one line is provided in the state of being inclined to the other line, this state is also considered as "parallel" in the present specification. In addition, the description has been given in FIG. 18 regarding the example where the drive electrode except for the drive electrode that generates the electric field is connected to the voltage wiring VCOM at the time of electric field touch detection. But, the invention is not limited thereto, and the drive electrode except for the drive electrode that generates the electric field may be set to the floating state.

What is claimed is:

1. A display device comprising:
   a pixel array including a plurality of pixels arranged in a matrix form;
   a plurality of drive electrodes each of which extends in a first direction and is arranged in a second direction intersecting the first direction in a detection area for detecting an external proximity object;
   a plurality of detection electrodes each of which extends in the second direction and is arranged in the first direction in the detection area,
   a first drive wiring extending in the second direction so as to face to one end portions of the plurality of drive electrodes and providing an AC voltage to the one end portions of the drive electrodes;
   a second drive wiring extending in the second direction so as to face to the other end portions of the plurality of drive electrodes and providing an AC voltage to the other end portions of the drive electrodes;
   a first reference voltage wiring extending in the second direction so as to face to the one end portions of the plurality of drive electrodes and providing a first reference voltage to the drive electrodes, wherein the first reference voltage wiring is located farther from the one end portions of the plurality of drive electrodes than the first drive wiring;
   a second reference voltage wiring extending in the second direction so as to face to the other end portions of the plurality of drive electrodes and providing a second reference voltage to the drive electrodes, wherein the second reference voltage wiring is located farther from the other end portions of the plurality of drive electrodes than the second drive wiring;
   a plurality of first switch circuit coupling the one end portions of the driving electrodes to one of the first drive wiring and the first reference voltage wiring; and
   a plurality of second switch circuit coupling the other end portions of the driving electrodes to one of the second drive wiring and the second reference voltage wiring.

2. The display device according to claim 1, wherein
   the plurality of drive electrodes includes a drive electrode of which the other end portion is coupled to the first reference voltage wiring while a one end portion of the drive electrode is coupled to the first drive wiring by a first switch circuit, and of which the one end portion is coupled to the second reference voltage wiring while the other end portion of the drive electrode is coupled to the second drive wiring by a second switch circuit.

3. The display device according to claim 2, wherein
   a drive electrode generates a magnetic field according to the AC voltage at time of detecting the external proximity object, and the detection electrodes detects a magnetic field generated by the external proximity object in response to the magnetic field generated by the drive electrode.

4. The display device according to claim 3, wherein
   the plurality of drive electrodes are arranged in parallel to each other, the plurality of drive electrodes including a second drive electrode is arranged to be proximate to a first drive electrode, and a one end portion of the first drive electrode is coupled to the first drive wiring and a one end portion of the second drive electrode is coupled to the second reference voltage wiring at time of detecting the external proximity object, and the other end portion of the first drive electrode is coupled to the first reference voltage and the other end portion of the second drive electrode is coupled to the second drive wiring at the time of detecting the external proximity object, whereby the magnetic field generated by the first drive electrode and the magnetic field generated by the second electrode are superimposed on each other in an area between the first drive electrode and the second drive electrode at the time of detecting the external proximity object.

5. The display device according to claim 4, wherein a direction of a current flowing in the second drive electrode is an opposite direction to a direction of current flowing in the first drive electrode at the time of detecting the external proximity object.

6. The display device according to claim 5, wherein the plurality of drive electrodes includes a third drive electrode which is arranged between the first drive electrode and the second drive electrode.

7. The display device according to claim 6, wherein a plurality of stages of an operation of detecting the external proximity object is executed during a display period for one frame in the pixel array, a number of the third drive wirings is set to a predetermined value at a predetermined stage, and the number of third drive wirings is set to be smaller than the predetermined value at a stage after the predetermined stage.

8. The display device according to claim 6, wherein the first drive electrode includes a plurality of drive electrodes arranged to be adjacent to each other, and the second drive electrode includes a plurality of drive electrodes arranged to be adjacent to each other.

9. The display device according to claim 3, further comprising:

A plurality of signal lines, which supply signals to the plurality of pixels at time of display, and a plurality of drive lines which intersect the plurality of signal lines are arranged in the pixel array, the plurality of drive electrodes include the plurality of drive lines, and the plurality of detection electrodes include the plurality of signal lines.

10. The display device according to claim 3, wherein the pixel array includes a first substrate on which a plurality of signal wirings are formed and a layer which is interposed between the first substrate and a second substrate arranged to oppose the first substrate and is displaced depending on signals that need to be displayed, the plurality of drive electrodes include the plurality of signal wirings formed on the first substrate, and the plurality of detection electrodes include a signal wiring formed on the second substrate.

11. The display device according to claim 3, wherein the pixel array includes a plurality of signal lines, which are arranged along each column of the pixel array and supply signals to the plurality of pixels, and a plurality of scan lines which are arranged along each row of the pixel array and supply a scan signal to select the pixel arranged in the row, and the plurality of drive electrodes include the plurality of signal lines or the plurality of scan lines.

12. The display device according to claim 11, further comprising:

a plurality of matrix electrodes which are arranged in a dot matrix form in the pixel array; and a plurality of detection signal lines which are connected to the plurality of matrix electrodes, wherein the plurality of detection signal lines are arranged in parallel to the plurality of signal lines and detect the external proximity object based on a change of a charge amount in the matrix electrodes.

13. The display device according to claim 12, further comprising:

a first substrate on which the plurality of signal lines, the plurality of scan lines, the plurality of detection signal lines, and the plurality of matrix electrodes are formed; and a second substrate which is arranged to oppose the first substrate with a layer, displaced depending on the signals that need to be displayed, interposed therebetween, wherein the plurality of detection electrodes include a plurality of signal wirings formed on the second substrate.

14. The display device according to claim 3, further comprising:

a control circuit coupled to the first drive wiring, the second drive wiring, the first reference voltage wiring and the second reference voltage wiring, providing the AC voltage to the first drive wiring and the second drive wiring and providing the first reference voltage and the second reference voltage to the first drive wiring and the second drive wiring at time of detecting the external proximity object.

15. The display device according to claim 14, wherein the plurality of drive electrodes includes a first drive electrode having the other end portion coupled to the first reference voltage wiring while a one end portion of the first drive electrode is coupled to the first drive wiring by a first switch circuit, and wherein the plurality of drive electrodes includes a second drive electrode having a one end portion coupled to the second reference voltage wiring while the other end portion of the second drive electrode is coupled to the second drive wiring by a second switch circuit.

16. The display device according to claim 15, wherein the plurality of drive electrodes includes a third drive electrode which is arranged between the first drive electrode and the second drive electrode, and the third drive electrode is isolated from the first drive wiring and the second drive wiring or from the first reference voltage wiring and the second reference voltage wiring.

17. The display device according to claim 15, wherein the third drive electrode is isolated from the first drive wiring, the second drive wiring, the first reference voltage wiring and the second reference voltage wiring.

18. A display device comprising:

a pixel array including a plurality of pixels arranged in a matrix form;

a plurality of drive electrodes each of which extends in a first direction and is arranged on a second direction intersecting the first direction in a detection area for detecting an external proximity object;
a plurality of detection electrodes each of which extends in the second direction and is arranged in the first direction in the detection area;
a first drive wiring extending in the second direction so as to face to one end portions of the plurality of drive electrodes;
a second drive wiring extending in the second direction so as to face to the other end portions of the plurality of drive electrodes;
a first reference wiring extending in the second direction so as to face to the other end portions of the plurality of drive electrodes;
a second reference wiring extending in the second direction so as to face to the one end portions of the plurality of drive electrodes;
a plurality of first switch circuit coupling among the one end portions of the driving electrodes, the first drive wiring and the second reference wiring and
a plurality of second switch circuit coupling among the other end portions of the driving electrodes, the second drive wiring and the first reference wiring,
wherein the plurality of drive electrode includes a first drive electrode and a second drive electrode in which currents follow at time of detecting the external proximity object.

19. The display device according to claim 18, wherein
a direction of a current flowing in the second drive electrode is an opposite direction to a direction of current flowing in the first drive electrode at the time of detecting the external proximity object.

\* \* \* \* \*